(12) United States Patent
Lynn et al.

(10) Patent No.: US 11,885,577 B2
(45) Date of Patent: Jan. 30, 2024

(54) HEAT EXCHANGER ARRAY SYSTEM AND METHOD FOR AN AIR THERMAL CONDITIONER

(71) Applicant: Other Lab, LLC, San Francisco, CA (US)

(72) Inventors: Peter Lynn, Oakland, CA (US); Saul Griffith, San Francisco, CA (US); Sam Sarcia, San Francisco, CA (US); Brent Ridley, Huntington Beach, CA (US); Shara Maikranz, San Francisco, CA (US); James McBride, San Francisco, CA (US); Vincent Domenic Romanin, San Francisco, CA (US); Keith Pasko, San Francisco, CA (US)

(73) Assignee: Other Lab, LLC, San Francisco, CA (US)

( * ) Notice: Subject to any disclaimer, the term of this patent is extended or adjusted under 35 U.S.C. 154(b) by 106 days.

(21) Appl. No.: 17/197,910

(22) Filed: Mar. 10, 2021

(65) Prior Publication Data
US 2021/0215445 A1 Jul. 15, 2021

Related U.S. Application Data

(63) Continuation of application No. 15/161,029, filed on May 20, 2016, now Pat. No. 11,143,467.
(Continued)

(51) Int. Cl.
*F28F 21/06* (2006.01)
*F28D 1/02* (2006.01)
(Continued)

(52) U.S. Cl.
CPC ............. *F28F 21/062* (2013.01); *B01D 1/02* (2013.01); *B01D 1/26* (2013.01); *B01D 1/28* (2013.01);
(Continued)

(58) Field of Classification Search
CPC .......... F28F 21/062; B01D 1/02; B01D 1/26; B01D 1/28; C02F 1/041; C02F 1/06; F28D 1/024; F28D 1/0477; F28D 2021/0063
See application file for complete search history.

(56) References Cited

U.S. PATENT DOCUMENTS

| 1,183,077 A | 5/1916 | Koenig |
| 1,926,463 A | 9/1933 | Stoddard |

(Continued)

FOREIGN PATENT DOCUMENTS

| CA | 2338240 A1 | 12/2000 |
| CA | 2409963 A1 | 5/2003 |

(Continued)

OTHER PUBLICATIONS

Ogulata, "Air Permeability of Woven Fabrics," Journal of Textile and Apparel, Technology and Management 5 (2):1-10, Jan. 2006.
(Continued)

*Primary Examiner* — Tho V Duong
*Assistant Examiner* — Raheena R Malik
(74) *Attorney, Agent, or Firm* — Davis Wright Tremaine LLP

(57) ABSTRACT

An air thermal conditioning system, for at least one of heating air and cooling air, which includes a cross-flow heat exchanger array. The cross-flow heat exchanger array includes a plurality of planar membrane heat exchangers disposed in parallel with a space separating adjacent planar membrane heat exchangers. Each of the planar membrane heat exchangers include a first sheet; a second sheet coupled to the first sheet; and at least one fluid chamber defined by the first and second sheets, with the at least one fluid chamber extending between first and second ends of the planar membrane heat exchangers and opening to a first and second port at the first and second ends respectively.

20 Claims, 31 Drawing Sheets

Related U.S. Application Data

(60) Provisional application No. 62/164,443, filed on May 20, 2015.

(51) Int. Cl.

| | |
|---|---|
| *F28D 1/047* | (2006.01) |
| *C02F 1/04* | (2023.01) |
| *C02F 1/06* | (2023.01) |
| *B01D 1/26* | (2006.01) |
| *B01D 1/28* | (2006.01) |
| *F28B 1/06* | (2006.01) |
| *B01D 1/02* | (2006.01) |
| *F04B 35/01* | (2006.01) |
| *F28F 3/14* | (2006.01) |
| *F28F 3/06* | (2006.01) |
| *F04B 25/00* | (2006.01) |
| *F04B 39/00* | (2006.01) |
| *F04B 39/12* | (2006.01) |
| *F04B 45/02* | (2006.01) |
| *F04B 53/14* | (2006.01) |
| *F04D 25/08* | (2006.01) |
| *F15B 15/10* | (2006.01) |
| *F28D 21/00* | (2006.01) |
| *C02F 103/08* | (2006.01) |
| *F28D 7/00* | (2006.01) |

(52) U.S. Cl.
CPC .............. *B01D 1/289* (2013.01); *C02F 1/041* (2013.01); *C02F 1/06* (2013.01); *F04B 25/005* (2013.01); *F04B 35/01* (2013.01); *F04B 39/0094* (2013.01); *F04B 39/12* (2013.01); *F04B 45/02* (2013.01); *F04B 53/144* (2013.01); *F04D 25/088* (2013.01); *F15B 15/10* (2013.01); *F28B 1/06* (2013.01); *F28D 1/024* (2013.01); *F28D 1/0472* (2013.01); *F28D 1/0477* (2013.01); *F28F 3/06* (2013.01); *F28F 3/14* (2013.01); *F28F 21/065* (2013.01); *C02F 2103/08* (2013.01); *F28D 7/005* (2013.01); *F28D 2021/0063* (2013.01)

(56) References Cited

U.S. PATENT DOCUMENTS

| | | |
|---|---|---|
| 2,252,064 A | 8/1941 | Cornell, Jr. |
| 2,387,320 A | 10/1945 | Foster |
| 2,810,053 A | 10/1957 | Messner |
| 2,817,340 A | 12/1957 | Culver |
| 2,917,953 A | 12/1959 | Badali |
| 2,955,572 A | 10/1960 | Feucht et al. |
| 3,201,861 A | 8/1965 | Fromson |
| 3,429,758 A | 2/1969 | Young |
| 3,451,305 A | 6/1969 | Johnson |
| 3,530,681 A | 9/1970 | Dehne |
| 3,537,935 A | 11/1970 | Withers |
| 3,600,259 A | 8/1971 | Smith |
| 3,751,904 A | 8/1973 | Rydberg |
| 3,827,675 A | 8/1974 | Schuman |
| 3,847,211 A | 11/1974 | Fischel et al. |
| 3,862,546 A | 1/1975 | Daniels |
| 3,986,360 A | 10/1976 | Hagen et al. |
| 4,227,571 A * | 10/1980 | Tjaden ................. F28F 21/067 165/170 |
| 4,242,878 A | 1/1981 | Brinkerhoff |
| 4,377,203 A | 3/1983 | Ejima |
| 4,393,662 A | 7/1983 | Dirth |
| 4,407,358 A | 10/1983 | Muellejans et al. |
| 4,411,310 A | 10/1983 | Perry et al. |
| 4,455,825 A | 6/1984 | Pinto |
| 4,490,974 A | 1/1985 | Colgate |
| 4,619,112 A | 10/1986 | Colgate |
| 4,641,503 A | 2/1987 | Kobayashi |
| 4,733,718 A | 3/1988 | Schikowsky et al. |
| 4,736,804 A | 4/1988 | Geibel |
| 4,744,414 A | 5/1988 | Schon |
| 4,809,516 A | 3/1989 | Jones |
| 4,818,155 A | 4/1989 | Belknap |
| 4,859,265 A | 8/1989 | Shuster et al. |
| 4,871,017 A | 10/1989 | Cesaroni |
| 4,907,648 A | 3/1990 | Emmerich et al. |
| 4,955,435 A | 9/1990 | Shuster et al. |
| 5,127,783 A | 7/1992 | Moghe et al. |
| 5,138,765 A | 8/1992 | Watson et al. |
| 5,150,476 A | 9/1992 | Statham et al. |
| 5,195,240 A | 3/1993 | Shuster et al. |
| 5,212,258 A | 5/1993 | Irwin |
| 5,222,551 A | 6/1993 | Hasegawa et al. |
| 5,245,835 A | 9/1993 | Cohen et al. |
| 5,295,620 A | 3/1994 | Cousineau et al. |
| 5,337,563 A | 8/1994 | Weber |
| 5,355,688 A | 10/1994 | Rafalovich et al. |
| 5,385,204 A | 1/1995 | Boardman et al. |
| 5,445,213 A | 8/1995 | Im |
| 5,467,812 A | 11/1995 | Dean et al. |
| 5,507,337 A | 4/1996 | Rafalovich et al. |
| 5,628,172 A | 5/1997 | Kolmes et al. |
| 5,682,752 A | 11/1997 | Dean |
| 5,813,235 A | 9/1998 | Peterson |
| 5,834,093 A | 11/1998 | Challis et al. |
| 5,954,125 A | 9/1999 | Mantegazza et al. |
| 5,988,269 A | 11/1999 | Karlsson et al. |
| 6,032,730 A | 3/2000 | Akita et al. |
| 6,138,987 A | 10/2000 | Lee |
| 6,286,316 B1 | 9/2001 | Waldrop et al. |
| 6,312,784 B2 | 11/2001 | Russell et al. |
| 6,318,108 B1 | 11/2001 | Holstein et al. |
| 6,332,323 B1 | 12/2001 | Reid et al. |
| 6,343,482 B1 | 2/2002 | Endo et al. |
| 6,389,834 B1 | 5/2002 | LeClear et al. |
| 6,397,940 B1 | 6/2002 | Blomgren |
| 6,458,231 B1 | 10/2002 | Wapner et al. |
| 6,482,332 B1 | 11/2002 | Malach |
| 6,525,505 B2 | 2/2003 | Bay et al. |
| 6,629,561 B2 * | 10/2003 | Halt ..................... F28D 1/0333 165/177 |
| 6,767,850 B1 | 7/2004 | Tebbe |
| 6,770,579 B1 | 8/2004 | Dawson et al. |
| 6,840,056 B2 | 1/2005 | Tanaka |
| 6,857,468 B2 | 2/2005 | Emrich |
| 7,121,105 B1 | 10/2006 | Rais |
| 7,140,107 B2 | 11/2006 | Ohno et al. |
| 7,143,823 B2 | 12/2006 | Kang et al. |
| 7,198,093 B1 | 4/2007 | Elkins |
| 7,243,703 B2 | 7/2007 | Yamaguchi et al. |
| 7,291,389 B1 | 11/2007 | Bitler et al. |
| 7,467,467 B2 | 12/2008 | Prociw |
| 7,754,626 B2 | 7/2010 | Baron et al. |
| 7,802,426 B2 | 9/2010 | Bollinger |
| 7,976,924 B2 | 7/2011 | Stanford, Jr. et al. |
| 8,061,411 B2 | 11/2011 | Ku et al. |
| 8,187,984 B2 | 5/2012 | Rock |
| 8,192,824 B2 | 6/2012 | Rock et al. |
| 8,281,614 B2 | 10/2012 | Koo et al. |
| 8,349,438 B2 | 1/2013 | Laib et al. |
| 8,389,100 B2 | 3/2013 | Rock et al. |
| 8,650,886 B2 | 2/2014 | Wilcoxon et al. |
| 8,967,239 B2 | 3/2015 | Schertz et al. |
| 9,140,273 B2 | 9/2015 | Stroganov |
| 9,163,334 B1 | 10/2015 | Fossey et al. |
| 9,234,480 B2 | 1/2016 | Gayton |
| 9,618,278 B2 | 4/2017 | Denkenberger |
| 9,648,983 B2 | 5/2017 | Hofer et al. |
| 9,903,350 B2 | 2/2018 | Li et al. |
| 10,012,450 B2 | 7/2018 | Riendeau |
| 10,245,715 B2 | 4/2019 | Merello |
| 10,533,810 B2 | 1/2020 | Lynn et al. |
| 10,775,054 B2 | 9/2020 | Bradford et al. |
| 10,845,133 B2 | 11/2020 | Romanin et al. |
| 11,143,467 B2 | 10/2021 | Lynn et al. |
| 11,173,575 B2 | 11/2021 | Rutkowski et al. |

(56) References Cited

U.S. PATENT DOCUMENTS

| | | |
|---|---|---|
| 11,253,958 B2 | 2/2022 | Rutkowski et al. |
| 2001/0008821 A1 | 7/2001 | Russell et al. |
| 2002/0026800 A1 | 3/2002 | Kasai et al. |
| 2002/0166657 A1 | 11/2002 | Uchison |
| 2002/0190451 A1 | 12/2002 | Sancaktar et al. |
| 2003/0007774 A1 | 1/2003 | Christopher et al. |
| 2003/0110789 A1 | 6/2003 | Cur et al. |
| 2004/0003915 A1 | 1/2004 | Shippy et al. |
| 2004/0050532 A1 | 3/2004 | Yamaguchi et al. |
| 2004/0062910 A1 | 4/2004 | Morrison |
| 2004/0266293 A1 | 12/2004 | Thiriot |
| 2005/0092474 A1 | 5/2005 | Seidel |
| 2005/0204449 A1 | 9/2005 | Baron et al. |
| 2005/0251900 A1 | 11/2005 | Harlacker |
| 2005/0276670 A1 | 12/2005 | Freund |
| 2006/0107683 A1 | 5/2006 | Song et al. |
| 2006/0157225 A1 | 7/2006 | Martin et al. |
| 2006/0277950 A1 | 12/2006 | Rock |
| 2007/0034623 A1 | 2/2007 | Mimken |
| 2007/0184238 A1 | 8/2007 | Hockaday et al. |
| 2008/0087031 A1 | 4/2008 | Park et al. |
| 2009/0071181 A1 | 3/2009 | Spanger |
| 2009/0176054 A1 | 7/2009 | Laib et al. |
| 2009/0194268 A1 | 8/2009 | Kristensen et al. |
| 2010/0229585 A1 | 9/2010 | Bradford et al. |
| 2011/0024433 A1 | 2/2011 | Rolland et al. |
| 2011/0052861 A1 | 3/2011 | Rock |
| 2012/0269704 A1 | 10/2012 | Hoglund et al. |
| 2013/0078415 A1 | 3/2013 | Rock |
| 2013/0247536 A1 | 9/2013 | Erlendsson et al. |
| 2014/0004295 A1 | 1/2014 | Kiederle |
| 2014/0004332 A1 | 1/2014 | Kanayama |
| 2014/0007569 A1 | 1/2014 | Gayton |
| 2014/0053311 A1 | 2/2014 | Nordstrom et al. |
| 2014/0053312 A1 | 2/2014 | Nordstrom et al. |
| 2014/0096555 A1 | 4/2014 | Ayub et al. |
| 2014/0124187 A1 | 5/2014 | Albalat |
| 2014/0150656 A1 | 6/2014 | Vandermeulen |
| 2014/0304896 A1 | 10/2014 | Nordstrom et al. |
| 2015/0152852 A1 | 6/2015 | Li et al. |
| 2015/0323260 A1 | 11/2015 | Greber |
| 2016/0017870 A1 | 1/2016 | Mather |
| 2016/0043694 A1 | 2/2016 | Price |
| 2016/0216039 A1 | 7/2016 | Bergin et al. |
| 2016/0231071 A1 | 8/2016 | Sekol et al. |
| 2016/0340814 A1 | 11/2016 | Ridley et al. |
| 2016/0341224 A1 | 11/2016 | Lynn et al. |
| 2016/0341498 A1 | 11/2016 | Ynn et al. |
| 2017/0194679 A1 | 7/2017 | Chakraborty et al. |
| 2017/0205146 A1 | 7/2017 | Turney et al. |
| 2017/0225320 A1 | 8/2017 | Swift et al. |
| 2018/0283794 A1 | 10/2018 | Cerny et al. |
| 2018/0283795 A1 | 10/2018 | Cerny et al. |
| 2019/0107338 A1 | 4/2019 | Romanin et al. |
| 2020/0003505 A1 | 1/2020 | Minamitani |
| 2020/0238451 A1 | 7/2020 | Rutkowski et al. |
| 2020/0238452 A1 | 7/2020 | Rutkowski et al. |
| 2020/0248976 A1 | 8/2020 | Powell |

FOREIGN PATENT DOCUMENTS

| | | | |
|---|---|---|---|
| CN | 101956271 A | | 1/2011 |
| CN | 104769834 A | | 7/2015 |
| DE | 1259362 B | | 1/1968 |
| DE | 3212295 A1 | | 10/1983 |
| DE | 3404458 A1 | | 8/1984 |
| DE | 4007963 A1 | | 9/1991 |
| EP | 0052321 A1 | | 5/1982 |
| EP | 0068990 A1 | | 1/1983 |
| EP | 0925168 B1 | | 8/2001 |
| EP | 0900138 B1 | | 1/2002 |
| EP | 1779965 A2 | | 5/2007 |
| EP | 1779965 B1 | | 9/2012 |
| EP | 2835610 A1 | | 2/2015 |
| FR | 2848653 A1 | | 6/2004 |
| JP | H0711535 A | | 1/1995 |
| JP | 2000234231 A | | 8/2000 |
| JP | 2004197259 A | | 7/2004 |
| JP | 2008517183 A | | 5/2008 |
| JP | 2011510180 A | | 3/2011 |
| JP | 2012087449 A | | 5/2012 |
| JP | 2015533521 A | | 11/2015 |
| KR | 20150038475 A | | 4/2015 |
| RU | 2100733 C1 | | 12/1997 |
| RU | 2413152 C2 | | 2/2011 |
| RU | 2487270 C2 | | 7/2013 |
| RU | 2527710 C1 | | 9/2014 |
| UA | 88281 U | | 3/2014 |
| WO | 1999005926 A1 | | 2/1999 |
| WO | 2006044210 A1 | | 4/2006 |
| WO | 2006134716 A1 | | 12/2006 |
| WO | 2007144498 A2 | | 12/2007 |
| WO | 2008108724 A3 | | 11/2008 |
| WO | 2009085384 A1 | | 7/2009 |
| WO | 2012086584 A1 | | 6/2012 |
| WO | 2013192531 A1 | | 12/2013 |
| WO | 2014022667 A2 | | 2/2014 |
| WO | 2014138049 A2 | | 9/2014 |
| WO | 2016064220 A1 | | 4/2016 |
| WO | 2016187547 A1 | | 11/2016 |
| WO | 2016202813 A1 | | 12/2016 |
| WO | 2017058339 A2 | | 4/2017 |
| WO | 2017096044 A1 | | 6/2017 |
| WO | 2017165435 A3 | | 12/2017 |
| WO | 2022006296 | | 1/2022 |

OTHER PUBLICATIONS

Park et al., "Structure changes caused by strain annealing of nylon 6 fibers," Journal of Macromolecular Science, Part B: Physics 15(2):229-256, May 1, 1978.

Prevorsek et al., "Effect of Temperature and Draw Ratio on Force-Extension Properties of Twisted Fibers," Textile Research Journal 35(7):581-587, Jul. 1965.

Raviv et al., "Active Printed Materials for Complex Self-Evolving Deformations," Scientific Reports 4:7422, Dec. 18, 2014, 8 pages.

Scheffler et al., "Fabrication of polymer film heat transfer elements for energy efficient multi-effect distillation," Desalination 222(1-3):696-710, Mar. 1, 2008.

Sharafi et al., "A multiscale approach for modeling actuation response of polymeric artificial muscles," Soft Matter 11 (19):3833-3843, Mar. 30, 2015.

Statton, "High-Temperature Annealing of Drawn Nylon 66 Fibers," Journal of Polymer Science Part B: Polymer Physics 10(8):1587-1592, Aug. 1, 1972.

Stoffberg et al., "The Effect of Fabric Structural Parameters and Fiber Type on the Comfort-related Properties of Commercial Apparel Fabrics," Journal of Natural Fibers, Oct. 13, 2015, 15 pages.

Suzuki et al., "Application of a high-tension annealing method to nylon 66 fibres," Polymer 39(6-7):1351-1355, Jan. 1, 1998.

Timoshenko, "Analysis of Bi-Metal Thermostats," Journal of the Optical Society of America 11(3):233-255, Sep. 1, 1925.

Tsujimoto et al., "Changes in Fine Structure of Nylon 6 Gut Yarns in Twisting, Annealing and Untwisting Processes," Journal of the Textile Machinery Society of Japan 25(4):87-92, Dec. 1979; first disclosed in Journal of the Textile Machinery Society of Japan 31(12):T171-5, Dec. 25, 1978.

Tugrul, "Air Permeability of Woven Fabrics," JTAM, 2006, 10 pages.

Van Der Heijden et al., "Helical and Localised Buckling in Twisted Rods: A Unified Analysis of the Symmetric Case," Nonlinear Dynamics 21(1):71-99, Jan. 1, 2000.

Yang et al., "A top-down multi-scale modeling for actuation response of polymeric artificial muscles," Journal of the Mechanics and Physics of Solids 92:237-259, online publication Apr. 6, 2016, print publication Jul. 2016.

Zaheed et al., "Review of polymer compact heat exchangers, with special emphasis on a polymer film unit," Applied Thermal Engineering 24(16):2323-2358, published online Jun. 2, 2004, print publication Nov. 30, 2004.

(56) References Cited

OTHER PUBLICATIONS

Zhang et al., "Multiscale deformations lead to high toughness and circularly polarized emission in helical nacre-like fibres," Nature Communications 7:10701, Feb. 24, 2016, 28 pages.
"APTIV® Victrex® Peek Film Technology: High Performance Film for Unmatched Versatility and Performance," Victrex Polymer Solutions, brochure first published 2012, last modified 2014.
Abel et al., "Hierarchical architecture of active knits," Smart Materials and Structures 22(12):125001, Nov. 1, 2013, 17 pages.
Abel, "Active Knit Actuation Architectures," Doctoral dissertation, University of Michigan, Mar. 2014, 161 pages.
Arghyros et al., "Mechanics of Texturing Thermoplastic Yarns. Part VIII: An Experimental Study of Heat Setting," Textile Research Journal 52(5):295-312, May 1982.
Beresford et al., "The Effect of Tension and Annealing on the X-ray Diffraction Pattern of Drawn 6.6 Nylon," Polymer 5:247-256, Jan. 1, 1964.
Buckley et al., "19—Heat-Setting of Drawn Polymeric Fibres: Anomalous Twist Recovery," The Journal of the Textile Institute 76(4):264-274, Jul. 1, 1985.
Buckley et al., "High-temperature viscoelasticity and heat-setting of poly(ethylene terephthalate)," Polymer 28 (1):69-85, first disclosed Apr. 1982, print publication Jan. 1, 1987.
Chen et al., "Electromechanical Actuator Ribbons Driven by Electrically Conducting Spring-Like Fibers," Advanced Materials 27(34):4982-4988, Sep. 1, 2015.
Chen et al., "Hierarchically arranged helical fibre actuators driven by solvents and vapours," Nature Nanotechnology 10(12):1077-1083, plus Supplementary Notes, published online Sep. 14, 2015, print publication Dec. 2015, 50 pages.
Cherubini et al., "Experimental characterization of thermally-activated artificial muscles based on coiled nylon fishing ines," AIP Advances 5(6):067158, Jun. 2015, 12 pages.
Decristofano et al., "Temperature-adaptive Insulation Based on Multicomponent Fibers of Various Cross-sections," MRS Proceedings 1312:137-142, Jan. 2011.
Denkenberger et al., "Expanded microchannel heat exchanger: design, fabrication and preliminary experimental test," Proceedings of the Institution of Mechanical Engineers—Part A: Journal of Power and Energy 226(4):532-544 , Apr. 11, 2012.
Extended European Search Report for Application No. 18785006.0 dated Nov. 19, 2020, 8 pages.
Fossey et al., "Variable Loft Thermal Insulation for Temperature Adaptive Clothing," Solutions and Opportunities for the Safety and Protective Fabrics Industry, 4th International Conference on Safety and Protective Fabrics, Oct. 26, 2004, 18 pages.
Gupta et al., "Structure-Property Relationship in Heat-Set Poly(ethylene Terephthalate) Fibers. I. Structure and Morphology," Journal of Applied Polymer Science 29(10):3115-3129, Oct. 1984.
Gupta et al., "Structure-Property Relationship in Heat-Set Poly(ethylene Terephthalate) Fibers. II. Thermal Behavior and Morphology," Journal of Applied Polymer Science 29(12):3727-3739, Dec. 1984.
Gupta et al., "Structure-Property Relationship in Heat-Set Poly(ethylene Terephthalate) Fibers. III. Stress-Relaxation Behavior," Journal of Applied Polymer Science 29(12):4203-4218, Dec. 1984.
Gupta et al., "Structure-Property Relationship in Heat-Set Poly(ethylene Terephthalate) Fibers. IV. Recovery Behavior," Journal of Applied Polymer Science 29(12):4219-4235, Dec. 1984.
Gupta et al., "The Effect of Heat Setting on the Structure and Mechanical Properties of Poly(ethylene Terephthalate) Fiber. I. Structural Changes," Journal of Applied Polymer Science 26(6):1865-1876, Jun. 1981.
Gupta et al., "The Effect of Heat Setting on the Structure and Mechanical Properties of Poly(ethylene Terephthalate) Fiber. II. The Elastic Modulus and Its Dependence on Structure," Journal of Applied Polymer Science 26(6):1877-1884, Jun. 1981.
Gupta et al., "The Effect of Heat Setting on the Structure and Mechanical Properties of Poly(ethylene Terephthalate) Fiber. III. Anelastic Properties and Their Dependence on Structure," Journal of Applied Polymer Science 26 (6):1885-1895, Jun. 1981.
Gupta et al., "The Effect of Heat Setting on the Structure and Mechanical Properties of Poly(ethylene Terephthalate) Fiber. IV. Tensile Properties Other Than Modulus and Their Dependence on Structure," Journal of Applied Polymer Science 26(6):1897-1905, Jun. 1981.
Haines et al., "Artificial Muscles from Fishing Line and Sewing Thread," Science 343(6173):868-872, and Supplementary Materials, Feb. 21, 2014, 41 pages.
Hearle et al., "32-The Snarling of Highly Twisted Monofilaments. Part I: The Load-Elongation Behavior with Normal Snarling," The Journal of the Textile Institute 63(9):477-489, Sep. 1972.
Hearle et al., "33-The Snarling of Highly Twisted Monofilaments. Part II: Cylindrical Snarling," The Journal of the Textile Institute 63(9):490-501, Sep. 1972.
Hiraoka et al., "Power-efficient low-temperature woven coiled fibre actuator for wearable applications," Scientific Reports 6:36358, plus Supplementary Information, Nov. 4, 2016, 16 pages.
Hsu et al., "A dual-mode textile for human body radiative heating and cooling," Science Advances 3(11):e1700895, Nov. 10, 2017, 9 pages.
Hsu et al., "Personal Thermal Management by Metallic Nanowire-Coated Textile," Nano Letters 15(1):365-71, online publication Nov. 30, 2014, print publication Dec. 3, 2014.
Hsu et al., "Radiative human body cooling by nanoporous polyethylene textile," Science 353(6303):1019-1023, plus Supplementary Material, Sep. 2, 2016, 25 pages.
International Search Report and Written Opinion dated Aug. 30, 2018, International Patent Application No. PCT/US2018/026941, filed Apr. 10, 2018.
International Search Report and Written Opinion dated Dec. 13, 2018, International Patent Application No. PCT/US2018/055294, filed Oct. 10, 2018, 6 pages.
International Search Report and Written Opinion dated Jun. 26, 2019, Patent Application No. PCT/US2019/020756, filed Mar. 5, 2019, 7 pages.
International Search Report and Written Opinion dated May 28, 2020, International Patent Application No. PCT/US2020/015463, filed Jan. 28, 2020, 6 pages.
International Search Report and Written Opinion dated Nov. 9, 2017, International Patent Application No. PCT/US2017/047678, filed Aug. 18, 2017, seven pages.
International Search Report and Written Opinion dated Oct. 6, 2016, International Patent Application No. PCT/US2016/033545, filed May 20, 2016.
International Search Report and Written Opinion dated Sep. 1, 2016, International Patent Application No. PCT/US2016/033659, filed May 20, 2016.
International Search Report and Written Opinion dated Sep. 15, 2016, International Patent Application No. PCT/US2016/033655, filed May 20, 2016.
International Search Report and Written Opinion dated Sep. 2, 2021, Patent Application No. PCT/US2021/039932, 7 pages.
Kianzad et al., "Nylon coil actuator operating temperature range and stiffness," SPIE 9430, Electroactive Polymer Actuators and Devices (EAPAD) 2015, Apr. 29, 2015, 6 pages.
Kianzad, "A Treatise on Highly Twisted Artificial Muscle: Thermally Driven Shape Memory Alloy and Coiled Nylon Actuators," Master's Thesis, University of British Columbia, Aug. 2015, 98 pages.
Kim et al., "Bio-inspired, Moisture-Powered Hybrid Carbon Nanotube Yarn Muscles," Scientific Reports 6:23016, Mar. 14, 2016, 7 pages.
Kim et al., "Dynamic Extension-Contraction Motion in Supramolecular Springs," Journal of the American Chemical Society 129(36) 10994-10995, Sep. 12, 2007.
Korean IPO Decision of Patent Grant dated Mar. 14, 2022, Application No. 10-2017-7036923, 2 pages.
Kunugi et al., "Mechanical properties and superstructure of high-modulus and high-strength nylon-6 fibre prepared by the zone-annealing method," Polymer 23(8):1199-1203, Jul. 1, 1982.

(56) References Cited

OTHER PUBLICATIONS

Lee et al., "High performance electrochemical and electrothermal artificial muscles from twist-spun carbon nanotube yarn," Nano Convergence 2(1):8, Dec. 1, 2015, nine pages.

Maziz et al., "Knitting and weaving artificial muscles," Science Advances 3(1):e1600327, Jan. 25, 2017.

Melvinsson, "Textile Actuator Fibres: Investigation in materials and methods for coiled polymer fibre muscles," Master's Thesis, The Swedish School of Textiles, University of Borås, Jun. 8, 2015, 60 pages.

Moretti et al., "Experimental characterization of a new class of polymeric-wire coiled transducers," Behavior and Mechanics of Multifunctional Materials and Composites 2015 9432:94320P, Apr. 1, 2015, 9 pages.

Murthy et al., "Effect of annealing on the structure and morphology of nylon 6 fibers," Journal of Macromolecular Science, Part B: Physics 26(4):427-446, Dec. 1, 1987.

Neukirch et al., "Writhing instabilities of twisted rods: from infinite to finite length," Journal of the Mechanics and Physics of Solids 50(6):1175-1191, Jun. 1, 2002.

USPTO Office Action in U.S. Appl. No. 17/364,176 dated Jun. 15, 2023, 32 pages.

\* cited by examiner

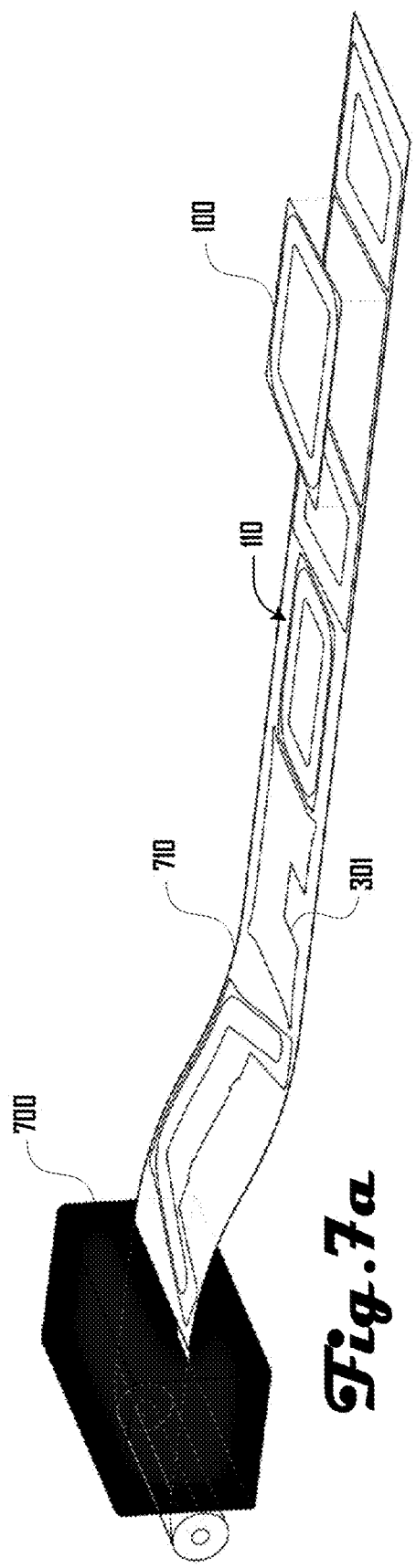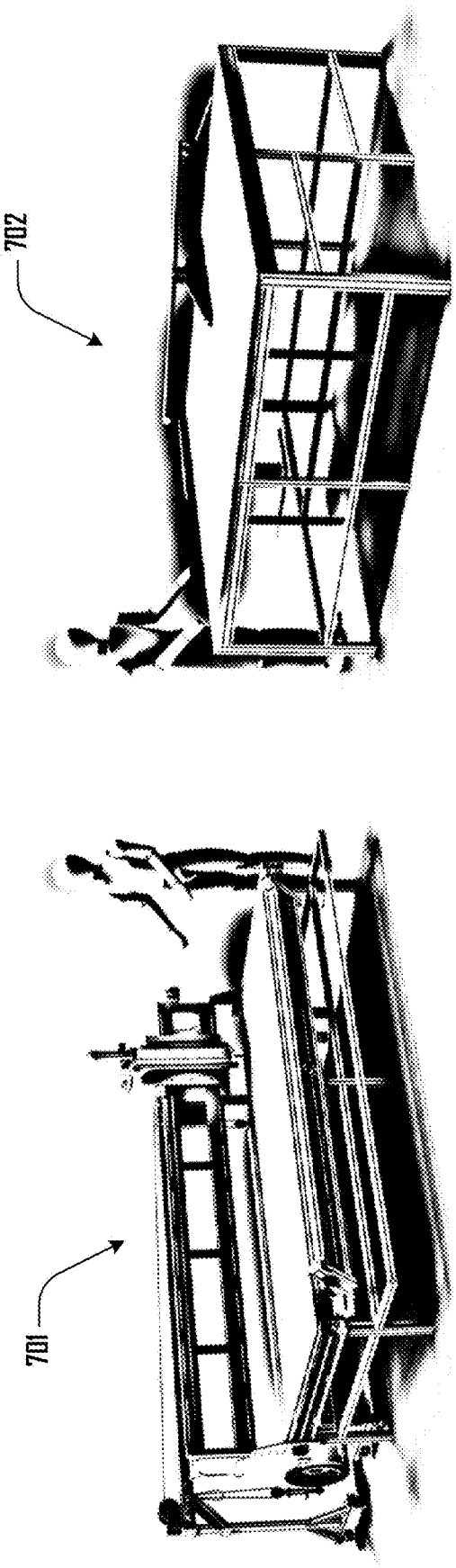

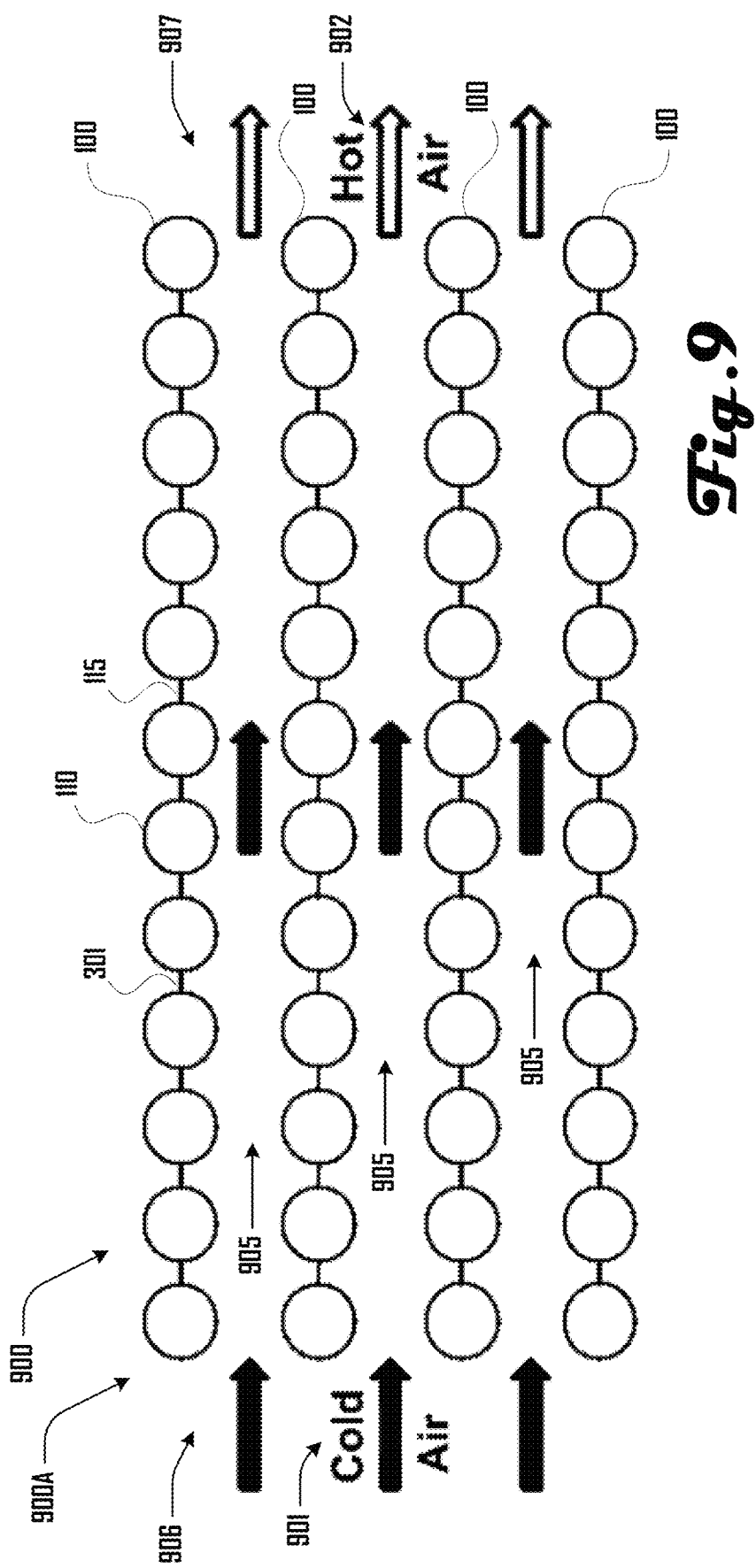

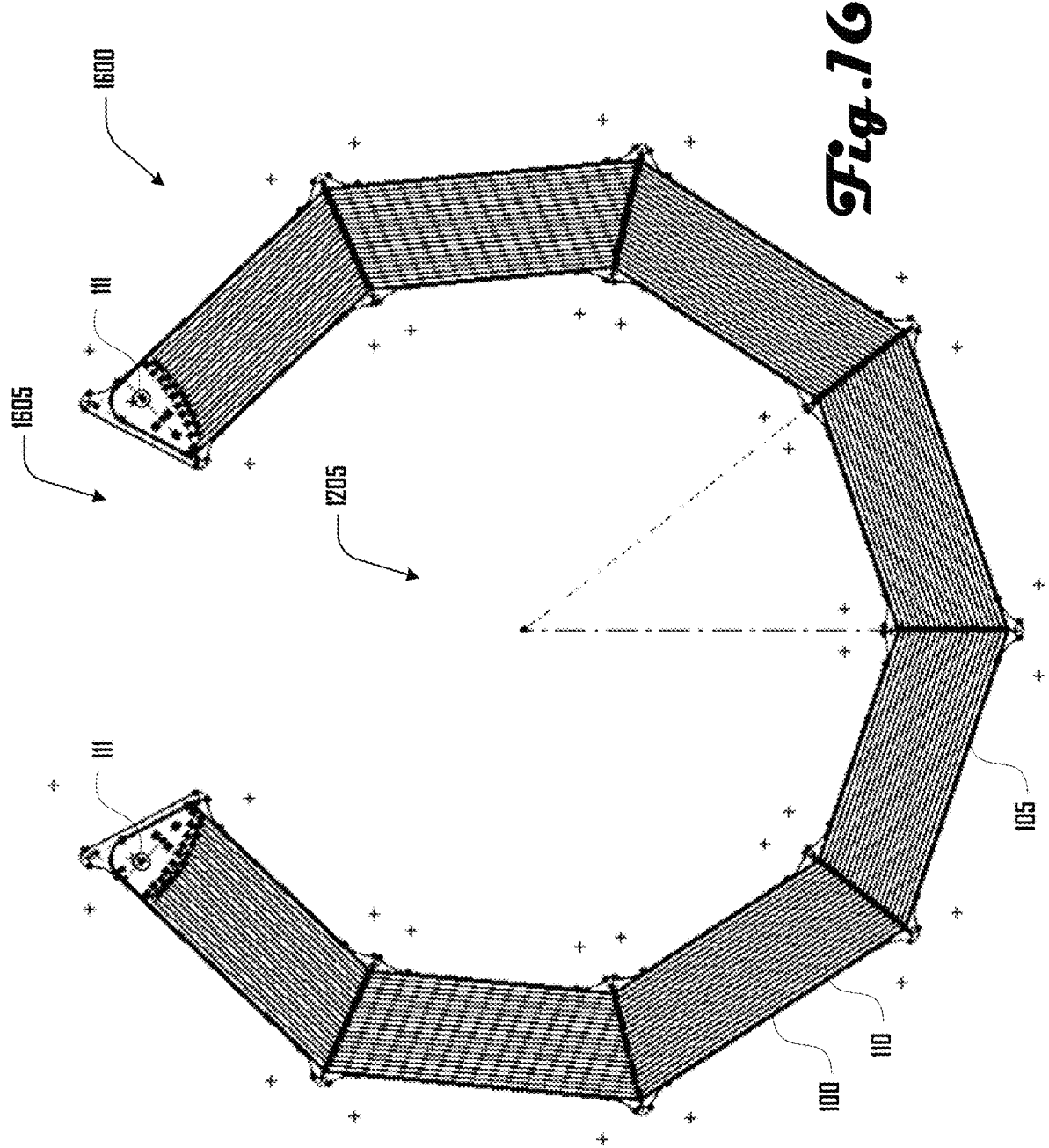

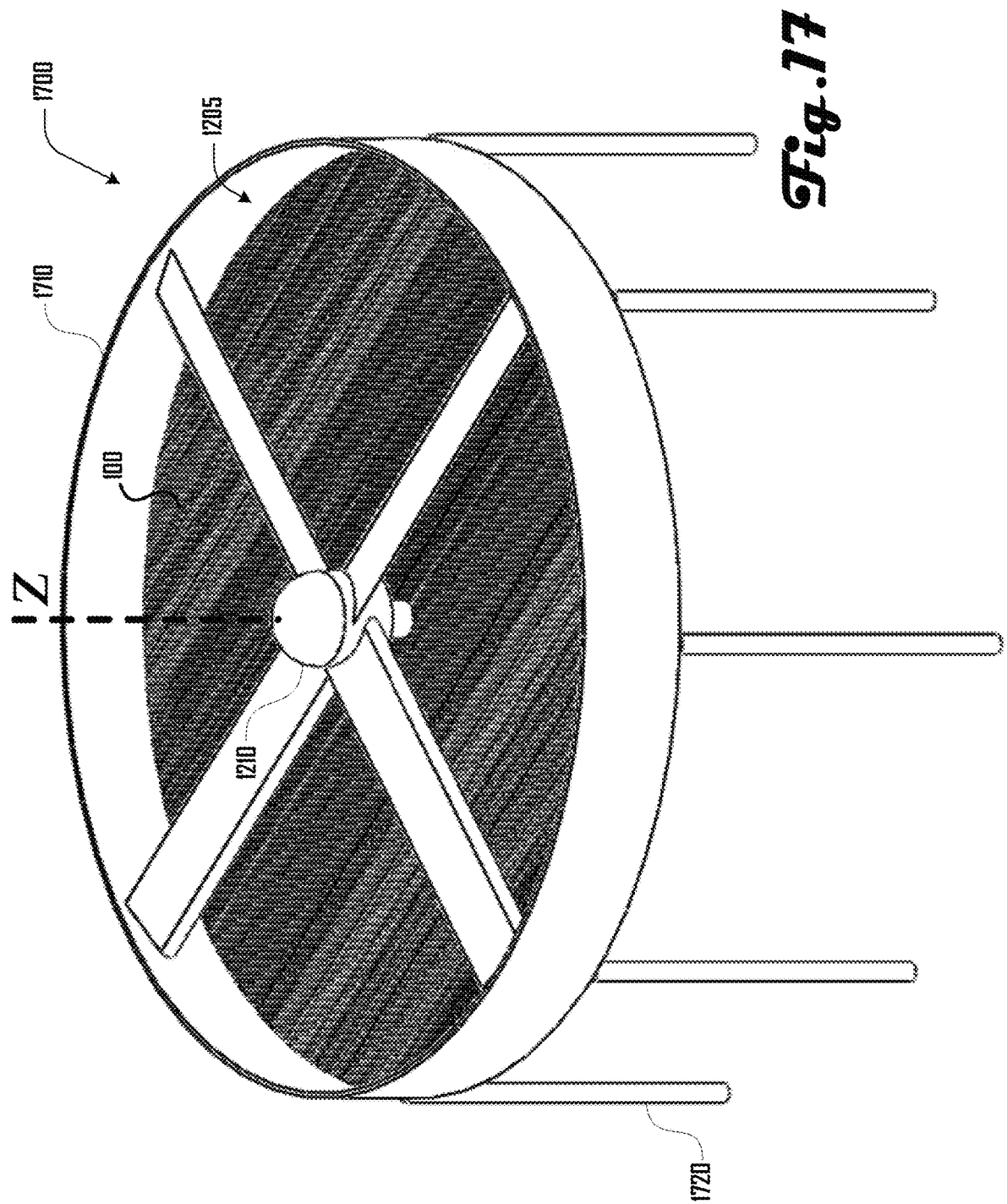

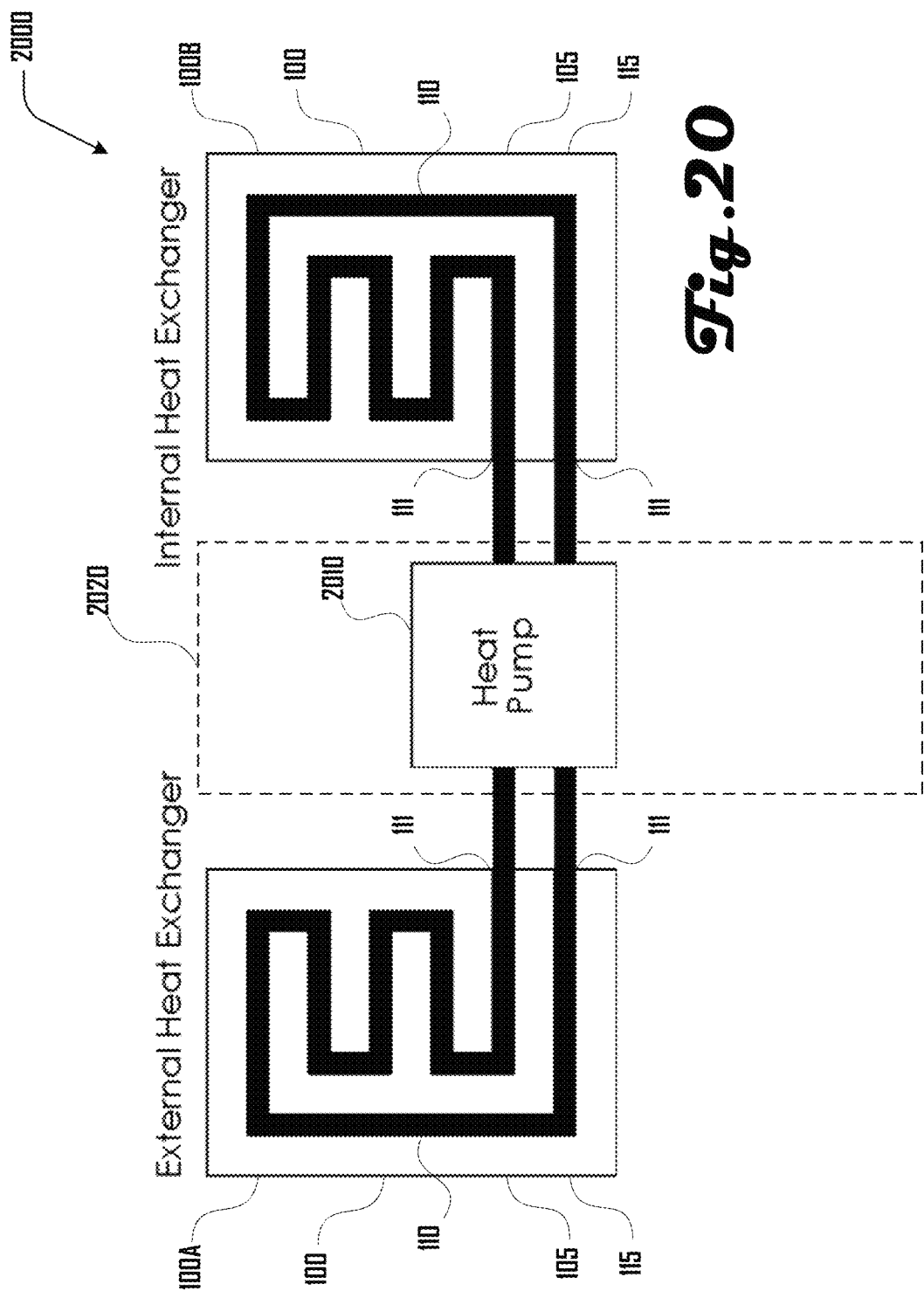

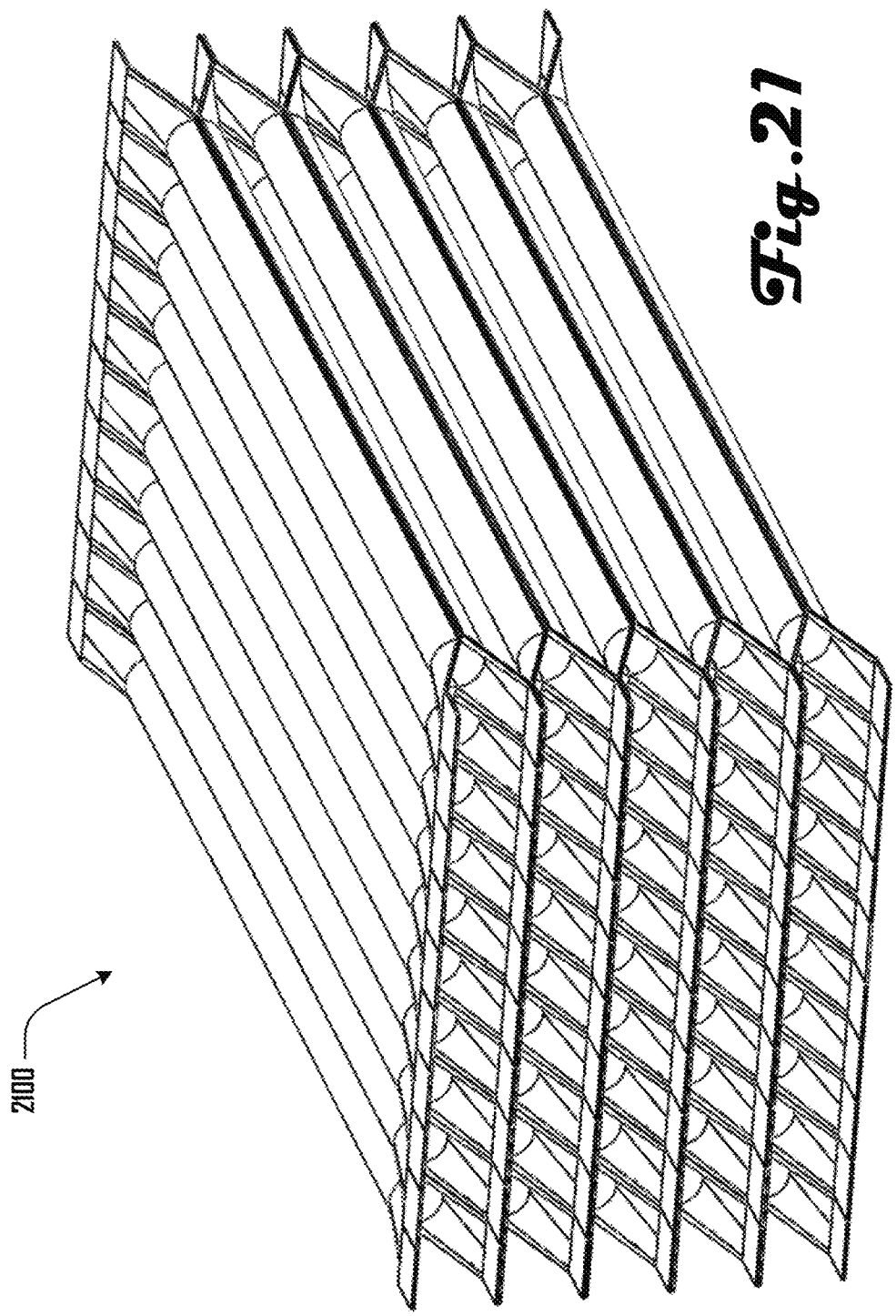

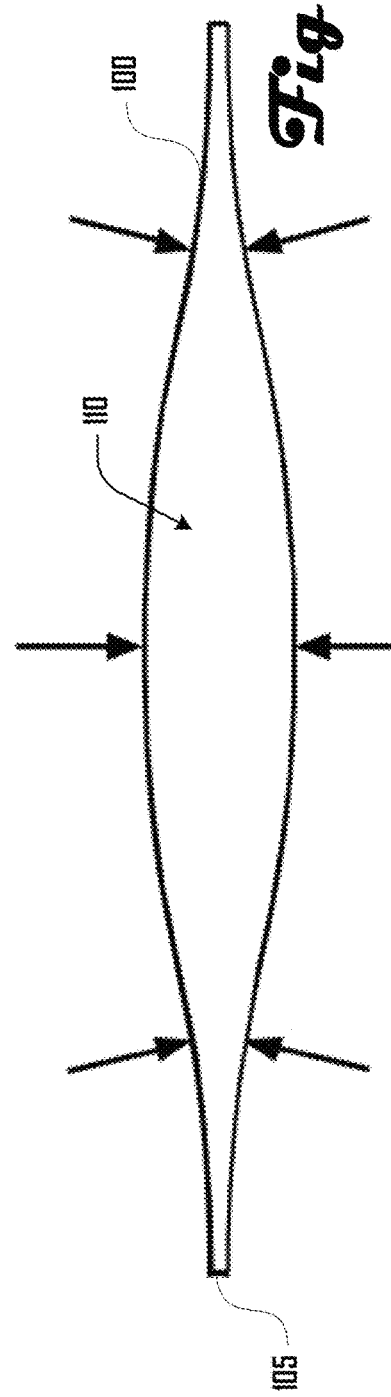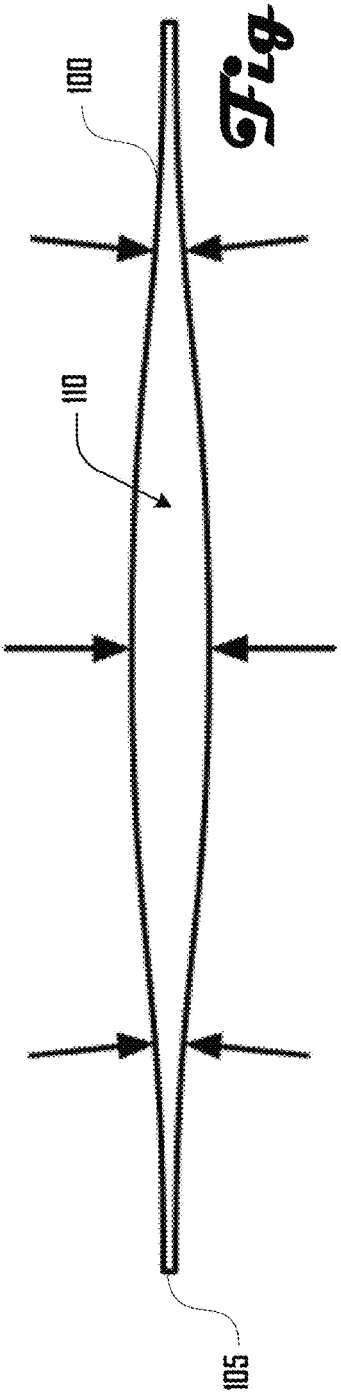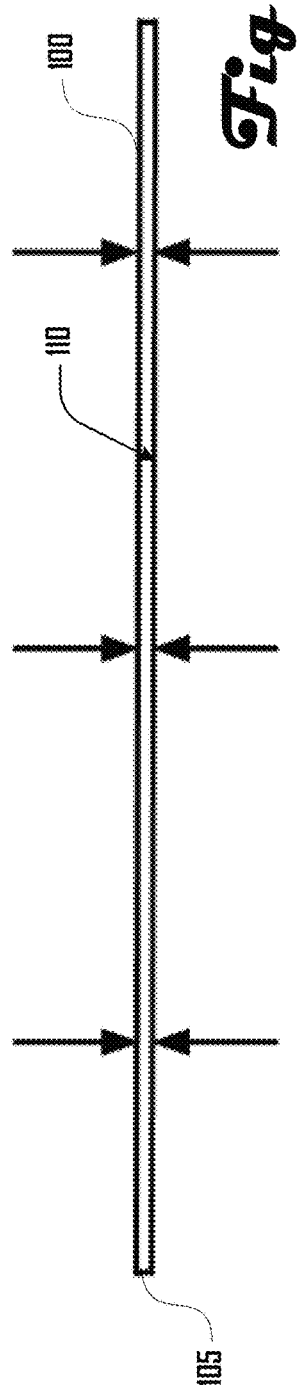

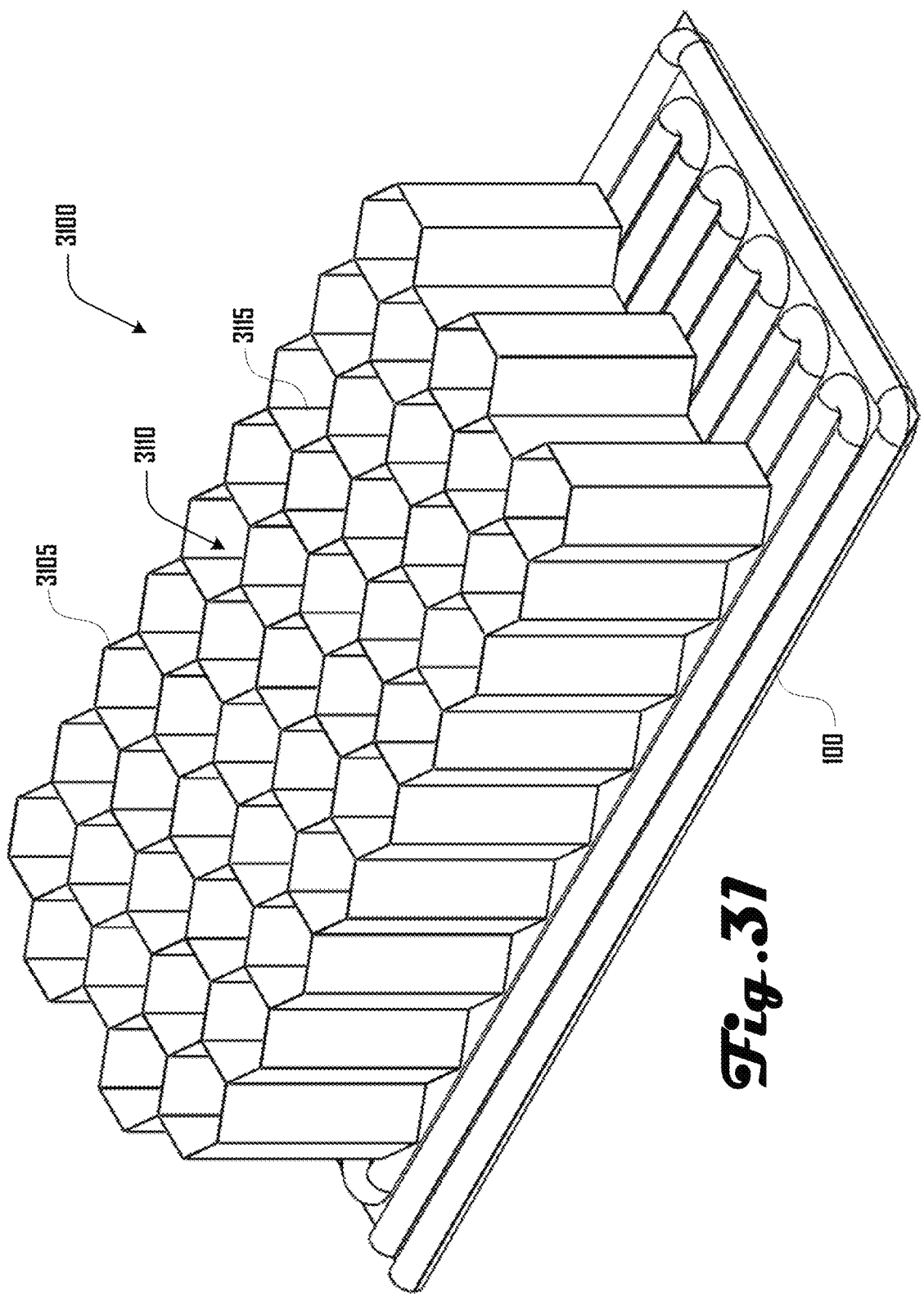

HEAT EXCHANGER ARRAY SYSTEM AND METHOD FOR AN AIR THERMAL CONDITIONER

CROSS-REFERENCE TO RELATED APPLICATIONS

This application is a continuation of U.S. application Ser. No. 15/161,029 filed May 20, 2016, which is non-provisional of and claims priority to U.S. Provisional Application No. 62/164,443, filed May 20, 2015, entitled "Membrane Heat Exchanger System and Method" which application is hereby incorporated herein by reference in its entirety and for all purposes. This application is also related to U.S. application Ser. No. 15/161,064 filed May 20, 2016 entitled "Near-isothermal compressor/expander."

BACKGROUND

In various embodiments, the temperature difference $\Delta T$ across a heat exchanger directly equates to a loss in exergy. The Carnot coefficients of performance for heat pumps in cooling and heating systems are:

$$COP_{cooling} = \frac{T_c - \Delta T}{(T_h + \Delta T) - (T_c - \Delta T)} \quad (1)$$

$$COP_{heating} = \frac{T_h - \Delta T}{(T_h + \Delta T) - (T_c - \Delta T)}$$

where $T_h$ and $T_c$ are hot and cold temperatures at either end of the system and $\Delta T$ is the additional temperature difference required to transfer heat to the air through a heat exchanger. However, $\Delta T$ is constrained by the need to exchange heat at a sufficient rate; this heat flux from one fluid, through a wall, into a second fluid is a function of the combined heat transfer due to convection in both fluids and conduction and is given by $$Q = h_1 A \Delta T_1 \quad (3)$$

$$Q = h_2 A \Delta T_2$$

$$Q = \frac{kA\Delta T_3}{t} \Rightarrow Q = \frac{A\Delta T}{\frac{1}{h_1} + \frac{1}{h_2} + \frac{t}{k}}$$

where A is the surface area of the heat exchanger, t is the wall thickness, k is the thermal conductivity of the material, $h_1$ and $h_2$ are the heat transfer coefficients of either fluid, and Q is the heat transfer.

Power plants and other implementations are similarly limited by heat exchanger $\Delta T$ via the Carnot efficiency $$\eta = \frac{T_h - (T_c + \Delta T)}{T_h} \quad (3)$$

In various embodiments, laminar flow heat transfer and flow losses are approximated by $$Q = \frac{NukA\Delta T}{d} \quad (4)$$

$$P_{fan} = \frac{SA\mu v^2}{d}$$

where $N_u$ is the Nusselt number, d is the effective tube diameter, $P_{fan}$ is the required fan power, $\mu$ is the viscosity, and v is the fluid velocity.

The heat transfer rate in a heat exchanger can be directly proportional to the surface area in the heat exchanger. Increasing the surface area can increase the overall heat transfer, thereby increasing performance. This can be impractical with conventional heavy metallic heat exchangers. Additionally, conventional metallic heat exchangers become fragile and corrosion sensitive at small thickness.

Metallic fin-and-tube heat exchangers, similar to automotive radiators, are the current standard for conventional heat exchangers. Most metals have high densities and become fragile and corrosion sensitive at thin film thicknesses. Thus, metallic heat exchangers are heavier and more expensive than otherwise required for a given operating pressure or desired heat transfer rate, and typically rely on high-power fans which reduce efficiency.

In view of the foregoing, a need exists for improved membrane heat exchanger systems and methods in an effort to overcome the aforementioned obstacles and deficiencies of conventional systems.

BRIEF DESCRIPTION OF THE DRAWINGS

FIG. 7a illustrates an example embodiment of a printer configured for roll-to-roll printing of fluidic chambers.

FIG. 7b illustrates an embodiment of a full roll laser welder.

FIG. 7c illustrates an embodiment of a processing unit and final assembly table.

FIG. 9 illustrates a plurality of membrane heat exchangers configured together into a cross-flow heat exchanger array.

FIG. 16 illustrates a further embodiment of a membrane heat exchanger that can form a portion of a heat exchanger assembly.

FIG. 17 illustrates a further embodiment of a membrane heat exchanger that comprises a circular housing that surrounds a fan assembly and defines a flow cavity.

FIGS. 18a, 18b, 19a, 19b and 20 illustrate various embodiments of membrane heat exchanger systems.

FIG. 21 illustrates an example heat exchanger that can be deployed in a desalination system.

FIGS. 25a, 25b and 25c illustrate chambers that comprise fluid such as a gas that can be squashed flat when the membrane heat exchanger is compressed.

FIG. 31 illustrates an array of elongated shielding channels that are normal to the surface of a radiator or membrane heat exchanger and are reflective, effectively acting as a short distance light-pipe for passing radiation to space.

Figure 1A:
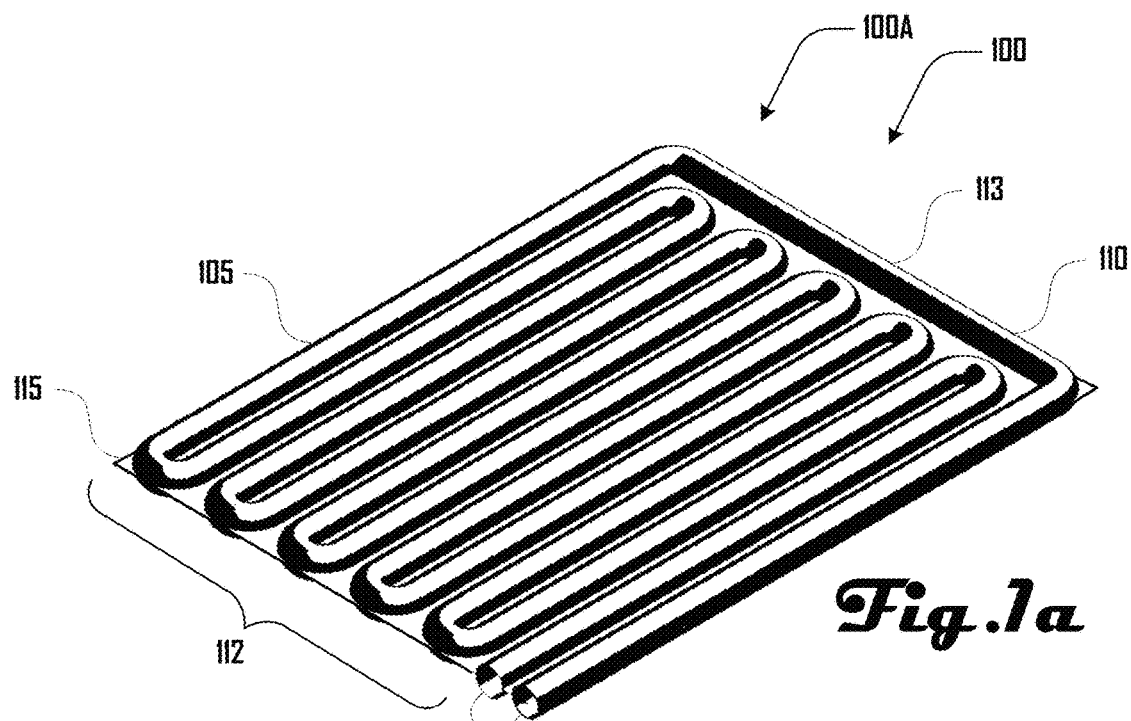
FIGS. 1a, 1b, 2a and 2b are example perspective drawings illustrating various embodiments of a membrane heat exchanger.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 1B:
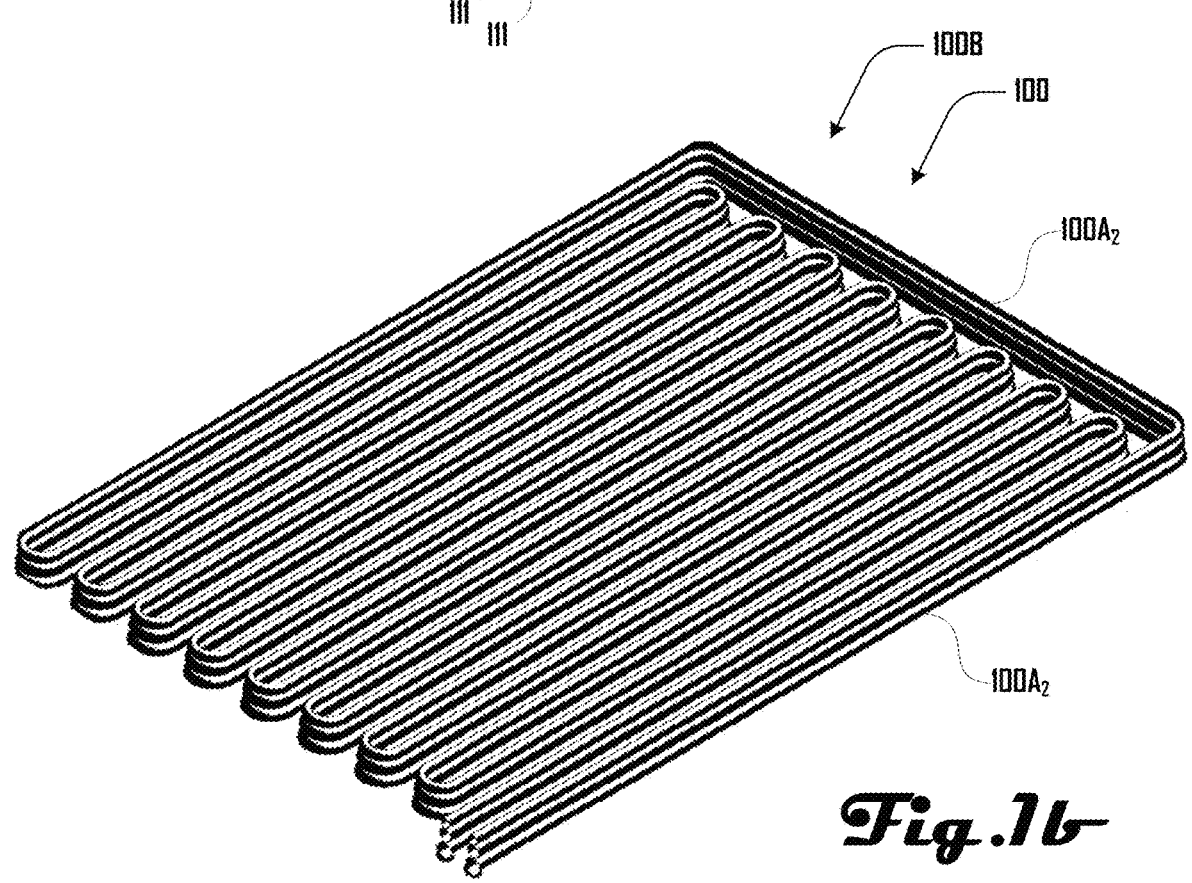

Turning to FIG. 1a, a first embodiment 100A of a membrane heat exchanger 100 is shown as comprising a body 105 that includes an elongated chamber 110 disposed within a sheet portion 115, with the chamber 110 extending from both sides of the body 105. The chamber 110 includes a pair of ends 111 with a snaking or switchback portion 112 and a wrapping portion 113 that surrounds the switchback portion 112 such that the ends 111 are disposed proximate to each other. FIG. 1b illustrates an alternative configuration 100B wherein a trio of the structures 100A of FIG. 1a are disposed in a stacked arrangement.

Figure 2A:
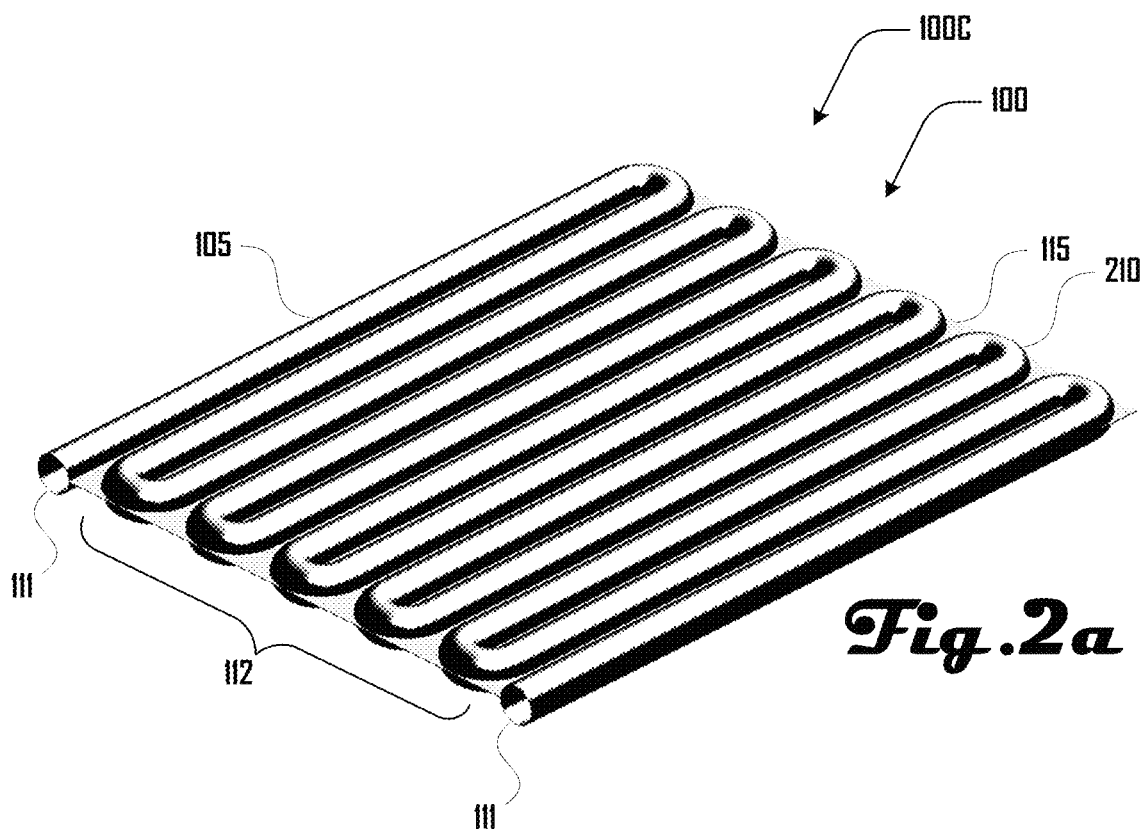
Figure 2B:
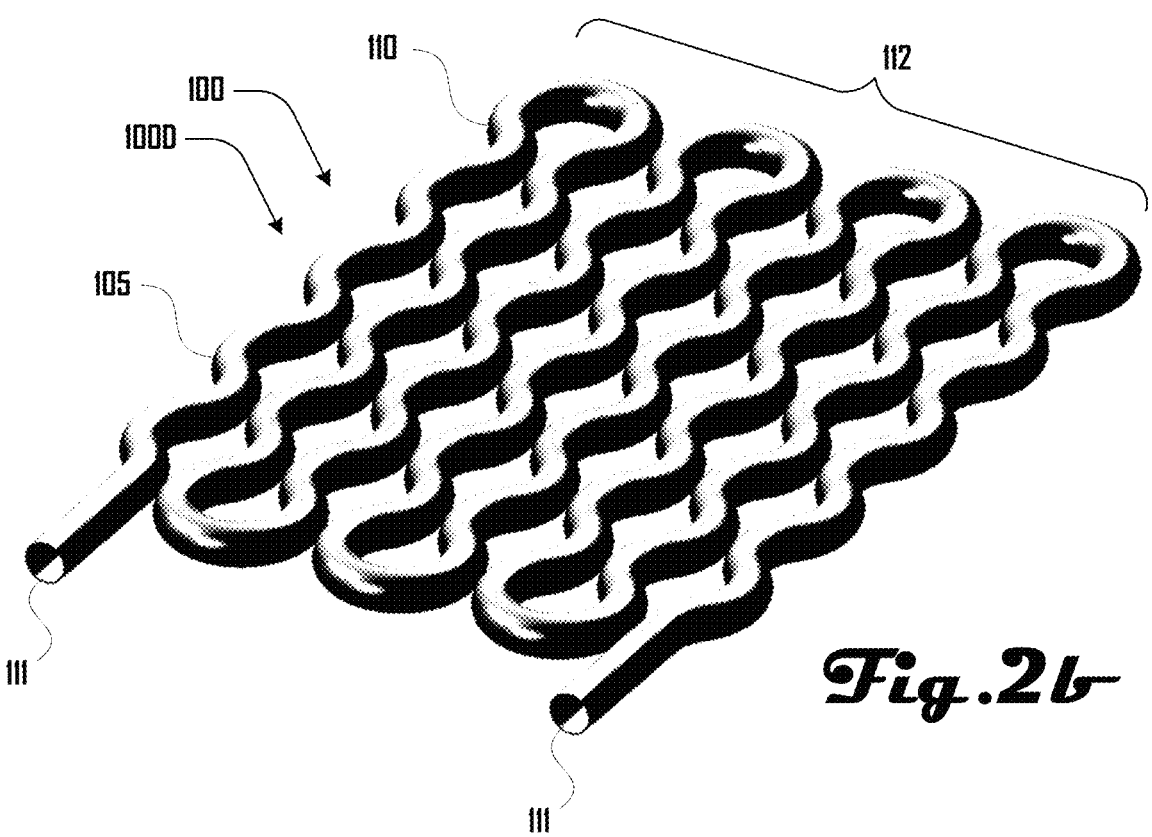

FIG. 2a illustrates a further embodiment 100C of a membrane heat exchanger 100 that is similar to the embodiment of FIG. 1a, but without the wrapping portion 113. Accordingly, the ends 111 of the chamber 110 are disposed on opposing ends of the switchback portion 112. FIG. 2b illustrates a further example embodiment 110C, wherein the elongated portions of the switchback portion 112 are not linear as shown in FIGS. 1a, 1b and 2b and instead define a wave configuration.

As discussed in more detail herein, some embodiments of a membrane heat exchanger 100 can be defined by first and second thin-film polymer membrane sheets that are stacked and coupled together to define a chamber 110 having at least a first and second end 111. For example, FIGS. 3a-c and 4a-c illustrate two example embodiments 100E, 110F of such a membrane heat exchanger 100.

Figure 3A:
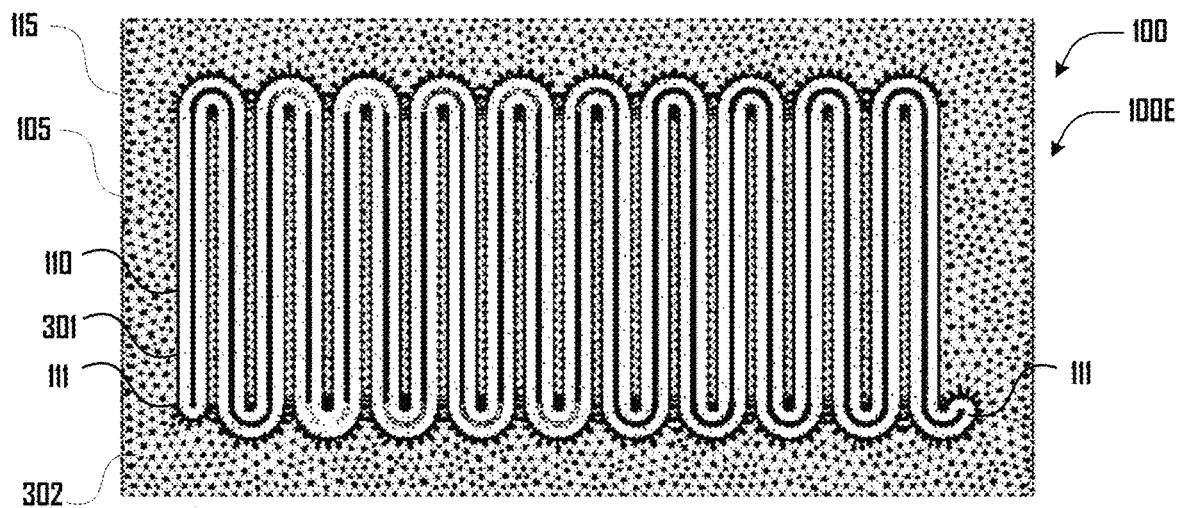
FIGS. 3a and 3b illustrate a further embodiment of a membrane heat exchanger in a flat configuration and FIG. 3c illustrates the membrane heat exchanger of FIGS. 3a and 3b in an expanded configuration.
Figure 3B:
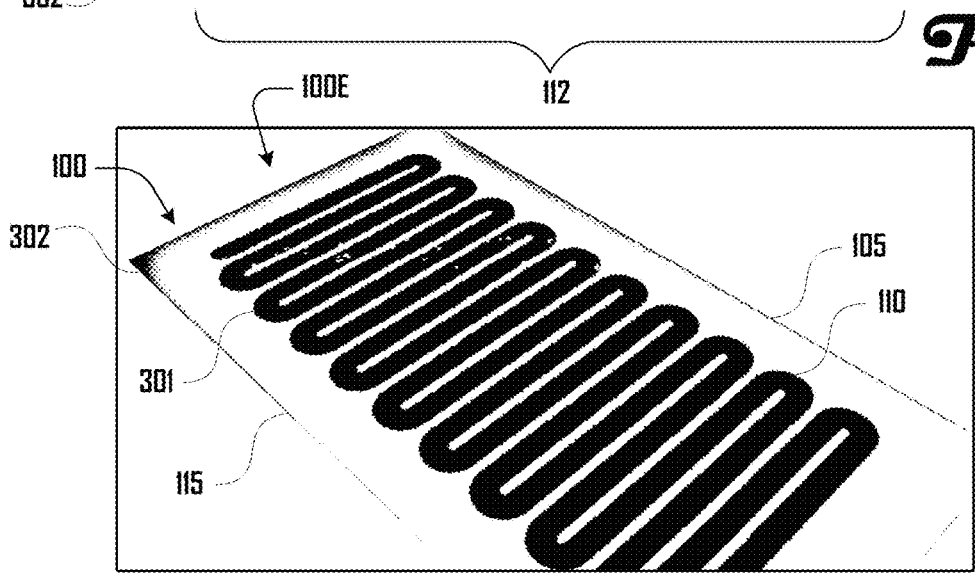
Figure 3C:
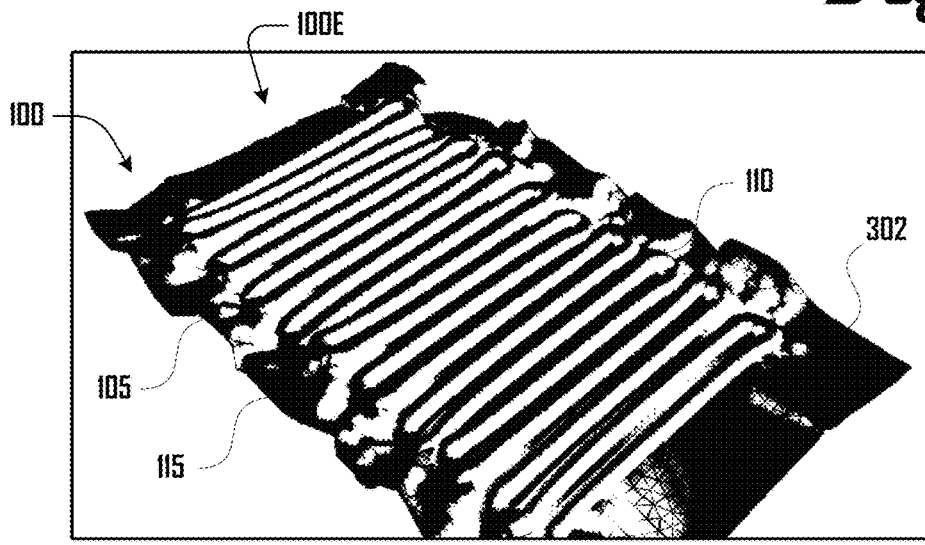

Turning to FIGS. 3a and 3b, top and perspective views of the membrane heat exchanger 100E are illustrated in a flat configuration, with the chamber 110 being defined at least by a seam 301, which joins a pair of sheets 115. The planar portions of the membrane heat exchanger 100 between the chamber 110 can be defined by a planar coupling 302 between a pair of sheets 115. FIG. 3c illustrates an example of the membrane heat exchanger 100E in an expanded configuration, wherein the chamber 110 is expanded by fluid filling the chamber 110. In this example, the sheet(s) 115 are shown deforming due to the chamber 110 being filled with fluid.

Figure 4A:
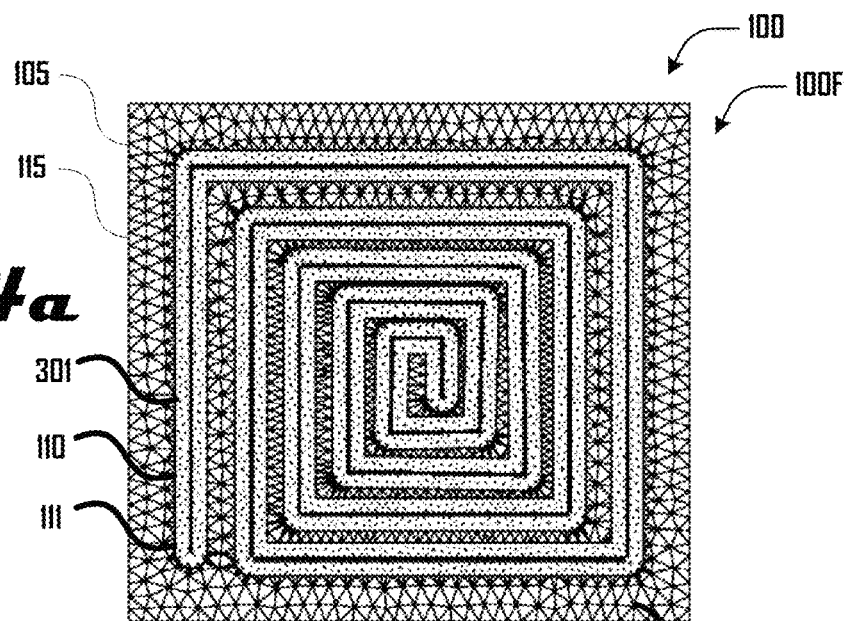
FIGS. 4a and 4b illustrate a further embodiment of a membrane heat exchanger in a flat configuration and FIG. 4c illustrates the membrane heat exchanger of FIGS. 4a and 4b in an expanded configuration.
Figure 4B:
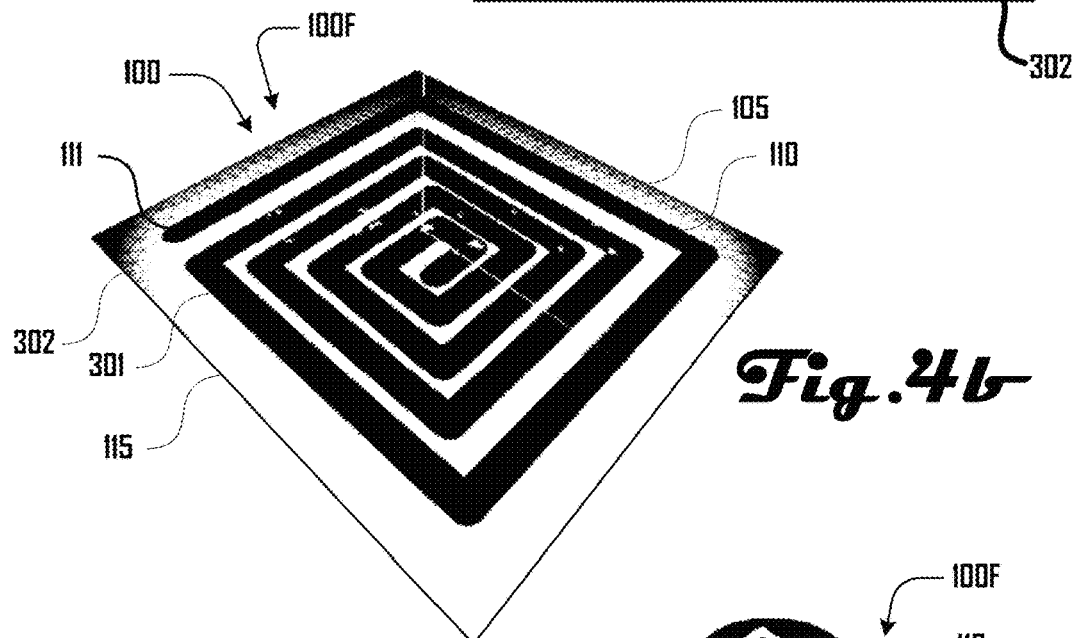
Figure 4C:
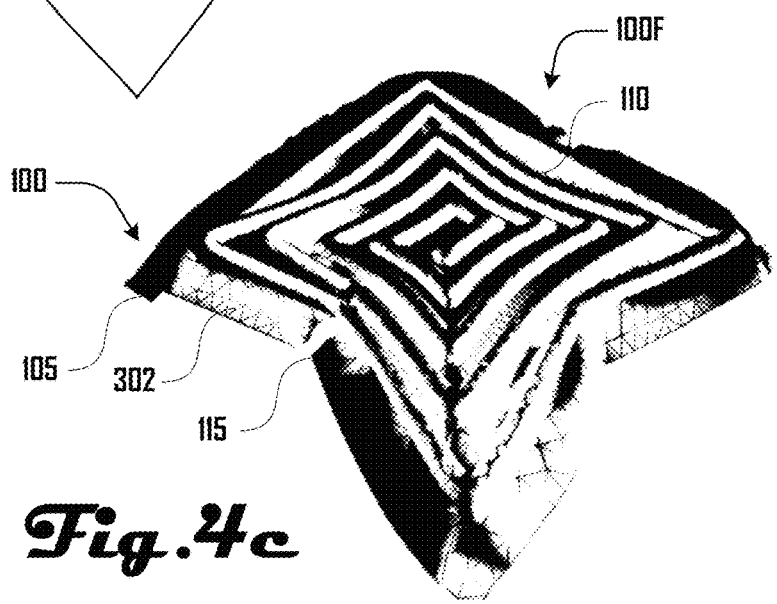

FIGS. 4a-c illustrate a further example embodiment 110F of a membrane heat exchanger 100 that can be defined by a pair of sheets 115, coupled together by a planar coupling 302 and/or seam 301. In this example, the chamber 110 rectangularly coils from a peripheral portion of the membrane heat exchanger 100E to a central portion of the membrane heat exchanger 100 with the ends 111 of the chamber 110 being respectively disposed at the peripheral and central portions.

Figure 5A:
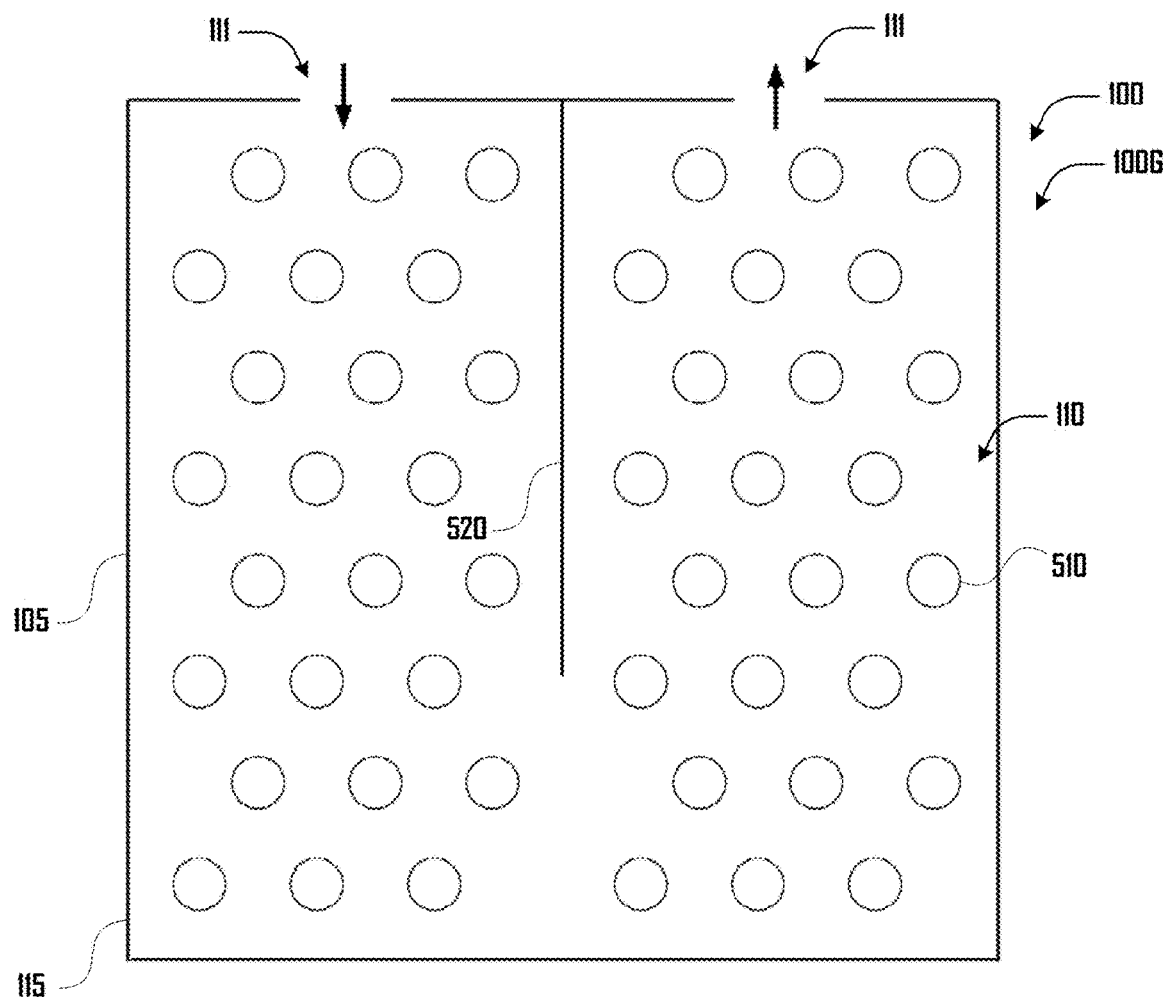
FIGS. 5a and 5b illustrate yet another embodiment of a membrane heat exchanger.
Figure 5B:
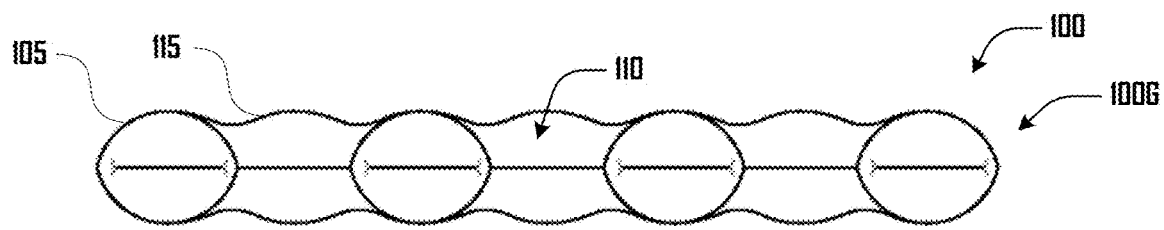

Although specific embodiments of membrane heat exchangers 100 and chambers 110 are discussed above, further embodiments can have chambers 110 of any suitable size, shape and configuration and the present examples should not be construed to be limiting on the wide variety of configurations of membrane heat exchangers 100 that are within the scope and spirit of the present disclosure. For example, FIGS. 5a and 5b illustrate an example of a pillow-plate heat exchanger 100G in accordance with an embodiment, which includes a planar body 105 that comprises a chamber 110 defined at least in part by a plurality of dimples 510 and a bifurcating seam 520 that couples opposing sheets 115.

Figure 6A:
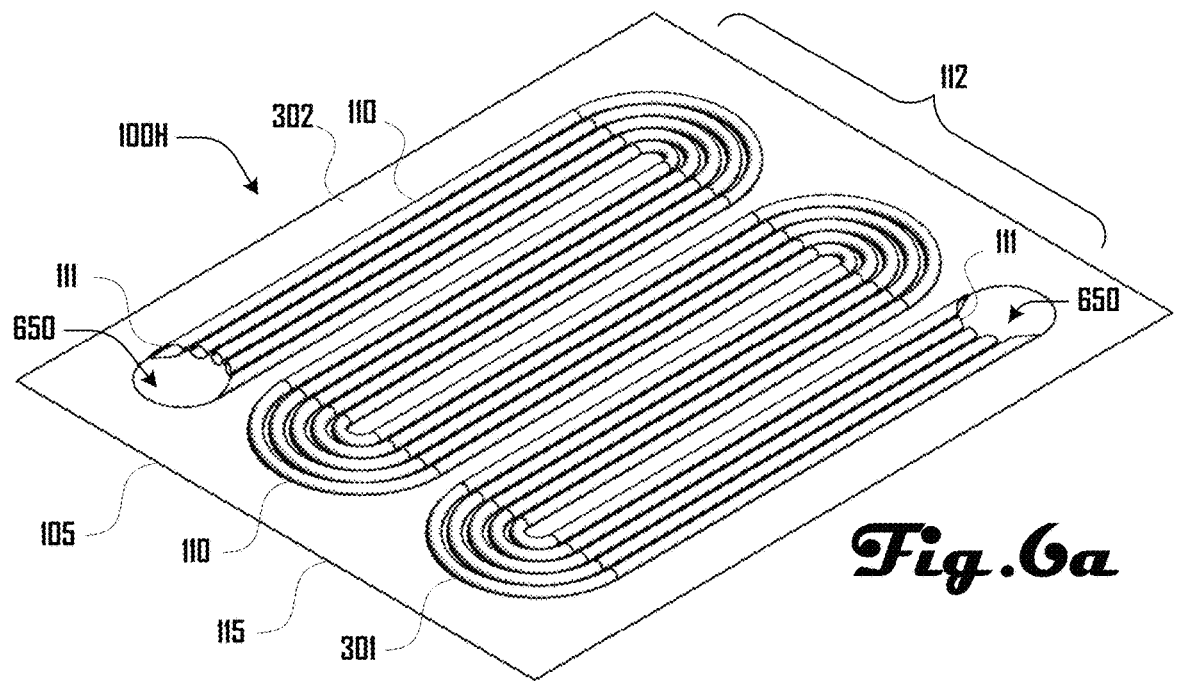
FIGS. 6a and 6b illustrate still further embodiments of a membrane heat exchanger.
Figure 6B:
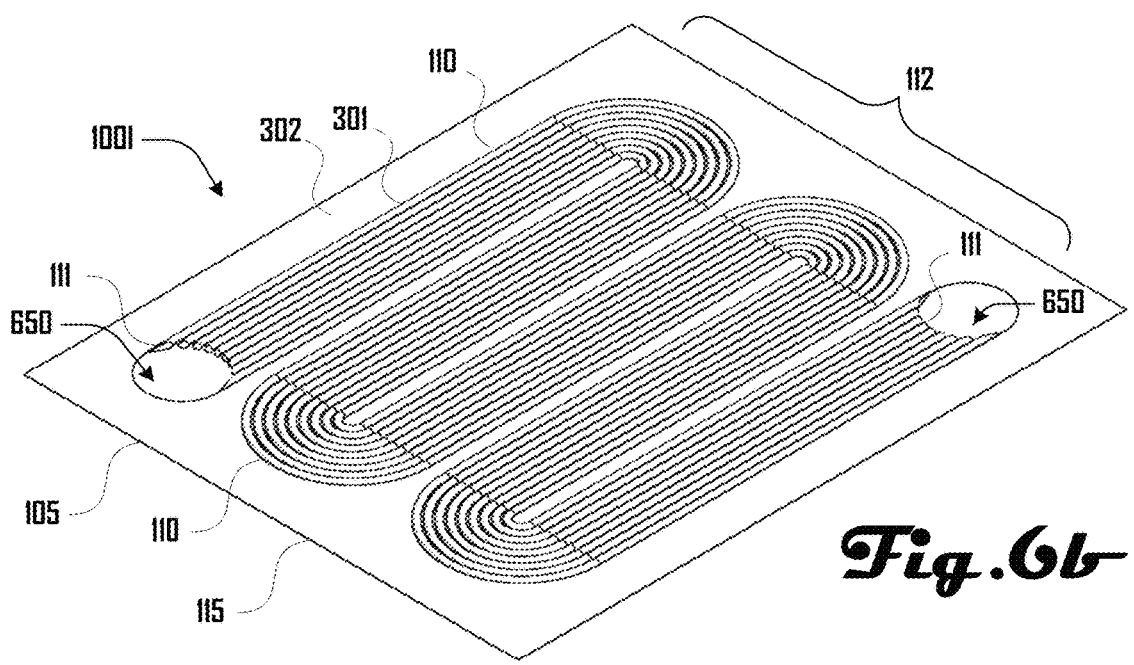

Additionally, while various embodiments described herein illustrate a membrane heat exchanger 100 having a heat exchanger body 105 that defines a single chamber 110 with a pair of ends 111; in further embodiments, a heat exchanger body 105 can define a plurality of chambers 110. For example, FIGS. 6a and 6b illustrate example embodiments 100H, 100I of a membrane heat exchanger 100 that comprises five and nine chambers 110 respectively. In these example embodiments 100H, 100I a plurality of nested chambers 110 are illustrated in a switchback configuration 112 with respective ends 111 of the chambers 110 terminating at respective ports 650 disposed on opposing corners of the heat exchanger body 105. As discussed herein, the chambers 110 can be defined by seams 301 and/or planar coupling portions 302 that couple a pair of opposing sheets 115.

Accordingly, various embodiments of a membrane heat exchanger 100 can comprise of a plurality of small and thin-walled chambers 110 instead of heavy, metal tubes with soldered-on fins as in conventional heat exchanger systems. Thus, various embodiments of a membrane heat exchanger can be configured to decrease ΔT while keeping Q constant by increasing the surface area A, which can be achieved (without increases to mass and cost) by a small thickness t.

By Equation 2, low thermal conductivity materials can be used in some embodiments of heat exchangers 100 by using a small thickness t. Based on hoop stress, the wall thickness required to hold a given pressure can be:

t=(Pressure·Tube radius)/Material stress    (5)

In various embodiments, chambers 110 of a small radius can generate lighter and cheaper membrane heat exchanger 100 with better thermal conduction compared to conventional heat exchangers. For example, in various embodiments, four times as many chambers 110 of half the diameter doubles heat transfer for the same system mass/cost. Diameters of chambers 110 in the 1-10 mm range can be provided in accordance with some embodiments, with surface heat transfer coefficients h of around 50-100 W/(m$^2$K) for air, and 5,000-10,000 W/(m$^2$K) for flowing water and the condensing and evaporating of water.

Membrane heat exchangers 100 can comprise various suitable materials, including polymers, and the like. In one preferred embodiment, Polyethylene terephthalate (PET) films can be used, which in some implementations can have strengths as high as 200 MPa or more and thermal conductivities k in the 0.15-0.4 W/(mK) range, depending on additives. From Equation 5, in some embodiments, a desired wall thickness is t=0.005 mm for a safe working stress of 30 MPa, tube diameter of 3 mm, and an operating pressure of 0.1 MPa (one atmosphere)(other suitable thicknesses can be employed in further embodiments). Thus k/t≈30,000-80,000 W/(m$^2$K), is higher than the above surface heat transfer coefficients h, so by Equation 2 the relatively low thermal conductivity of a thin PET film is not a limiting factor for performance in various embodiments.

Accordingly, embodiments that employ thin film polymer membranes can enable a substantial increase in surface area and heat exchanger performance. In other words, while polymers can have lower thermal conductivities k than metal, their thickness can be made small enough that t/k is small relative to $1/h_1$ and $1/h_2$.

As discussed herein, the heat transfer rate in a membrane heat exchanger 100 can be directly proportional to the surface area of the membrane heat exchanger 100. Accordingly, increasing the surface area can increase the overall heat transfer, thereby increasing performance. In various embodiments, computer-controlled manufacturing and polymer processing can enable the fabrication of membrane heat exchanger 100 with thin walls and small masses, enabling increased surface areas while maintaining effectiveness of the membrane heat exchanger 100.

Accordingly, various embodiments discussed herein can use thin polymeric membranes for high surface-area membrane heat exchangers 100, loaded within appropriate safety factors of the hoop-stress limit. In some embodiments, such a configuration can be enabled via patterned chambers 110 which can be generated via laser processing of pairs of sheets as discussed herein.

Using computer-controlled manufacturing tools, a number of fabrication options available with thin polymeric membranes, which can be amenable to rapid-prototyping as well as production. Additionally, the resilience of polymeric materials enables their use in various embodiments even when processed into very thin films—i.e., films thin enough to have negligible impact on the heat transfer rate across them.

For example, the heat transfer rate, Q, across a heat exchanger can be shown to be:

$$Q = h_0 A \Delta T_{LM} = \frac{A \Delta T_{LM}}{\frac{1}{h_w} + \frac{1}{h_a} + \frac{t}{k_m}} \quad (1)$$

where $h_0$ is the overall heat transfer coefficient, A is the surface area of the heat exchanger, $\Delta T_{LM}$ is the logarithmic mean temperature difference across the heat exchanger, $h_w$ is the heat transfer coefficient of the hot-fluid that is being cooled, $h_a$ is the heat transfer coefficient of the cooling air, $k_m$ is the thermal conductivity of the membrane barrier wall between the two fluids, and t is the thickness of that barrier.

In some embodiments, increasing the overall heat transfer in a membrane heat exchanger 100 can be brought about by increasing the surface area of the membrane heat exchanger 100 and/or increasing the overall heat transfer coefficient. In an air-cooled heat membrane heat exchanger 100 the overall heat transfer coefficient can be dominated by the heat transfer coefficient of the air and there is little opportunity to increase the value of $h_0$. However, the low density and thin walls of a membrane heat exchanger 100 can allow the surface area to be greatly increased which can improve performance.

Numerically, $h_w \gg h_a$, so for a membrane heat exchanger 100 with liquid on one side and air on the other, the $1/h_w$ term is very small compared to $1/h_a$. Metals typically have good thermal conductivity (around 10-400 W/mK), so in conventional heat exchangers the $t/k_m$ term can also be ignored compared to $1/h_a$. For many polymers, thermal conductivity may be smaller, (e.g., 0.1-0.4 W/mK) but by providing a barrier less than 1 mm thick, the $t/k_m$ term is still small compared to $1/h_a$, meaning that the polymer wall will not significantly impede heat transfer through the heat exchanger compared to a metal wall. Therefore, for a given desired rate of heat transfer, ΔT can be decreased in some embodiments, provided that the surface area can be proportionally increased.

While low thermal conductivity materials can be used in heat membrane heat exchangers 100 if their thickness is very low, the wall thickness can specified by the requirement to withstand the pressure forcing fluid through the chamber(s)

110 of the membrane heat exchanger 100. Based on hoop stress, the wall thickness required to hold a given pressure is:

$$t = \frac{pr}{\sigma} \quad (2)$$

where p is the pressure in the tube, r is the radius of the tube, and σ is the operating stress.

If we assume an example polymer film thickness of 0.1 mm (4 mil), high-density polyethylene (HDPE) with a maximum stress of 25 MPa and a working stress of 5 MPa, a 4 mm diameter tube can have a burst pressure of 1.25 MPa (180 psi), and a working pressure of 0.25 MPa (36 psi). Given a high-density polyethylene HDPE density of 970 kg/m³ this polymer film would have a mass of 0.097 kg/m². In further embodiments, higher strength polymers can be used and/or tube diameters can be reduced. This indicates that such embodiments of membrane heat exchangers 100 can be mechanically resilient in addition to thermally responsive.

For the air side of the heat exchanger, the heat transfer rate, Q, can constrain the air mass flow rate, m, $$Q = mc_p \Delta T_a \quad (3)$$

where $c_p$ is the specific heat capacity of air, and $\Delta T_a$ is the difference in temperature between the air entering and exiting the heat exchanger. Increasing mass flow across the heat exchanger surface can be accomplished through increased air velocity, but that brings with it increased power consumption, which may not be desirable. Assuming laminar flow, the fans power consumption depends on the square of the linear velocity of the air, $$P = (8A\mu v^2)/d \quad (4)$$

where v is the air velocity through the heat exchanger, d is the effective diameter of the air flow passage, μ is the viscosity of the fluid, and A is the surface area of the heat exchanger. Increasing the heat exchanger area can increase the flow resistance and thus the fan power for a given velocity, however the air velocity can be reduced by increasing the cross-sectional area accepting the airflow. Since fan power can be proportional to the cross sectional area but also to the square of velocity, the trade-off of increased area for decreased velocity can result in a net reduction in fan power.

At small or large scale, embodiments of membrane heat exchangers 100 can be made using manufacturing techniques and by optimization of the geometric design, fluid connections, and pumping controls. By moving to small diameter chambers 110 and thin materials, a large number of parallel linear flow paths can be enabled in various embodiments (e.g., as illustrated in FIGS. 6a and 6b). In one example manufacturing process, a computer-controlled laser welding process can be used to generate arrays of chambers 110 from the controlled welding of two plastic sheets.

Accordingly, various embodiments comprise the use of thin polymers for membrane heat exchanger construction and the manufacture of such membrane heat exchangers 100 using computer-controlled plastic welding system. The use of a plurality of narrow chambers 110 made from thin polymer films in some embodiments can create a barrier between heated water and cooling air that is thin enough such that the thermally non-conductive polymer only minimally impacts the overall heat transfer coefficient. Combined with research in computer-controlled laser welding, these membrane heat exchangers 100 can be rapidly prototyped and provide for volume production, as well. The use of low cost, low weight polymers and high-throughput manufacturing enables embodiments of the membrane heat exchangers 100 to have larger heat exchange areas for less cost, leading to favorable coefficients of performance.

Various embodiments can comprise computational, physics-based optimization tools for polymeric heat exchanger design. For example, some embodiments include software tools for membrane heat exchanger 100 design optimization.

Further embodiments include a laser processing manufacturing method that enables high geometric and three-dimensional complexity from two-dimensional patterns produced rapidly and cost effectively. Some embodiments can provide for large area and continuous fabrication. Still further embodiments can include 20-year heat exchanger lifetimes for the selected materials.

Some embodiments comprise computer-controlled fabrication methods for welding and cutting polymer films into intricate fluidic networks and structures, for rapid prototyping and commercial production. Further embodiments comprise computational modeling and optimization of fluidic networks and membrane patterns to minimize flow restrictions and maximize thermal transfer.

TABLE 1

Specification of an example 20 kW system.

| Parameter | Calculated | Required |
|---|---|---|
| Heat transfer rate Q | 23.6 kW | 20 kW |
| Pump power | 18.1 W | |
| Fan power | 39.0 W | |
| Total pump and fan power | 57.1 W | |
| COP | 350.6 | >200 |
| Effectiveness ε | .65 | >.6 |
| Overall heat transfer CoE | 66. W/m²K | |
| Surface area | 33. m² | |

Still further embodiments leverage materials science and chemistry of polymer thin films, working with resin and additive manufacturers, to develop materials with optimized thermal properties, long functional lifetimes, controlled surface chemistry, and robust processability. Accordingly, various embodiments can comprise computationally enabled heat exchanger design and optimization, selection of robust materials amenable to inexpensive and ultimately high-throughput fabrication, and careful performance and lifetime testing and characterization. For example, computational modeling and optimization can be used to design cooling fluidic networks that optimize air and coolant flow geometries for maximal thermal transfer and increased system efficiency.

Creation of three-dimensional networks of chambers 110 from sheets of two-dimensional film can be modeled and simulated, including simulating the filling or inflation of these networks to get net three-dimensional geometry. Such two-dimensional models can be physically produced via laser film processing utilizing a roll feed CNC laser cutter and welder as discussed in further detail herein (see e.g., FIGS. 20a-c and FIGS. 21a-b). Some embodiments can comprise surface chemistry modifications to improve weld, lamination, or the like. Additives can be selected for improved material processing, heat exchanger performance, and the like.

In some embodiments, membrane heat exchangers 100 can comprise a thin metallic foil. Such metal membrane heat exchangers 100 can be constructed/welded in a similar manner to the polymer heat exchangers discussed herein. Metal heat exchangers can be advantageous for automatable construction and higher temperature operation.

For determining the design of membrane cooling networks or chambers 110, in some embodiments, a parametric geometry authoring environment can be used, incorporating simulation of the fundamental requirements of the system—necessary pumping and fan power, heat transfer performance, material cost, and the like. While these (and other relevant parameters such as total internal volume, total bounding volume, etc.) can be dynamic "in the loop" calculations from a given geometry which the author can use as a metric for analysis, they can also be specified as design inputs, and an integrated constrained optimization can suggest geometries and properties which optimally satisfy the application-specific efficiency and cost targets.

The underlying coolant flow model for this simulation and optimization layer can incorporate laminar and/or turbulent incompressible flow. On the liquid side, the pumping power and the convective heat transfer coefficient can be determined by employing equations of internal, incompressible flow, for both the laminar and turbulent cases, where, in the turbulent case, empirical relations can be used for friction factor in determining head loss. Computational fluid dynamics (CFD) topology optimization methods and genetic algorithms can be built on top of this model to produce optimal tube geometries.

One model of the forced-air side of the boundary can be used for informing high-level geometry and flow configuration decisions with reasonably low latency. In some embodiments, in can be beneficial to have a more sophisticated high-resolution model for specific concerns, such as fine-tuning optimal spacing between the coolant tubes and layouts for efficient airflow. Such a model may more accurately quantify local liminal heat transfer coefficients, particularly when the airflow is perpendicular or at various angles to the coolant tubes, as well as account for the possibility of non-negligible hydrodynamic and thermal entry lengths. Such a model can be run offline, and may not be used at the integrated optimization stage in some embodiments, and as such could be chosen from a range of professional-grade commercially available computational fluid dynamics software.

As illustrated in FIGS. 3c and 4c, filling a membrane heat exchanger 100 can change the shape of the body 105 by including the introduction of local buckling and bending. In various embodiments, such geometric contortions may need to be accounted for and compensated for in the design of the membrane heat exchanger 100. Such software can model net shape membrane structures under filling and environmental loading, and can further include more sophisticated analysis tools, visualization, and coupling of simulation to real-world performance.

Example software for solving the net shape geometry problem of constructing and engineering a machine from flexible sheets can include simulation of an unloaded membrane heat exchanger 100 and a simulated net shape of the membrane heat exchanger 100. The shrinking along the long axis caused by filling the tubes with a virtual fluid is apparent as is the buckling of the sheets along the edges as shown in FIGS. 3c and 4c. This modeling can help in the optimization of the design.

Additionally, some embodiments of modeling software can comprise "inverse" inflation simulation. For example, such modeling takes as input a target 3D shape, given either by the designer or by an optimization pass, and produces the rest shape to be manufactured, which for given materials and subject to specified forces, will as closely as possible approximate the target under load.

Membrane or sheet joining methods can comprise mechanical methods, adhesive methods, welding methods, and the like. Mechanical methods such as sewing or clamping/interlocking with rigid parts can be desirable in some embodiments because they can be tolerant processes that are stable across a variety of process parameters. Adhesive bonding can accommodate a wide variety of material combinations and can be carried out at low temperatures in some embodiments.

FIGS. 1a, 1b, 2a, 2b, 3a-c, 4a-c, 5a and 5b illustrate various embodiments of membrane heat exchangers 100, but should not be construed to limit the wide variety of alternative and/or additional shapes, sizes, and structures that are within the scope and spirit of the present disclosure. For example, complicated inflatable geometries can be added to the membrane heat exchanger elements so as to provide structural spacing between adjacent elements. In some embodiments, bubbles can be created within the membrane elements that periodically connect with adjacent heat exchanger elements so as to maintain a given air gap between heat exchanger elements. In some embodiments, an inflated structure of the heat exchanger elements can be used to add stiffness to the heat exchanger elements and thereby reduce the need for external structural support.

Membrane heat exchangers 100 can be fabricated in various suitable ways. For example, FIG. 7a illustrates an example embodiment of a printer 700 configured for roll-to-roll "printing" of fluidic chambers 110 and surface features on an adjoining pair of sheets 710, with the fluidic chambers 110 being at least defined by printed seams 301 as discussed herein. FIG. 7b illustrates an embodiment of a full roll laser welder 701 and FIG. 7c illustrates an embodiment of a processing unit and final assembly table 702.

Figure 8A:
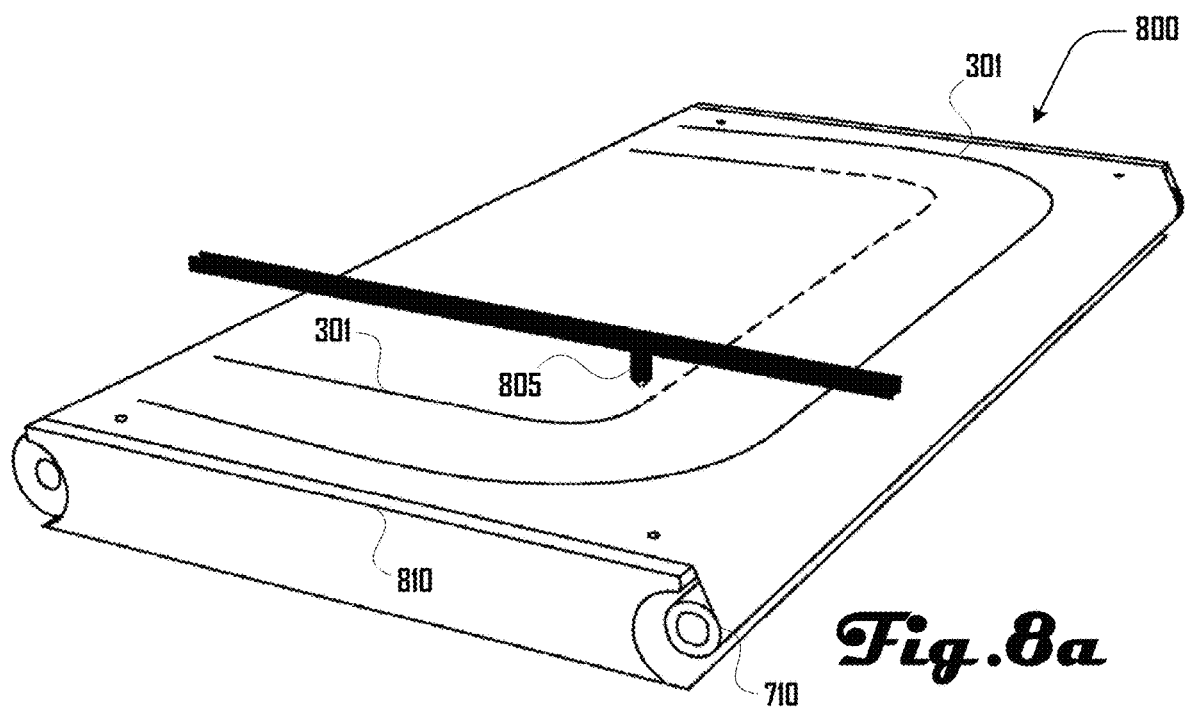
FIGS. 8a and 8b illustrate a welding apparatus in accordance with one embodiment that includes a welding head that is configured to weld seams in an adjoining pair of sheets.
Figure 8B:
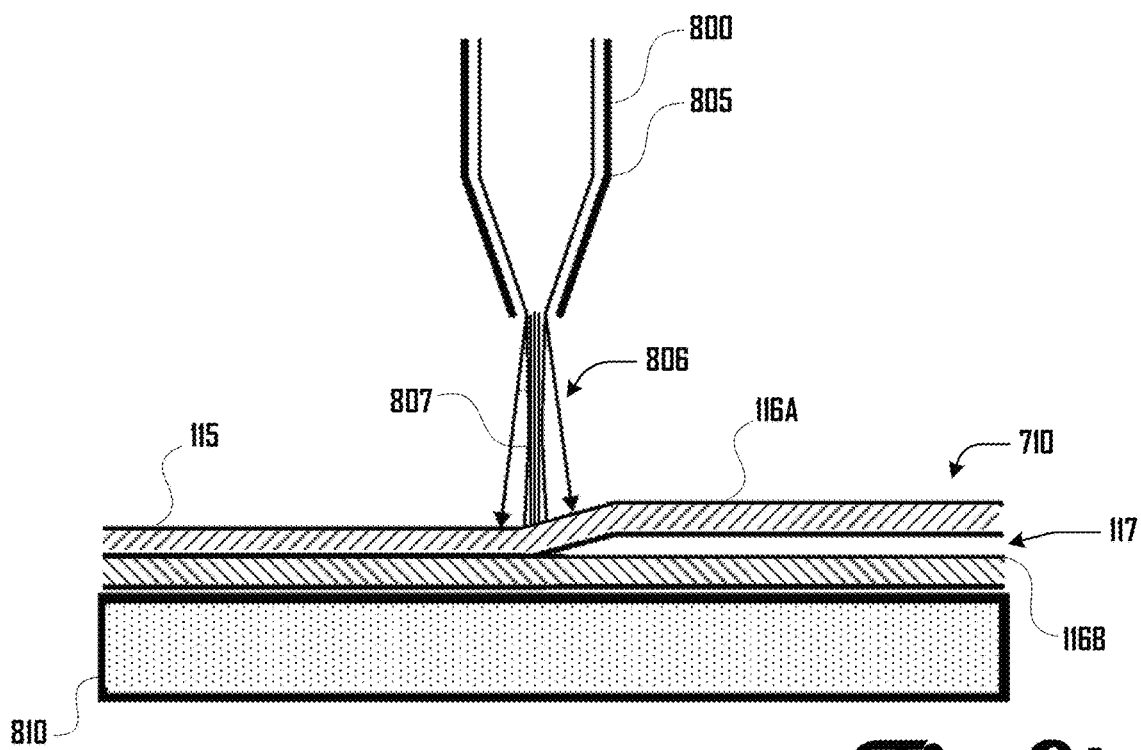

Coupling of sheets 115 to generate seams 301 and/or planar coupled portions 302 of a membrane heat exchanger 100 can be done in various suitable ways as discussed herein including welding. FIGS. 8a and 8b illustrate a welding apparatus 800 in accordance with one embodiment that includes a welding head 805 this is configured to weld seams 301 in an adjoining pair of sheets 710, which are rolled over a welding table 810. As illustrated in FIG. 8b, a first and second sheet 116A, 116B can be disposed on the welding table 810 with a gap 117 therebetween. The first and second sheet 116A, 116B can be pressed together via a pressurized stream of gas 806 from the welding head 805 and a laser 807 can weld the first and second sheet 116A, 116B at a seam 301 and/or planar 302 coupling joint. For example, in plastic welding, two thermoplastic material interfaces 116A, 116B can be brought into direct contact and heated above their melting temperature via the laser 807. Compatible materials can then interlock at a molecular level resulting in a continuous matrix of polymer chains, which generates a seam 301 and/or planar 302 coupling joint.

One challenge in some welding applications is transferring heat to the joint interface at the weld location without degrading the integrity of the surrounding material. For thick-sectioned parts where it can be difficult to transfer heat from the outside accessible surface of the part stack, various suitable methods can be used to generate a weld. For example, one method, called hot plate welding, comprises heating the joint surfaces with the parts separated and then bringing the parts in contact while the joint surfaces remain above the material melt temperature.

Ultrasonic and radio frequency (RF) welding can be used in some embodiments and can comprise transferring vibrations to the joint interface through the accessible outside parts surfaces and directing these vibrations to targeted areas where the weld is required using what are known as energy directors.

Transmissive laser welding can also be used in some embodiments. For example, the energy in a laser beam can be turned into heat when it interacts with a material that is opaque to the wavelength being used. In order to target the heat generated to material interface, in various embodiments, one of the parts must be transparent to the laser wavelength such that the laser beam passes through it and generates heat at the joint interface when it hits the second, opaque material.

Inductive welding can also be used in some embodiments, where an interposing material that heats up in presence of an electromagnetic field is placed at the bond interface and then activated with such a field.

A hot air jet can also be used for welding sheets together in various embodiments. Such a method can serve to both heat and press the membranes together. In various embodiments, the weld-affected zone can further be managed by use of cold air jets. Alternatively and/or in addition, hot fluid jets can be used for welding. With close active surface following, it is possible to get high effective clamping pressures in a similar manner to a static air or hydraulic bearing.

In further embodiments, membrane heat exchanger elements can be thermal/ultrasonic/radio frequency welded and blanked in one process via a stamping type operation with a single tool of the desired shape. This can enable high speed and low cost manufacture of heat exchanger elements.

For welding a pair of sheets 116A, 16B, the volume 117 or gap between the sheets 116A, 16B can be actively evacuated, providing a clamping force, which can be atmospheric pressure or the like. For large surface area membrane heat exchangers 100, cumulative weld length can be high in some embodiments. Accordingly, some embodiments can employ redundant welds, that is, multiple welds side by side, to reduce sensitivity to individual weld defects.

Various suitable welding techniques can be used, in more elaborate forms, to assemble multiple polymer film heat exchanger elements together with integral plumbing pathways. Fluid inlet and outlet fittings and hoses, and the like, can be similarly attached to the assembled heat exchanger elements via suitable welding or coupling methods.

In some embodiments, thin film plastic welding shares many of the same challenges as thick section plastic welding but can have one or more mitigating factors by nature of the thin section geometry. While it can be unfeasible to have direct heat transfer to the accessible surface of a thick section part in some embodiments, in thin film welding, the thickness of the material can be such that this is possible because the through-thickness size of the heat affected zone of the weld is similar to that of the whole material.

This fact enables further suitable methods to be used in some embodiments, including direct thermal welding and direct laser welding. In direct thermal welding, two compatible films can be clamped between a hot tool and anvil such that heat is transferred to the joint, melting the interface and creating a bond. In direct laser welding a laser beam can strike two compatible materials and heat the whole joint thickness.

One example implementation includes a direct laser welding process. Here, two layers of LDPE film can be welded together using a $CO_2$ laser beam. This process was prototyped using a multi-purpose CNC laser cutter. The laser beam was defocused such that a weld of desired width (~1-2 mm) was created between the two film layers. A reflective aluminum layer was placed under the films to make the materials absorb a greater portion of the incident laser beam and the stream of high pressure assist gas used in many laser cutting processes was leveraged to provide a clamping force between the films while the laser energy is delivered. This particular application included parts larger than the bed of the CNC laser available so a reel-to-reel fixture was implemented that fit with the laser cutter such that continuous patterns up to 50' long were created.

Another embodiment can comprise a piece of manufacturing equipment for laser welding and cutting of polymer films. This example machine directly receives 8' long rolls of 2-ply films, and uses a 70 W $CO_2$ laser carried on a 4'×8' CNC gantry to weld the layers together in an appropriate pattern.

In some embodiments, because the laser beam spot size required for welding is an order of magnitude greater than that needed for cutting, a dedicated optics system can be implemented that welds at the laser beam focus position and has low beam divergence which means that the position of the laser beam focus relative to the material position in the out of plane direction (z-axis), can be tolerant to positioning errors. This can reduce the alignment and precision requirements of the CNC structure which has a percolating effect on the cost and complexity of the machine.

Also, because of the lower power needed for welding as opposed to cutting in some embodiments, such embodiments can utilize a lower-cost air cooled laser that can be directly mounted to the CNC gantry as opposed to flying optic systems with a stationary laser source usually used in conventional laser cutters. Additionally, the reel-to-reel material handling functionality required to process films sourced on large rolls can be built into the machine which enables an automated system that can run precisely with minimum user interaction.

Such a system can also be configured to accept various pieces of inspection equipment that can be beneficial for performance applications. A machine vision system and/or laser displacement sensor, can be used to verify the position and/or characteristics of the resulting weld.

Any suitable material can be welded using direct-laser welding. For heat exchanger applications, it can be desirable to select a material that can withstand relatively high operating temperatures and environmental exposure while retaining its resistance to puncture and bulk failure modes such as creep under hoop stress. The development of suitable material/process combinations in conjunction with a design that limits the stress induced within the resulting heat exchanger can give a solution that is low cost and high performance.

A wide variety of additives can be used to tune a material's specific performance, in addition to various lamination, weaving, and multi-material composite approaches that can be utilized to improve the bulk performance of a given film. Accordingly, although direct laser welding using a $CO_2$ laser source can be desirable in some embodiments, alternate welding methods can be desirable in other embodiments.

As discussed above, transmissive laser welding, ultrasonic/RF welding, and the like, can provide advantages by virtue of the ability to generate heat at the weld interface. This can allow for film composites with woven or thermoset functional layers and thin thermoplastic bonding layers needed for welding. In various embodiments, transmissive laser welding can use a fiber laser source with a wavelength of 1 um as opposed to the 10.6 um wavelength of a $CO_2$ laser source. Accordingly, further embodiments can include an ultrasonic/RF welder capable of processing continuous materials in a reel-to-reel format.

Strength can be a desirable property for membrane heat exchangers 100, as a stronger material does not need to be as thick, leading to cost savings and slightly improved thermal transfer. In various embodiments, strong polymers are also the least flexible polymers, and while strength is desired, so is flexibility. Flexibility can improve with thin materials, so in some embodiments, a strong but stiff polymer can be thin enough in one of these heat exchangers to be appropriately flexible. Materials selection can involve balancing the strength and flexibility of the material with the interrelated geometric constraints, including thickness, imposed by the heat exchanger design. In various embodiments, it can be desirable to apply one or more resins to a polymer heat exchanger. Additionally, introduction of additives to a polymer and/or resin can improve lifetime, conductivity, and processability, and the like.

In one preferred embodiment, a heat exchanger can comprise polyethylene terephthalate, (PET, Mylar). In another preferred embodiment, a heat exchanger can comprise high density polyethylene (HDPE), which can be formulated for long lifetimes outdoors. In one embodiment, HDPE can be cross-linked to form PEX, which has improved creep properties over other materials but otherwise retains the strength and flex properties of HDPE.

While various polymers can be quite robust, they can be substantially weakened by creep, and environmental exposure can further weaken or embrittle materials. UV and abrasive particle exposure are potentially detrimental to the heat exchanger, but such exposures can, at least in part, be dealt with through design. For example, the entire device can potentially be built in a light-proof enclosure.

Materials for use in a polymer heat exchanger can be further optimized for welding and/or to withstand the constant stress that a pressurized heat exchanger can experience. Polymer creep can be minimized in some embodiments through appropriate resin selection, polymer cross-linking after welding, additional material structure such as reinforcing fibers, ribs, or supporting scaffolding, or the like.

Fouling can be minimized in some embodiments through the use of salt water, chlorinated water, or another liquid. The chemical resistance of many polymers allows for a range of fluid and additive options. The chemical resistance of some polymers can allow maintenance procedures where the fluid system is flushed to clean out any fouling that has occurred.

While fouling can suggest biological growth, precipitation, or corrosion occurring at an interface with a liquid, it is also possible to have air-borne material foul the surface on the air-side of the heat exchanger. Material deposition and sticking at the heat exchange surface with air is likely controlled by the surface chemistry of the polymer, something that can be controlled through both materials selection and processing. Additionally, as with the liquid-polymer interface, the robustness of the polymer will allow a number of cleaning options to be explored if it is determined that fouling of the air-polymer surface meaningfully decreases performance.

Turning to FIG. 9, in various embodiments, a plurality of membrane heat exchangers 100 can be configured together into a cross-flow heat exchanger array 900, wherein the plurality of membrane heat exchangers 100 are stacked in parallel with a space 905 separating each of the membrane heat exchangers 100. The heat exchanger array 900 can be configured to cool fluid that is passing through the chambers 110 of the stacked heat exchangers 100 by having cold air 901 enter a first end 906 of the spaces 905 separating the heat exchangers 100 such that the cold air 901 passes over the chambers 110. The cold air 901 can receive heat energy from fluid flowing within the chambers 110 of the heat exchangers 100, which heats the cold air 601 as the cold air 601 travels through the spaces 905 separating the heat exchangers 100 such that hot air 902 leaves from a second end 907 of the heat exchanger array 900.

Although this example illustrates air 901 being used to cool fluid passing through the chambers 110 of the stacked heat exchangers 100, in further embodiments, any suitable fluid can be used to heat or cool various suitable fluids passing through the chambers 110. In other words, a liquid or gas can flow through the chambers 110 of a heat exchanger array 900 and be heated or cooled in various embodiments. Additionally, a liquid or gas can flow through spaces 905 of a heat exchanger array 900 to heat or cool a fluid passing through the heat exchangers 100 in accordance with further embodiments.

In various embodiments, membrane heat exchangers 100 can be held in tension via an external compressively loaded structure, providing for a light weight, structurally strong, heat exchanger array 900. In some embodiments, an external membrane element support structure can be subject to mass manufacture and this assembly process can, in many embodiments, be automated. In some embodiments, membrane heat exchanger films can be reinforced with additional layers, enabling strong attachment points and strengthened fluid interconnections between adjacent membrane heat exchanger elements.

Figure 10:
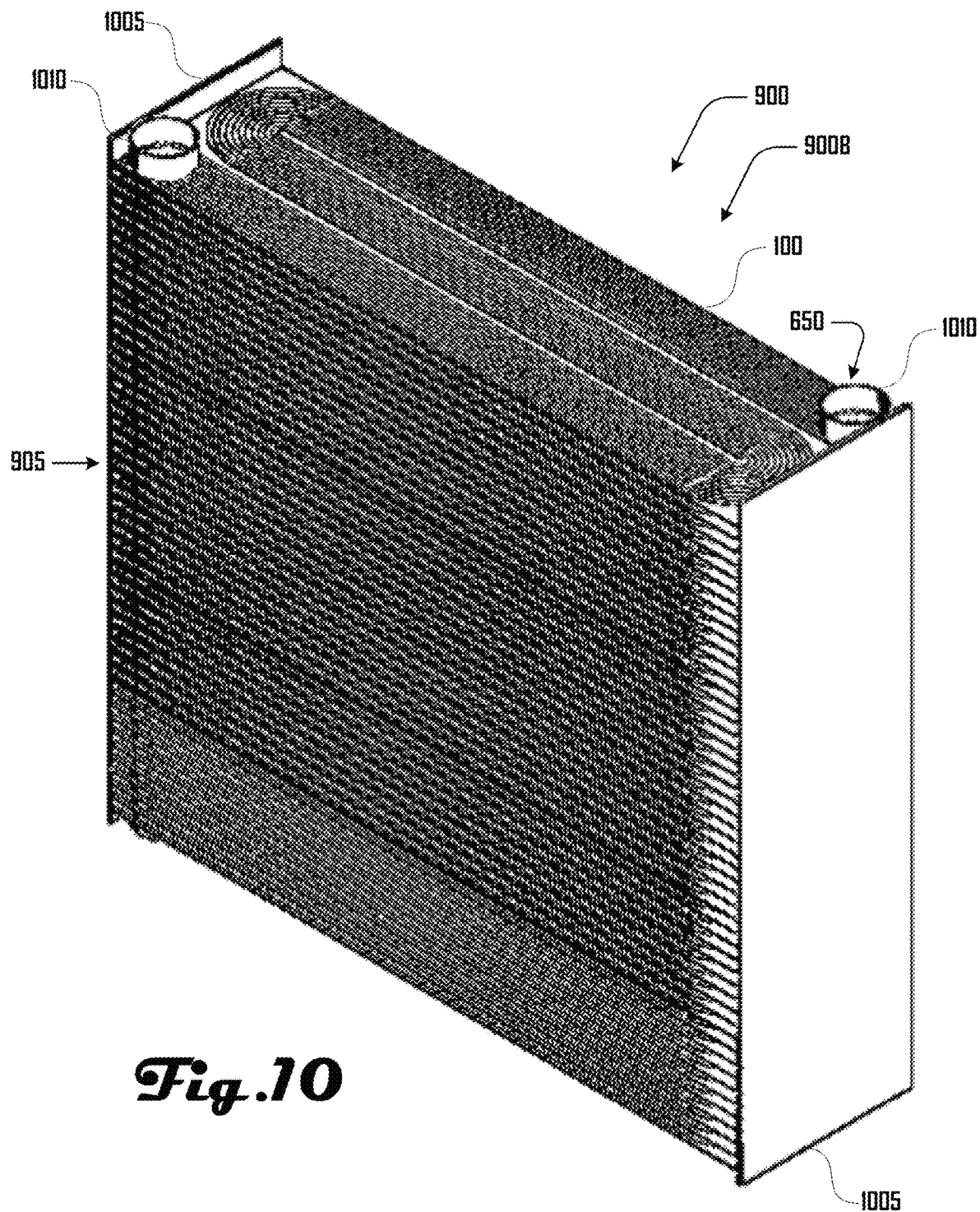
FIG. 10 illustrates a further embodiment of a heat exchanger array that comprises a plurality of stacked membrane heat exchangers that are supported within a housing.

FIG. 10 illustrates a further embodiment 900B of a heat exchanger array 900 that comprises a plurality of stacked membrane heat exchangers 100, which are supported within a housing 1005, that is coupled on respective ends of the heat exchangers 100. The heat exchanger array 900 further comprises fluid conduits 1010, which extend through and communicate with ports 650 that communicate with ends 111 of the heat exchangers 100 (see e.g., FIGS. 6a and 6b). For example, a flowing fluid can be received at a first fluid conduit 1010, flow into the chambers 110 of the heat exchangers 100 via respective first ends 111 and then flow out second ends 111 into a second fluid conduit 1010.

Figure 11:
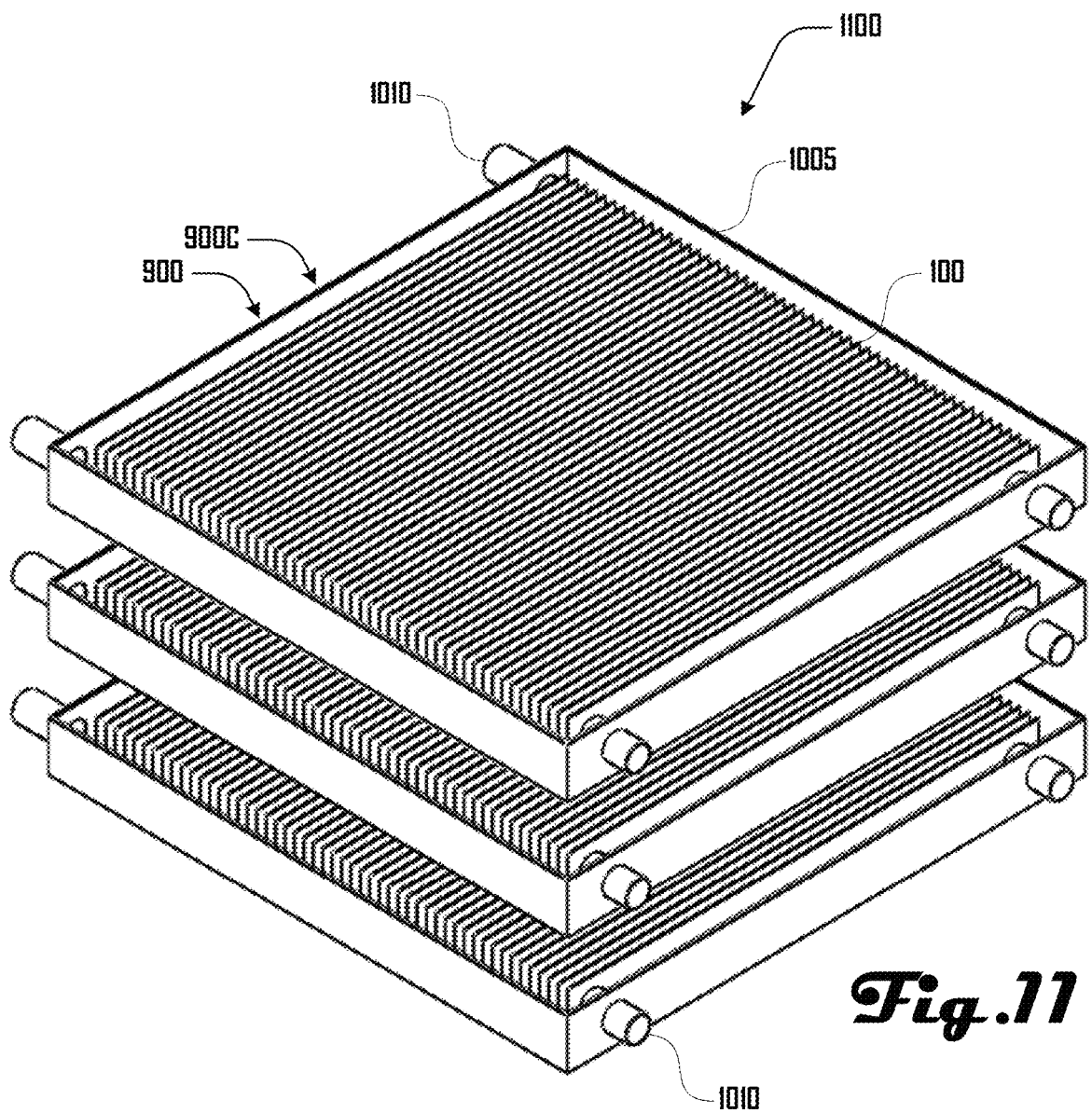
FIG. 11 illustrates a first embodiment of a heat exchanger assembly having a plurality of heat exchanger arrays disposed in a separated and stacked configuration.
Figure 12:
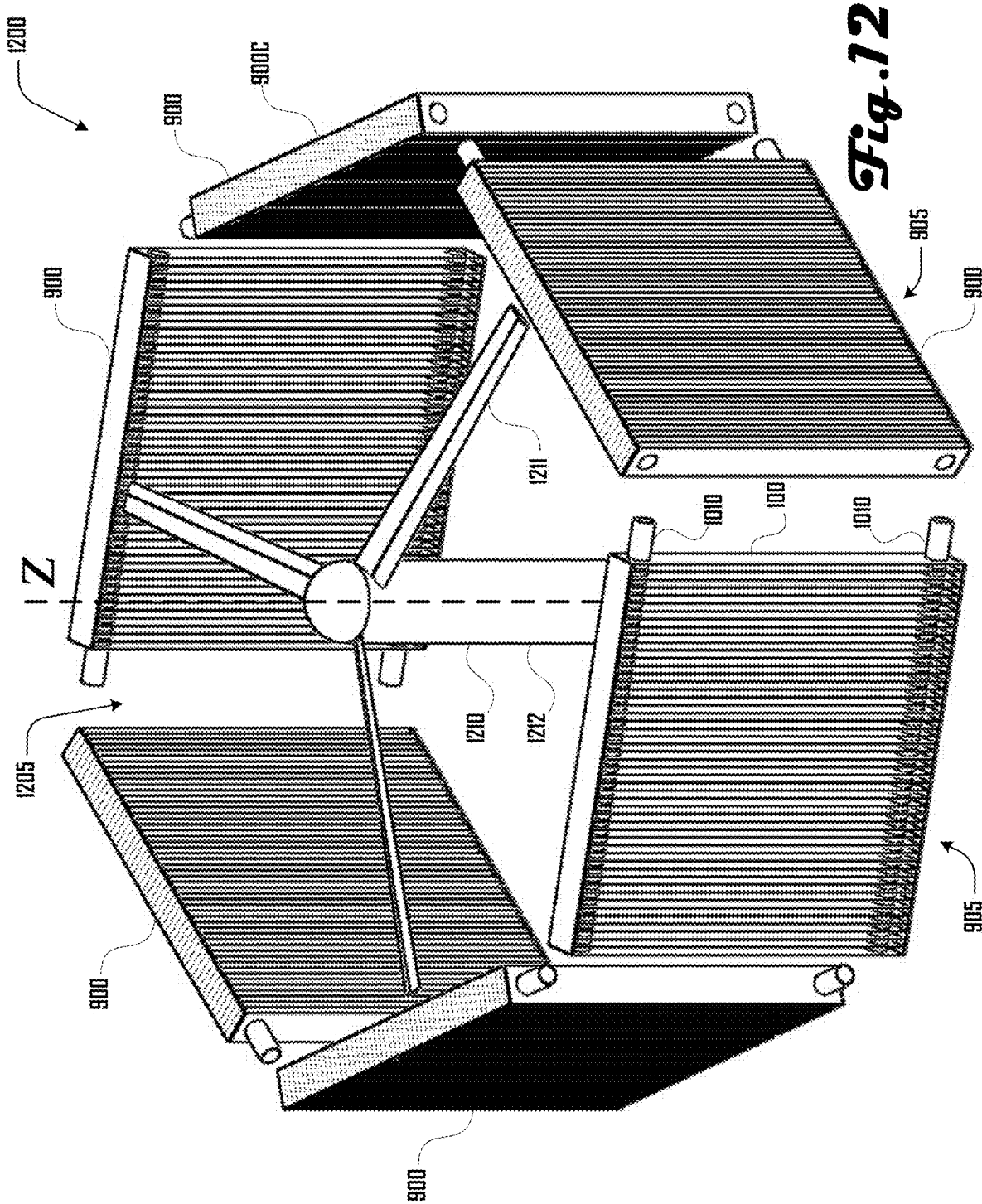
FIG. 12 illustrates an example of a heat exchanger system that comprises a plurality of heat exchanger arrays and comprises a fan assembly.

In various embodiments, a plurality of heat exchanger arrays 900 can be arranged into a heat exchanger assembly. For example, FIGS. 11 and 12 illustrate some examples of heat exchanger assemblies that comprise a plurality of heat exchanger arrays 900. FIG. 11 illustrates a first embodiment of a heat exchanger assembly 1100 having a plurality of heat exchanger arrays 900 disposed in a separated and stacked configuration. In one embodiment, such a system 1100 can be used for desalination, which is discussed in more detail below. In another embodiment, such a system 1100 can be a portion of a condenser where gas can be condensed and collected in a collection try, which in some embodiments can be present as a bottom tray portion of the housing 1005. FIG. 12 illustrates an example of a heat exchanger system 1200 that comprises a plurality of heat exchanger arrays 900 and comprises a fan assembly 1210. Further embodiments of heat exchanger systems comprising a fan assembly 1210 are illustrated in FIGS. 12-19*b*

Fan Membrane Heat Exchanger Systems

The United States devotes 12% of total energy consumption to space heating and cooling. In various embodiments, a plurality of membrane heat exchangers disclosed herein can be implemented as a fan system configured to cut building heating and cooling energy use. An example of such fan systems are illustrated in FIGS. 12-19*b* and are discussed below.

Advances in computer-controlled manufacturing and polymer processing as disclosed herein enable the fabrication of membrane heat exchangers with dramatically lower material thicknesses and lower material density than existing metal versions, leading to higher surface areas for a given mass and cost. By using sufficiently thin membranes, the performance of a heat exchanger 100 for an air conditioner or heat pump becomes limited by the surface area of the membrane, not by the thermal conductivity of the material. The large heat transfer area allows lower temperature differentials across these heat exchangers, high volumetric flow rates with low linear velocities, resulting in doubled effective Carnot performance. Additionally, various embodiments of a fan membrane heat exchanger can be retrofitted into existing building stock.

In various embodiments, reducing the temperature differential across heat exchangers can improve effective Carnot performance by a factor of 2 for cooling systems and by 2 or even 3 or more for heating systems. Membrane heat exchangers 100 can also pave the way for lower-cost and more efficient outdoor heat exchangers, heat pump hot water heating, dry power plant cooling, liquefaction of gases (including natural gas), desalination, and the like.

Coefficient of performance for a heat pump is given by $$COP_{cooling} = \frac{T_c}{(T_h - T_c)} \quad (1)$$

$$COP_{heating} = \frac{T_h}{(T_h - T_c)}$$

where $T_h$ and $T_c$ are the hot and cold temperatures of the Carnot cycle.

The temperature difference $\Delta T$ across a heat exchanger directly equates to a loss in exergy that reduces the overall coefficient of performance. This is shown by extending the Carnot coefficient of performance equations to include heat exchanger temperature differentials.

$$COP_{cooling} = \frac{(T_c - \Delta T)}{(T_h + \Delta T) - (T_c - \Delta T)} \quad (2)$$

$$COP_{heating} = \frac{(T_h - \Delta T)}{(T_h + \Delta T) - (T_c - \Delta T)}$$

However, $\Delta T$ is constrained by the need to exchange heat at a sufficient rate. With reference to FIG. 6*a*, this heat transfer is given by $$Q = h_1 A \Delta T_1 \quad (3)$$

-continued $$Q = h_2 A \Delta T_2$$

$$Q = \frac{kA\Delta T_3}{t} \Rightarrow Q = \frac{A\Delta T}{\frac{1}{h_1} + \frac{1}{h_2} + \frac{t}{k}}$$

where A is the surface area of the heat exchanger, t is the wall thickness, k is the thermal conductivity of the material, and $h_1$ and $h_2$ are the heat transfer coefficients of either fluid, and Q is the heat transfer. Thus, we can decrease $\Delta T$ while keeping the heat flow, Q, constant by increasing the surface area, A, and lowering the thickness, t. Thin film polymer membranes of various embodiments can enable an increase in surface area and heat exchanger performance. While polymers have lower thermal conductivities, k, than metals, their thickness can be made small enough that t/k is small relative to $1/h_1$ and $1/h_2$.

It can be shown that for laminar flow in a constant heat flux tube, the heat transfer coefficient can be approximated by $$Nu = \frac{48}{11} \quad (4)$$

$$h = \frac{Nu \, k_{fluid}}{d}$$

where Nu is the Nusselt number, $k_{fluid}$ is the thermal conductivity of the fluid, d is the effective tube diameter. Heat transfer in this regime is independent of fluid velocity. However, heat transfer is also constrained by the available heat capacity in the fluid which is given by $$Q = \dot{m}c_p(T_2 - T_1) \quad (5)$$

where $\dot{m}$ is the mass flow rate, $c_p$ is the fluid specific heat capacity, and $T_1$ and $T_2$ the entering and exiting fluid temperatures. Hence counter flow heat exchangers are preferred in some embodiments and mass flow rates should ideally be high in such embodiments, so as to minimize the required fluid temperature change.

It can be shown that for laminar flow, flow losses are approximated by $$Re = \frac{\rho v d}{\mu} \quad (6)$$

$$F_D = \frac{64}{Re}$$

$$\Delta p = F_D \frac{L}{d} \frac{\rho v^2}{2} \Rightarrow P_{fan} = \frac{8A\mu v^2}{d}$$

where Re is the Reynolds number, $\rho$ the fluid density, $v$ the fluid speed, $\mu$ is the fluid viscosity, $F_D$ the tube flow friction factor, $\Delta p$ the tube pressure drop, L the tube length, and $P_{fan}$ is the required fan power.

Hence for a given amount of heat transfer, fan power can be minimized in some embodiment by utilizing a low air flow speed, but high mass flow rate, necessitating a large heat exchanger cross-sectional flow area, as enabled through the use of polymer-membrane heat exchangers. Low air flow speeds infer low Reynolds numbers, hence the laminar flow assumption in this case.

As discussed above, in various embodiments, membrane heat exchangers can comprise a plurality of thin-wall tubes instead of the conventional heavy metal tubes with soldered on fins. By Equation 3, low thermal conductivity materials can be used in various embodiments of heat exchangers as long as the thickness is very low. Based on hoop stress, the wall thickness required to hold a given pressure is $$t = (\text{Pressure} \cdot \text{Tube radius})/\text{Material stress} \qquad (7)$$

A smaller tube radius means lighter and cheaper membranes with better thermal conduction. Four times as many tubes of half the diameter doubles heat transfer for the same system mass/cost. Membrane heat exchanger tube diameters in the 1-5 mm range are likely, with surface heat transfer coefficient h of around 50-100 W/(m²K) for air, and 5,000-10,000 W/(m²K) for flowing water.

Polyethylene terephthalate films (PET, Mylar), can have strengths as high as 200 MPa and thermal conductivities k in the 0.15-0.4 W/(mK) range, depending on additives. From Equation 7, assuming a safe working stress of 50 MPa, a tube diameter of 3 mm, and a wall thickness of 0.05 mm (2 mil), an operating pressure of up to 1.7 MPa (240 psi) is possible in some embodiments. Thus k/t=3,000-8,000 W/(m²K), far higher than the air-side surface heat transfer coefficient h, so by Equation 3 the poor thermal conductivity of a thin PET film is not a limiting factor for performance. For comparison, plastic shopping bags and Mylar balloons have a thickness near 0.01 mm (0.5 mil), and are noted for being robust and long lived. In some preferred embodiments, membrane heat exchangers can employ heavier membranes, 0.05 mm (2 mil), comparable to the thickness of freezer bags, but can go much thicker in further embodiments.

A combined ceiling fan and membrane heat exchanger system using chilled or warmed water capable of transferring 2.5 kW of cooling or heating can have around 10 m² of surface area, 5° C. of total temperature differential between water and air, and a plastic film mass of less than 1 kg. The cost of bulk PET film is around $2/kg. The fan power required would be a few watts, as would the required water pumping power, with flow speeds being low. The water mass flow rate would be around 0.25 kg/s and the total mass of water in the heat exchanger would be around 30 kg, assuming 3 mm diameter tubes. It is expected that these systems will be retrofittable.

FIG. 12 illustrates an example embodiment of a heat exchanger assembly 1200 having a plurality of heat exchanger arrays 900 that are disposed surrounding and facing a fan assembly 1210 that includes a plurality of blades 1211 that rotate on a shaft 1212 about an axis Z. The heat exchanger arrays 900 are disposed vertically parallel to axis Z and horizontally tangential to axis Z to define a flow cavity 1205.

In such an embodiment, the fan assembly 1210 can be configured to move fluid through the heat exchanger arrays 900. For example, in one embodiment, the fan assembly 1210 can be configured to suck fluid through the heat exchanger arrays 900 and into the flow cavity 1205. In a further embodiment, the fan assembly 1210 can be configured to push fluid from the flow cavity 1205 through the heat exchanger arrays 900.

Figure 13:
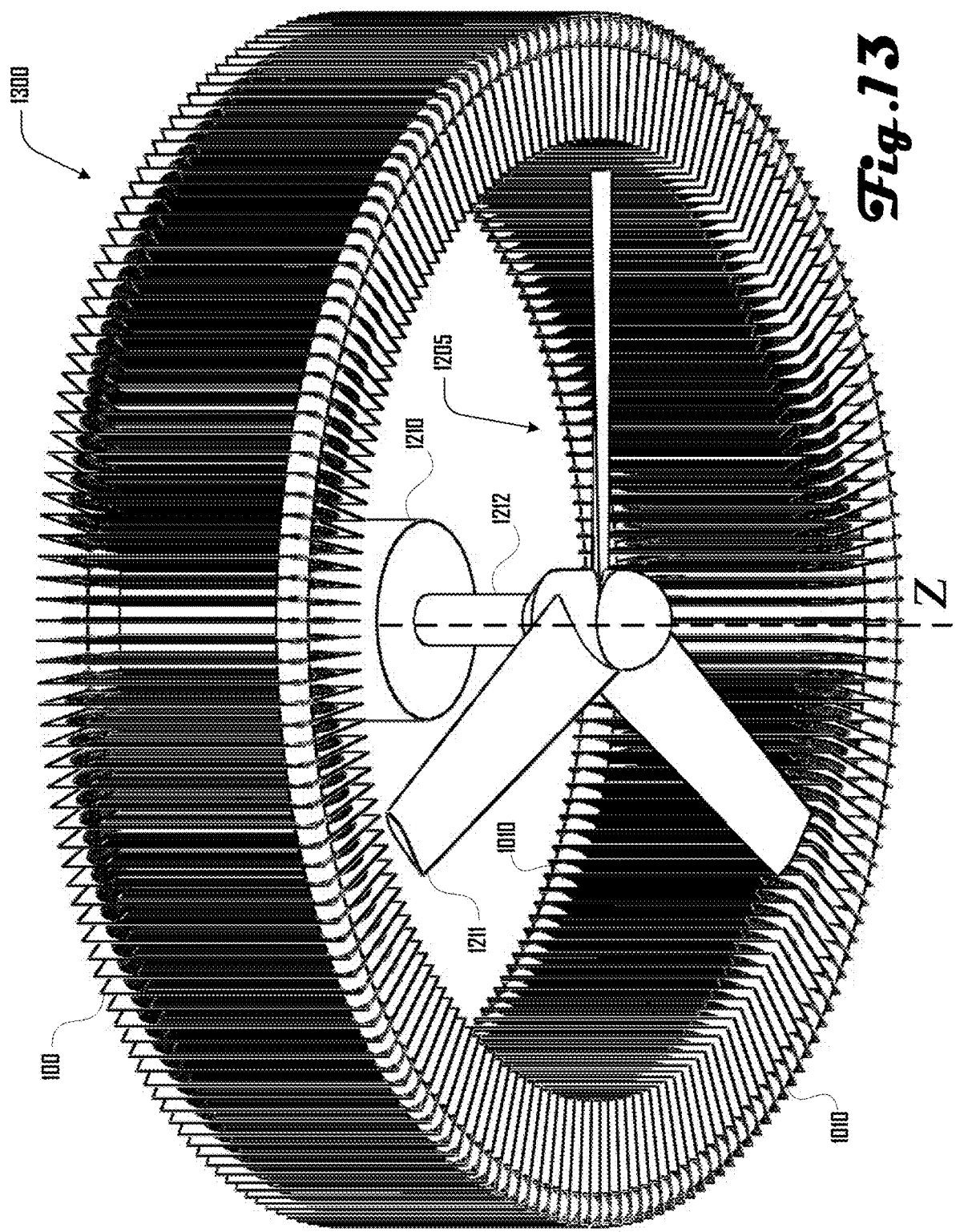
FIG. 13 illustrates another example of a heat exchanger assembly that comprises a plurality of membrane heat exchangers disposed in a cylindrical configuration about a fan assembly to define a flow cavity.

FIG. 13 illustrates another example of a heat exchanger assembly 1300 that comprises a plurality of membrane heat exchangers 100 disposed in cylindrical configuration about a fan assembly 1210 to define a flow cavity 1205. The membrane heat exchangers 100 are generally arranged with the planar membrane heat exchangers 100 disposed in a plane facing and coincident with axis Z. The membrane heat exchangers 100 can be coupled via fluid conduits 1010 that are configured to provide for fluid flow through the membrane heat exchangers 100 as discussed herein.

Figure 14:
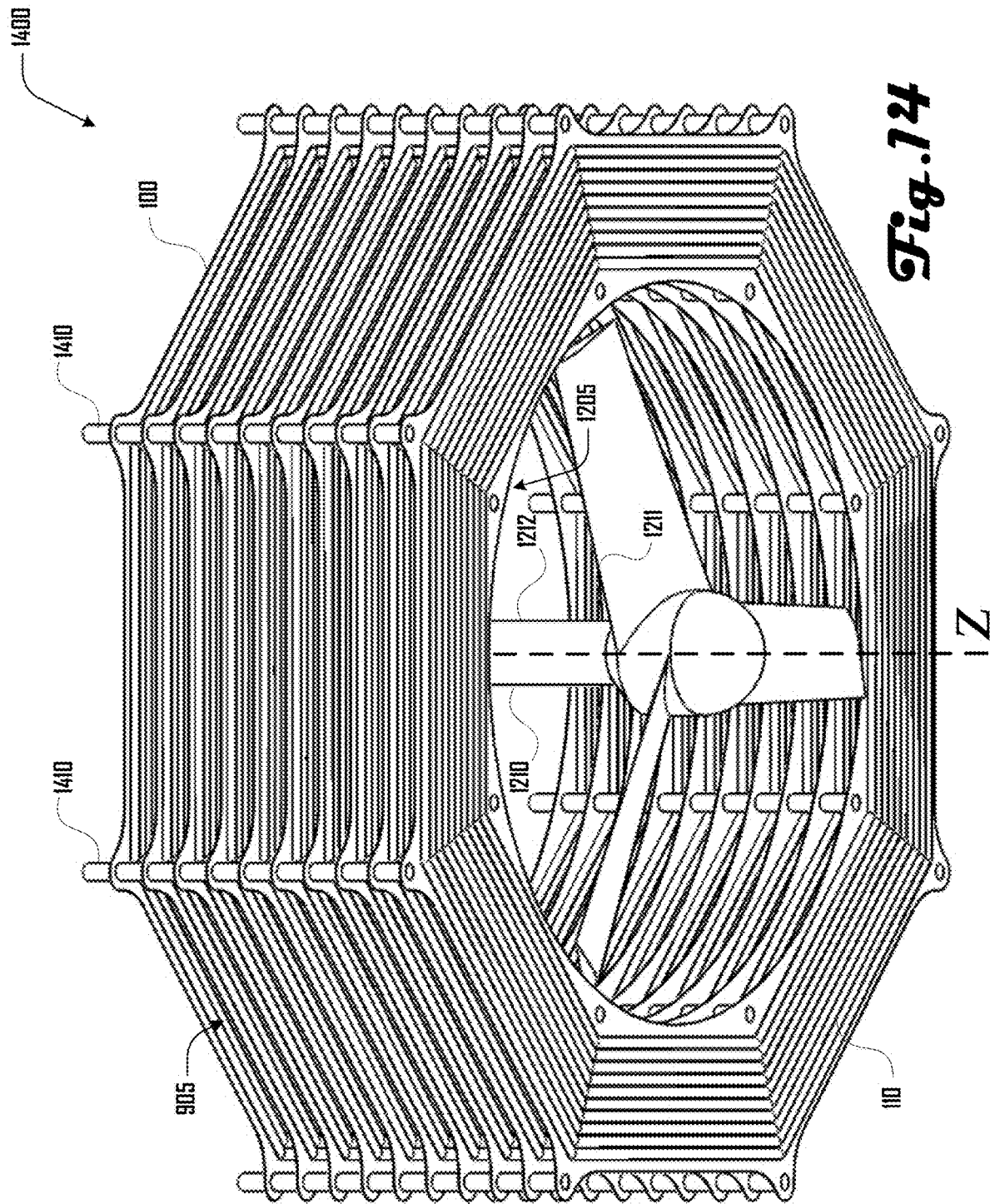
FIG. 14 illustrates a further example of a heat exchanger assembly that comprises a plurality of stacked membrane heat exchangers disposed about a fan assembly to define a flow cavity.
Figure 15:
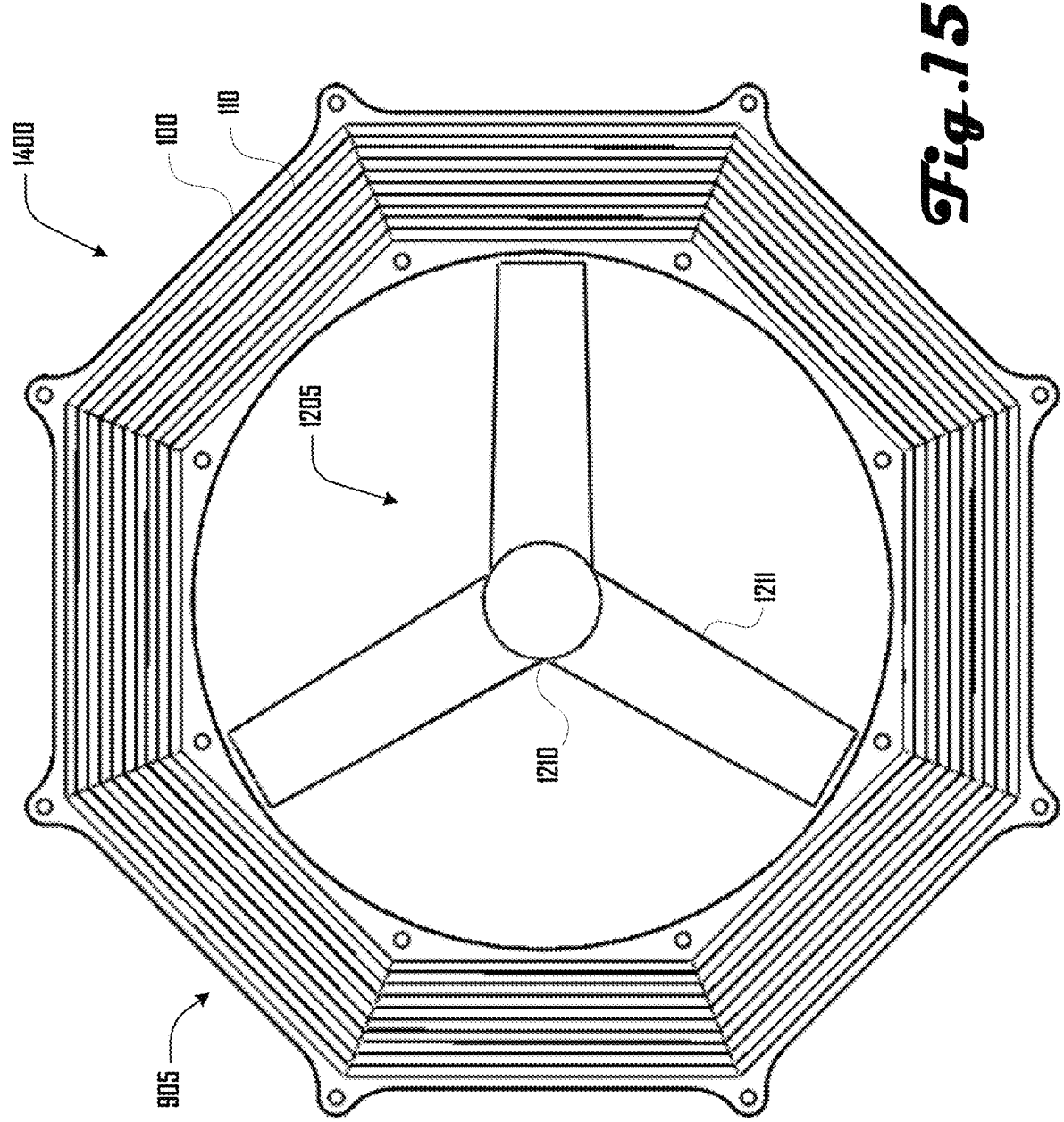
FIG. 15 illustrates a bottom view of the heat exchanger assembly of FIG. 14.
Figure 18A:
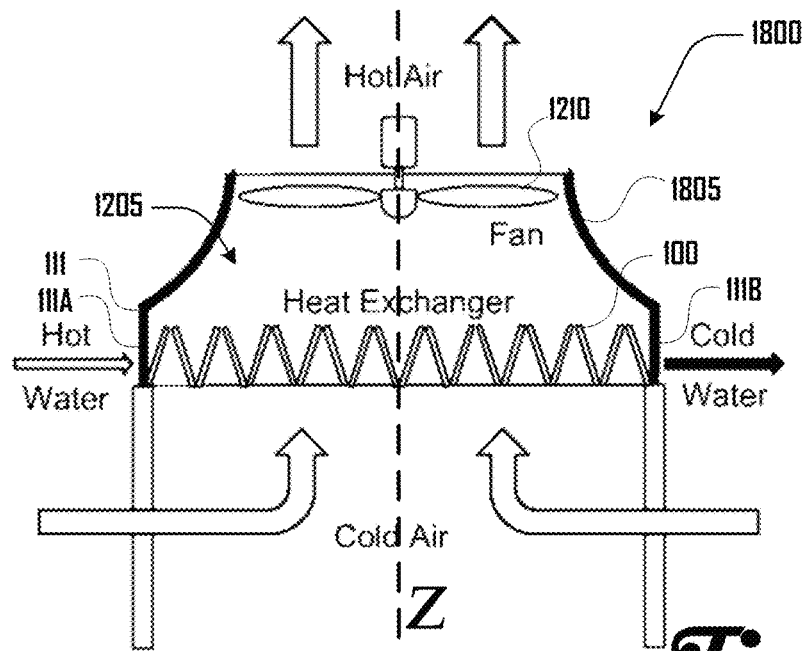
Figure 18B:
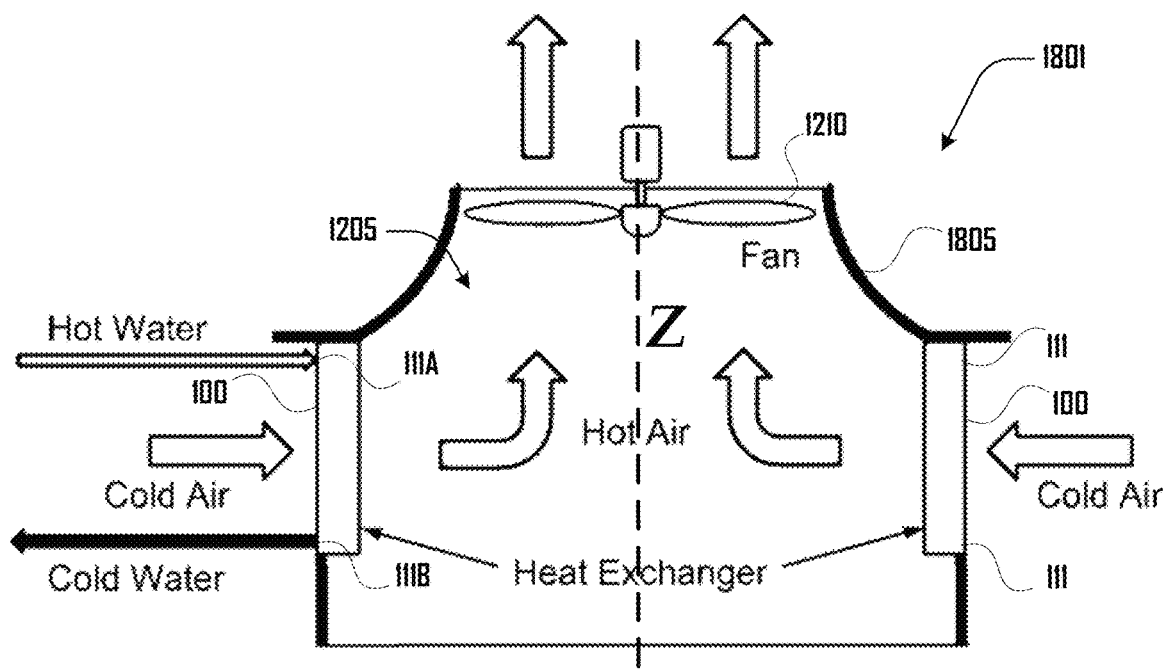

FIG. 14 illustrates a further example of a heat exchanger assembly 1400 that comprises a plurality of stacked membrane heat exchangers 100 disposed about a fan assembly 1210 to define a flow cavity 1205. In this example embodiment, the membrane heat exchangers 100 can be octagonal in shape and stacked perpendicular to axis Z with spaces between the heat exchangers 100 configured to provide for fluid flow in and/or out of the flow cavity 1205. The heat exchangers 100 can be coupled together and disposed on a plurality of rods 1410 that extend through the plurality of heat exchangers 100. FIG. 15 illustrates a bottom view of the heat exchanger assembly 1400.

Although FIGS. 14 and 15 illustrate membrane heat exchangers 100 having a polygon shape, further embodiments can have any other suitable regular or irregular shape. For example, FIG. 16 illustrates a further embodiment of a membrane heat exchanger 1600 that can form a portion of a heat exchanger assembly, or the like. In this example, the membrane heat exchanger 1600 can be generally C-shaped having an open side 1065 and defining a flow cavity 1205.

FIG. 17 illustrates a further embodiment of a membrane heat exchanger 1700 that comprises a circular housing 1710 that surrounds a fan assembly 1210 and defines a flow cavity 1205. A plurality of stacked and spaced apart membrane heat exchangers 100 are disposed in a plane parallel to axis Z such that the fan assembly 1210 can push or pull fluid through the membrane heat exchangers 100. In various embodiments, the housing 1710 can be disposed on a plurality of legs.

As discussed herein, membrane heat exchanger arrays and assemblies can act as a heat exchanger in various suitable ways and FIGS. 18a, 18b, 19a, 19b and 20 illustrate various embodiments of membrane heat exchanger systems. For example, FIG. 18 illustrates an example of a membrane heat exchanger system 1800 that includes one or more membrane heat exchangers 100 extending perpendicularly to axis Z of a fan assembly 1210. Hot water can enter the one or more membrane heat exchangers 100 at a first end 111A and be cooled as it flows through the one or more membrane heat exchangers 100 to a second end 111B, where cold water emerges.

As shown in this example, the fan assembly 1210 pulls cold air from under the one or more membrane heat exchangers 100, past the one or more membrane heat exchangers 100, and into a flow cavity 1205 defined by a housing 1805. The cold air receives heat from the hot water flowing through the one or more membrane heat exchangers 100 such that hot air enters, flows through, and is expelled from the flow cavity 1205. In some embodiments, the membrane heat exchanger 1700 of FIG. 17 can operate in an analogous way.

FIG. 18 illustrates a further embodiment of a membrane heat exchanger system 1801 that includes one or more membrane heat exchangers 100 extending parallel to axis Z of a fan assembly 1210. Hot water can enter the one or more membrane heat exchangers 100 at a first end 111A and be cooled as it flows through the one or more membrane heat exchangers 100 to a second end 111B, where cold water emerges.

As shown in this example, the fan assembly 1210 pulls cold air that is external to the flow cavity 1205 past the one or more membrane heat exchangers 100, and into the flow cavity 1205 defined by a housing 1805. The cold air receives heat from the hot water flowing through the one or more membrane heat exchangers 100 such that hot air enters, flows through, and is expelled from the flow cavity 1205. In some embodiments, the membrane heat exchangers 1200, 1300 of FIGS. 12 and 13 can operate in an analogous way.

In some embodiments, it can be desirable to operate a membrane heat exchanger at below atmospheric pressure. There are multiple ways of accomplishing this with the membrane heat exchanger 100, including situating the entire heat exchanger 100 within an evacuated chamber, which could be made of concrete, steel, composites, or any suitable tensegrity-type construction, and inverting the membrane heat exchanger such that atmospheric air pressure flows through the tubes while water condenses on the outside of the tubes. In various embodiments, it can be desirable for the heat exchanger assembly to be externally tensioned so as to offset the partially evacuated condenser volumes of the interstices between tubes.

Figure 19A:
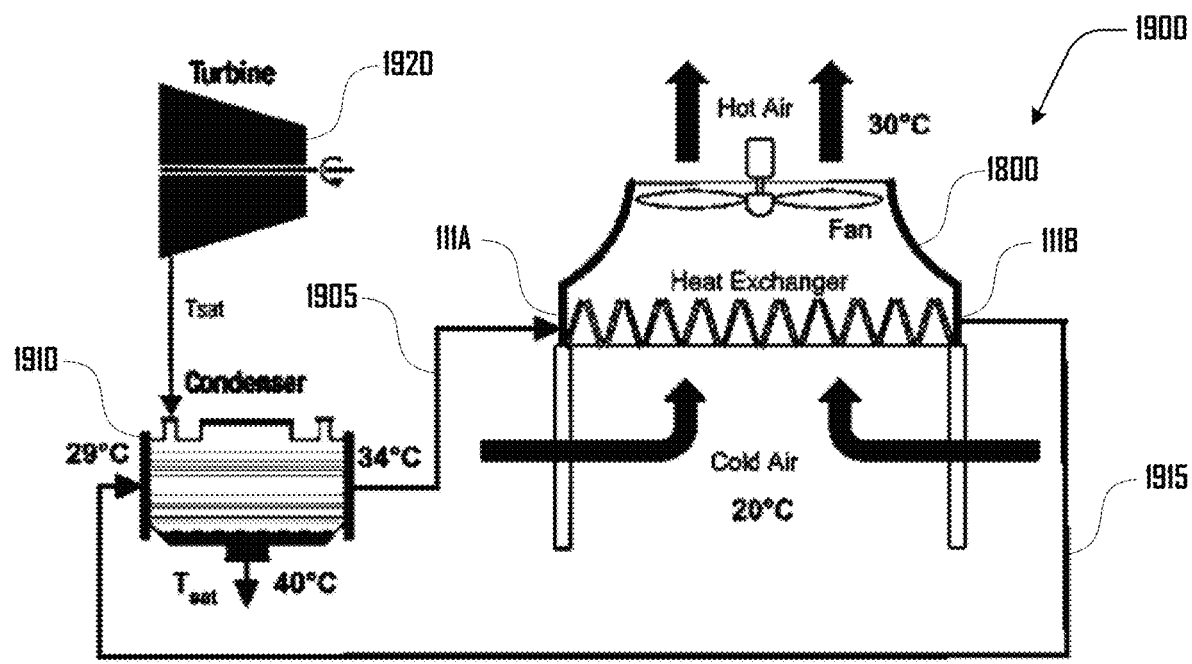
Figure 19B:
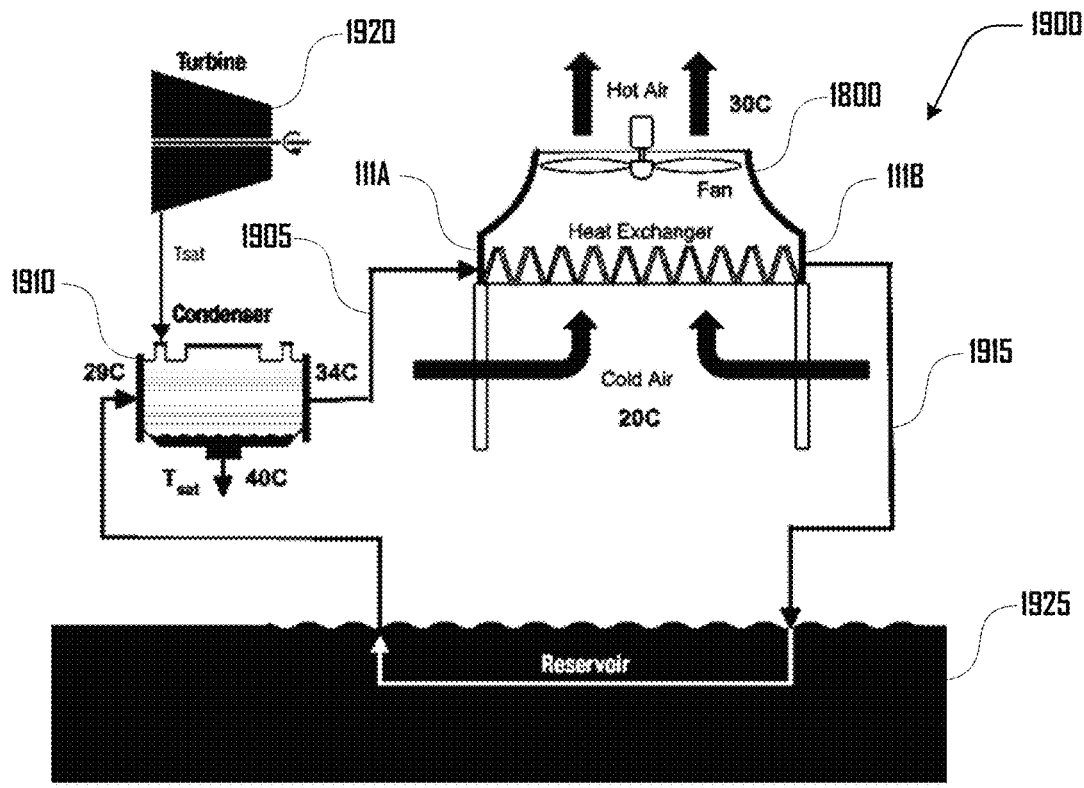

For example, as illustrated in FIGS. 19a and 19b one example system 1900 includes a condenser 1910 for a steam turbine 1920 (or desalination plant), where hot water from the condenser 1910 enters a first end of the heat exchanger system 1800 at a first end 111A via a first supply line 1905. The hot water is cooled by the heat exchanger system 1800 and exits via the second end 111B via a second supply line that returns to the condenser 1910 directly as shown in FIG. 19a or via a reservoir 1925 as shown in FIG. 19b.

In addition to fluid conditioning with a system that comprises a fan assembly as illustrated in FIG. 12-19b, in some embodiments, a heat exchanger wall system 2000 as illustrated in FIG. 20 can be configured for cooling fluids in an internal space. For example, as illustrated in FIG. 20, an external and internal heat exchanger 100A, 100B can be disposed on opposing sides of a wall 2020, and a heat exchanger 2010 disposed within the wall can be configured to move fluids within the heat exchangers 100 to cool internal fluid (e.g., air) associated with the internal heat exchanger 100B and expel heat into the external environment via the external heat exchanger 100A. However, in further embodiments, such a system can be used to heat internal fluid (e.g., air) associated with the internal heat exchanger.

Desalination Via Membrane Heat Exchangers

FIGS. 11 and 21 illustrate two example heat exchanger embodiments 1100, 2100 that can be deployed in a desalination system together into a cross-flow heat exchanger. Desalination methods performed can include one or more of multi-stage flash (MSF), multiple effect desalination (MED), mechanical vapor compression (MVC), and the like.

Figure 22:
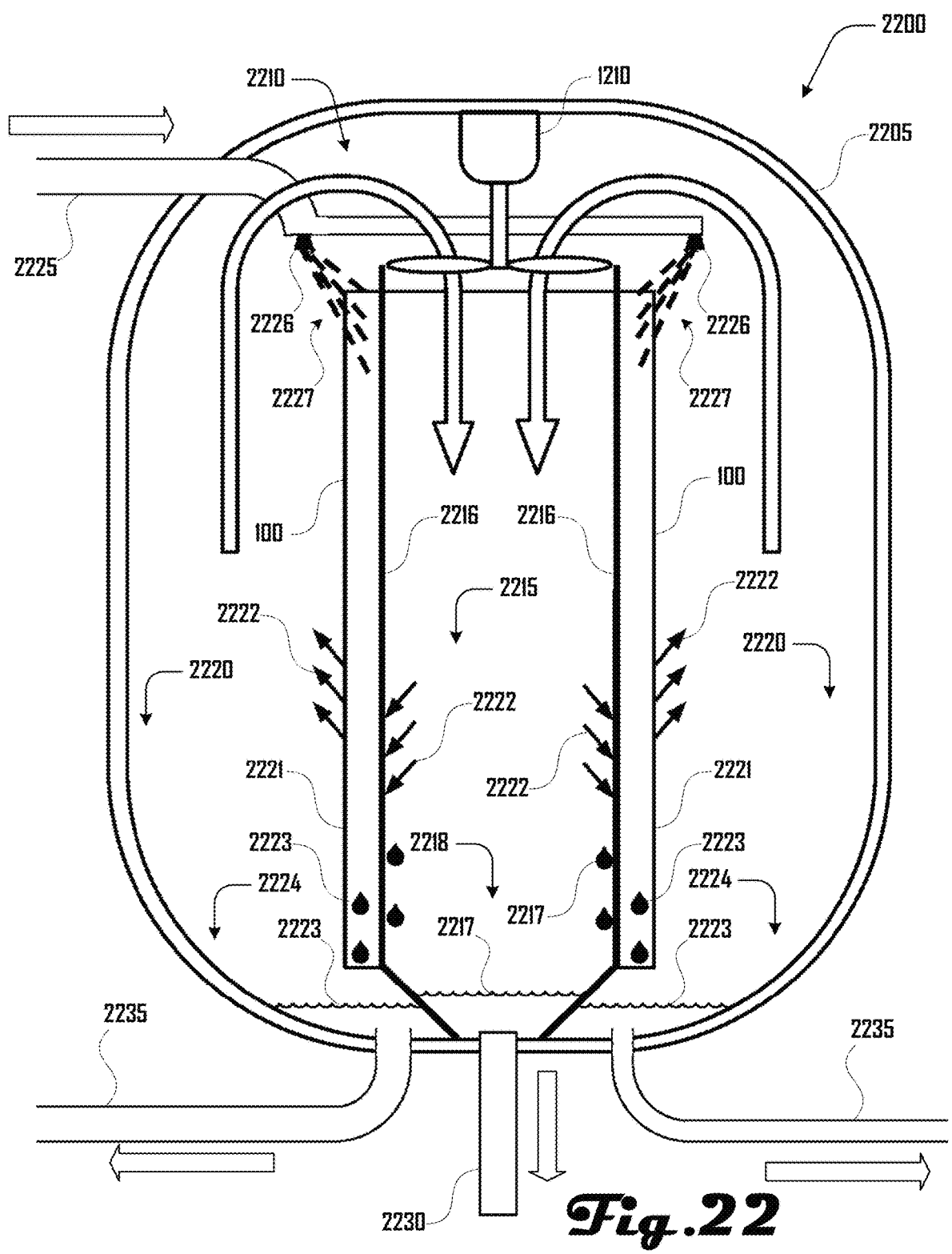
FIG. 22 illustrates an example embodiment of a mechanical vapor compression desalination system.

For example, FIG. 22 illustrates an example embodiment of a mechanical vapor compression desalination system 2200. The desalination system 2200 comprises a vacuum shell 2205 that surrounds and encloses a desalination assembly 2210 under negative pressure. The desalination assembly 2210 comprises one or more membrane heat exchanger 100 that define a central freshwater cavity 2215 and a salt water cavity 2220 external to an surrounding the one or more membrane heat exchanger 100.

The desalination system 2200 can be configured to desalinate salt water 2227 that enters the vacuum shell 2205 via an inlet pipe 2225 and is sprayed onto an outer surface 2221 of the one or more membrane heat exchangers 100 facing the salt water cavity 2220. Desalinated water evaporant 2222 is generated by the outer surface 2221 of the one or more membrane heat exchanger 100, which can pass into the freshwater cavity 2215, where the desalinated water evaporant 2222 condenses on an internal face 2216 of the one or more membrane heat exchanger 100 within the freshwater cavity 2215 to generate desalinated liquid water 2217.

The desalinated liquid water 2217 moves to a freshwater reservoir 2218 at the bottom of the freshwater cavity 2215, which can leave the vacuum shell 2205 via a freshwater exit port 2230. A fan assembly 2110 can be disposed over the freshwater cavity 2215 to facilitate movement of evaporant 2222 and/or condensation of the same by increasing the pressure of the evaporant 2222. On the other hand, concentrated brine 2223 can pool in a brine reservoir 2224 at the bottom of the saltwater cavity 2220 and can be removed by brine exit ports 2235. Accordingly, the desalination system 2200 can be configured to mechanically compress water vapor 2222 so that the vapor 2222 can condense at a slightly higher temperature and/or pressure than it evaporates at—on the backside 2216 of the evaporating heat exchanger 100. The temperature differential being equal to the boiling point elevation temperature plus the heat exchanger temperature drop.

In various embodiments, such a mechanical vapor compression desalination system 2200 can operate on a single stage, if desired, and at ambient temperature, avoiding the need for extensive heat recovery heat exchangers. This can also allows for the efficient use of low recovery rates, where only a small proportion of water is recovered such that the salinity of the brine solution 2223 is only slightly elevated. This can reduce the energy required to desalinate water, as the higher the salinity becomes, the more energy is required to desalinate it. Also, this can avoid the production of a highly concentrated brine solution 2223 that may be problematic to release back into the environment.

In some embodiments, a vacuum or negative pressure can be generated within the vacuum shell 2205 in various suitable ways including via an air pump or via pumped water flow within the sealed system. In other words, in some embodiments, desalination system 2200 can operate without an air pump, which can be desirable for reducing energy costs.

Figure 23:
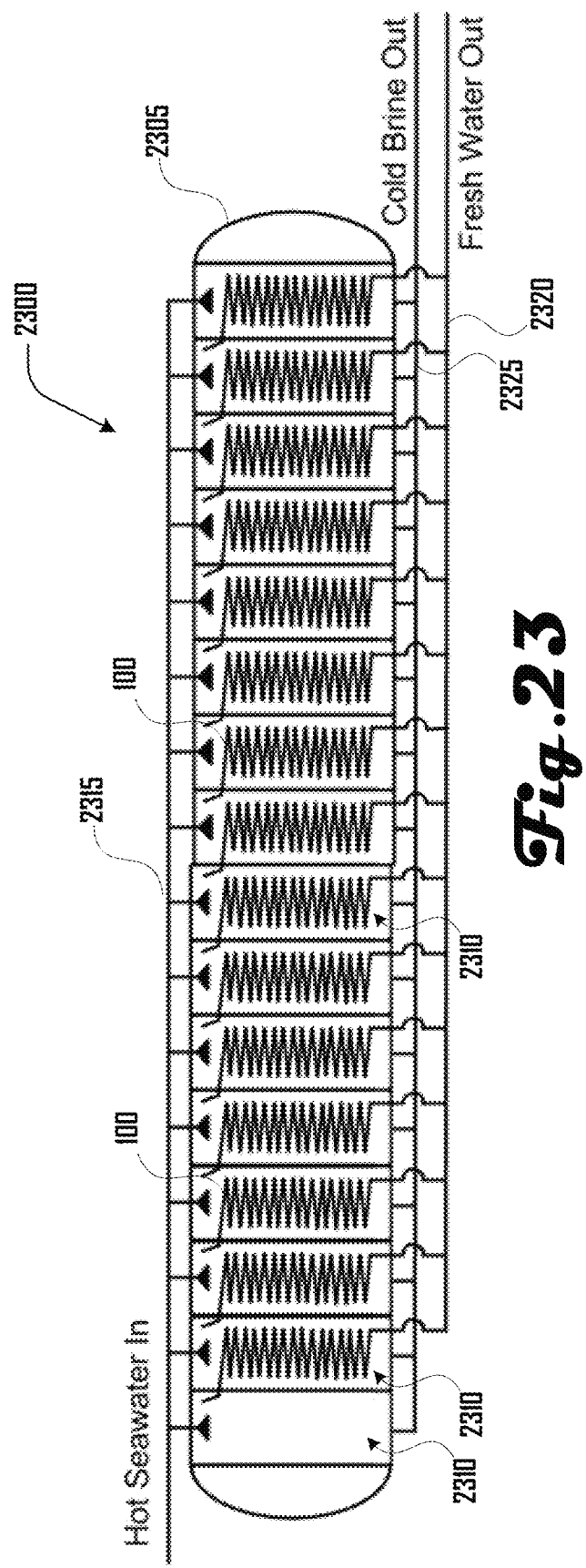
FIG. 23 illustrates an example embodiment of a multi-stage thermal desalination system that comprises a pressure vessel body that defines a plurality of pressure chambers arranged in series with each stage at a slightly lower pressure and temperature than the previous stage.

FIG. 23 illustrates an example embodiment of a multi-stage thermal desalination system 2300 that comprises a pressure vessel body 2305 that defines a plurality of pressure chambers 2310 arranged in series with each stage at a slightly lower pressure and temperature than the previous stage. Each pressure chamber 2310 can comprise one or more membrane heat exchanger configured to desalinate seawater that introduced via seawater pipe 2315, with the result being colder concentrated brine and fresh water leaving the system 2300 via respective brine and water outlets 2320, 2325. For such multiple effect desalination systems 2300 any suitable number of stages or pressure chambers 2310 can be used, including two stages, five stages, twenty four stages, a hundred stages, or other suitable number.

Many forms of membrane heat exchangers 100 can be used with the example desalination systems 2200, 2300 discussed above. For example, a membrane heat exchanger 100 can comprise a plurality of small tubes of large collective surface area that separate two fluids of slightly different temperatures. In some embodiments, the smaller the difference in temperature between the fluids, the lower the energy loss and the more efficient the heat exchanger system can be. As discussed herein, membrane heat exchangers 100 can be constructed by welding two thin films together so as to form a network of small chambers 110.

Isothermal Compressor

Conventional air compressors tend to use adiabatic compression where air warms up during compression, increasing the work required. Often in multistage compressors, intercooler heat exchangers are used to cool the air down again prior to further compression, thereby reducing the amount of work required. Isothermal compression can be more efficient than adiabatic compression by producing a high pressure gas supply at ambient temperature.

In some embodiments, by squashing a large surface area membrane heat exchanger 100 having small diameter gas-filled tubes with a pressurized ambient-temperature liquid it can be possible to combine a compressor and membrane heat exchanger 100 so as to achieve lower power isothermal compression. Operating as an air motor, various embodiments of an isothermal compressor or motor system can absorb heat from the environment so as to reheat the expanding gas and increase the power output from a compressed gas source. Such an isothermal compressor/motor can be used to construct a Carnot cycle heat engine or heat pump in various embodiments as discussed in further detail herein.

Figure 24:
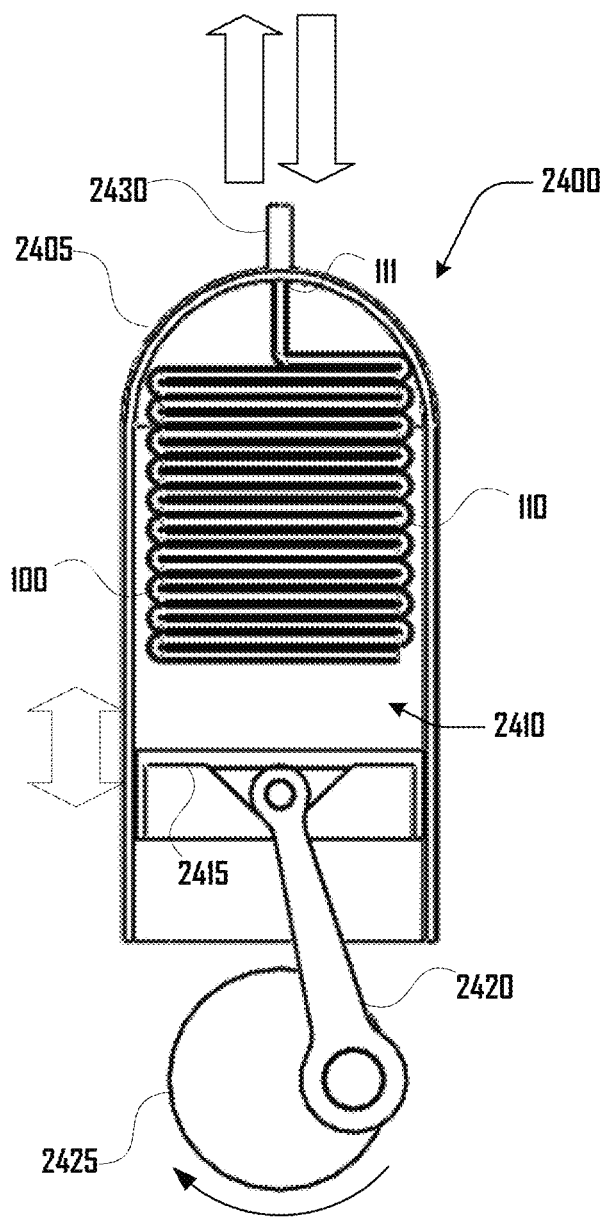
FIG. 24 illustrates an example embodiment of isothermal compressor that comprises a cylinder which defines a compression cavity.

FIG. 24 illustrates an example embodiment of isothermal compressor 2400 that comprises a cylinder 2405 which defines a compression cavity 2410. A membrane heat exchanger 100 can be disposed within the compression cavity 2410 with an inlet/outlet port 2430 of the membrane heat exchanger 100 extending through the cylinder 2405. In this example, a piston 2415 can be configured to translate within the cylinder 2405 to increase and decrease the volume of the compression cavity 2410. The piston 2415 can be driven by a con rod 2420 that is coupled to a rotating crank 2425.

In various embodiments, the membrane heat exchanger 100 can comprise a compressible bladder which can include one or more chamber 110 with respective ends 111 that communicate with respective inlet/outlet portions of the port 2430. In some embodiments, the membrane heat exchanger 100 can be compressed by the piston or other suitable mechanism, either directly or indirectly. For example, in some embodiments, the compression cavity 2410 can be filled with a liquid such as water, oil, or the like, which can serve to compress the membrane heat exchanger 100 disposed within the compression cavity 2410.

The isothermal compressor 2400 can operate by having a compressible fluid such as a gas introduced to membrane heat exchanger 100 while in a non-compressed configuration. The membrane heat exchanger 100 can be compressed, which can compress the fluid within the membrane heat exchanger 100. For example, chambers 110 that comprise fluid such as a gas can be squashed flat when the membrane heat exchanger 100 is compressed as illustrated in FIGS. 25a-c respectively.

Such compression can generate heat in the gas and such heat can be transferred through the body 105 of the membrane heat exchanger 100 from the gas to the liquid within the compression cavity 2410, such that the gas remains at near the same temperature as the fluid within the compression cavity 2410, thereby achieving near isothermal compression. In various embodiments, it can be desirable to have a high surface area of the chambers 110 of the membrane heat exchanger 100 to improve heat transfer between the compressed gas within the chambers 110 and the fluid within the compression cavity 2410.

Figure 26:
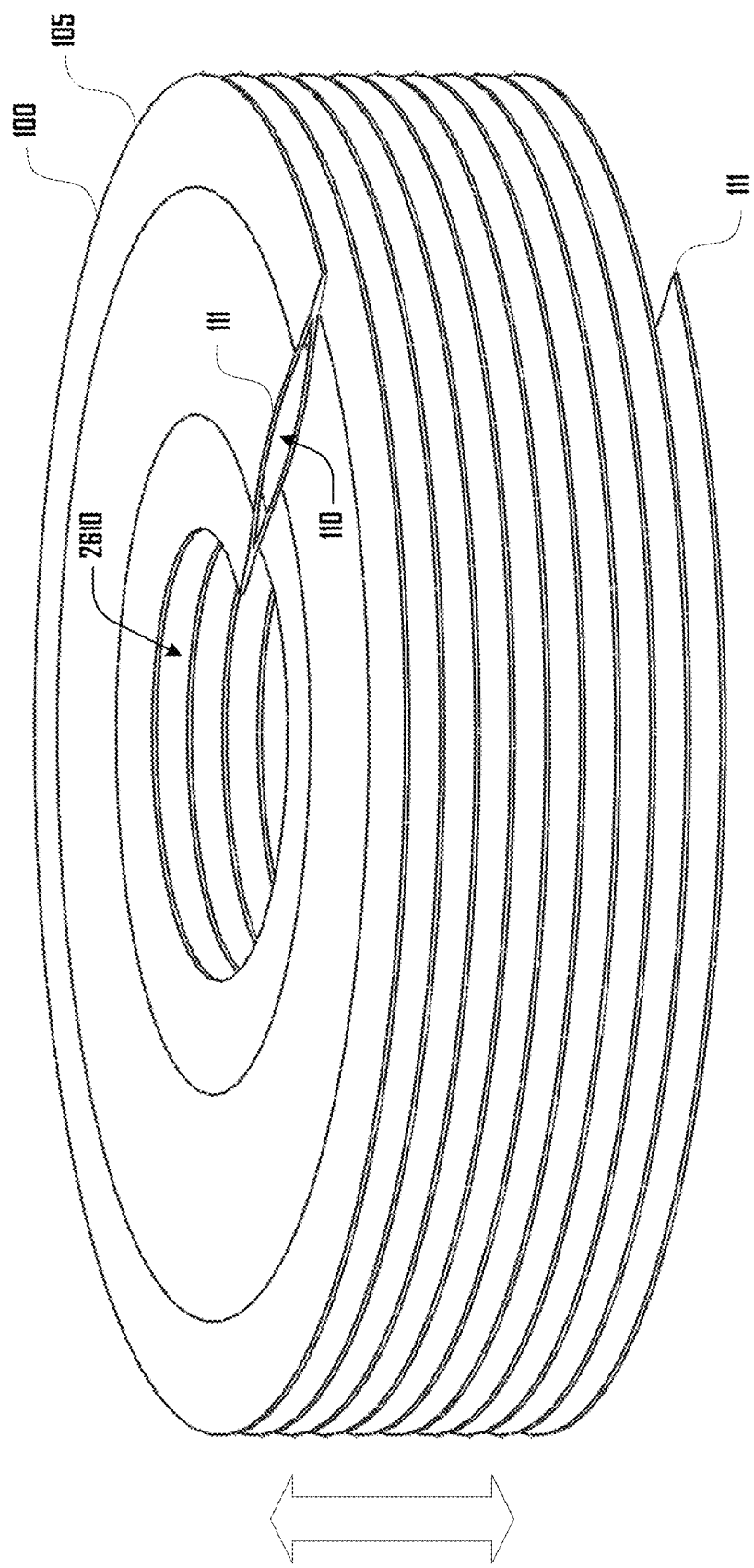
FIG. 26 illustrates a further embodiment of a compressible membrane heat exchanger, which is shown having a coiled planar body that defines a chamber that extends between a first and second end.

The membrane heat exchanger 100 can be configured in various suitable ways to facilitate compression of fluid within one or more chamber 110. For example, in some embodiments, any of the planar and rectangular membrane heat exchangers 100 (e.g., as illustrated in FIGS. 1a-6b) can be configured in a foldable configuration that supports compression of the one or more chambers 110 and the flow of fluid therethrough. FIG. 26 illustrates a further embodiment of a compressible membrane heat exchanger 100, which is illustrated having a coiled planar body that defines a chamber 110 that extends between a first and second end 111. The coiled body 105 can define a central orifice 1610 in various embodiments. Accordingly, in such embodiments, compression of fluid within the chamber 110 can be achieved via physical compression between adjoining stacked portions of the body 105 and/or compression generated by a fluid that surrounds such a membrane heat exchanger 100 within the compression cavity 2410.

Figure 27:
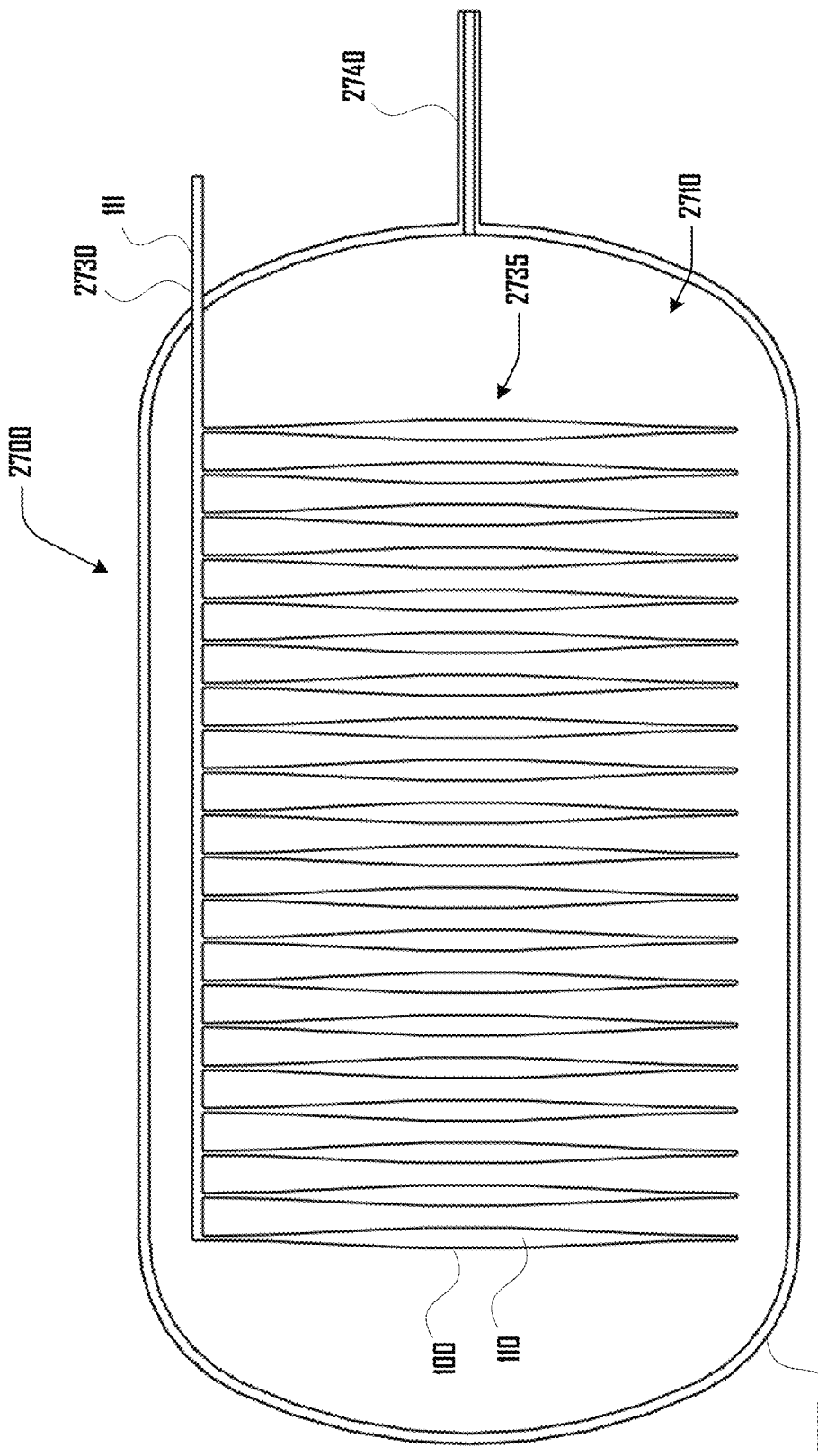
FIG. 27 illustrates an isothermal compressor that comprises a tank body defining a compression chamber into which a fluid (e.g., oil, water, or the like) can be pumped to compress a membrane heat exchanger disposed within the compression chamber.

In further embodiments, compression of a membrane heat exchanger 100 can be achieved without a piston 2425 or other direct action. For example, FIG. 27 illustrates an isothermal compressor 2400 that comprises a tank body 2705 defining a compression chamber 2710 into which a fluid (e.g. oil, water, or the like) can be pumped to compress a membrane heat exchanger 100 disposed within the compression chamber 2710. In this example embodiment, the membrane heat exchanger 100 can comprise a series of double diaphragm membranes 2735 within which a compressible fluid (e.g., a gas such as air or the like) can be isothermally compressed/expanded in response to the hydraulic action generated by fluid being introduced to and/or removed from the compression chamber 2710 via an actuation port 2740. The double diaphragms 2735 can expand/flatten in response to hydraulic action to compress gas within the chambers 110 of the membrane heat exchanger 100.

In some embodiments, a thin compliant membrane heat exchanger 100 can comprise non-polymeric materials including but not limited to ceramics, metals, and the like. Such materials may be desirable for providing operation at relatively high temperatures. For example, in one embodiment, the membrane heat exchanger 100 can comprise a thin metallic membrane element that can operate at high temperatures and with low hysteresis losses. A metallic bellows can be used in such an embodiment, which can have many large diameter mostly flat convolutions with small internal air gaps and a small inner convolution diameter such that the heat transfer surface area to volume ratio can be high, and near isothermal compression and expansion can thereby be achieved.

For low-temperature compressors, heat pumps, engines, or the like, plastic and composite construction beyond that of the heat exchanger membranes 100 can be used. For example, variable volume bellows structures (or equivalent), connecting rods, and crank cases can be made from low cost and light weight plastic and composite parts. In some implementations, metallic bellows can have the advantage of lower hysteresis losses than plastics or composite materials and thereby provide higher efficiency.

In some embodiments, the fluid in the heat exchanger can be limited to a fairly incompressible fluid. For example, in the case of an air conditioning system, a further water loop can be used to move heat to and from the vapor compression cycle and to transfer that heat to the air via the membrane heat exchanger. This can mitigate most of the efficiency advantage compared to a direct to air, air conditioning system. In one embodiment, the near isothermal compression and/or expansion membrane can be directly mechanically compressed without the aid of a hydraulic fluid. External heat transfer can be achieved via direct radiation, for example, solar, through a near constant pressure gas flow, or the like.

Applications of isothermal compressors and motors can include, but are not limited to, air compression, natural gas compression, gas compression, gas liquefaction, hot water heating, liquid heating, liquid cooling, compressed air motors, and so forth. Further applications of heat pumps using near-isothermal compression/expansion can include, but are not limited to, air conditioning, space heating, water heating, cooking, refrigeration, liquefaction, cryo-cooling, and so forth. Still further applications of isothermal engines can include, but are not limited to, waste heat recovery, solar hot water engines, geothermal engines, external combustion engines including those driven by waste incineration, bottoming cycles, ocean thermal gradient engines, and so forth.

Various embodiments can be configured to provide 30% more efficient small and large scale compression of air and gases, and energy recovery from pressurized gases. Further embodiments can be configured to provide more efficient single stage large and small scale hot water heaters and cryogenic coolers, with specific application to liquefied natural gas.

In some embodiments, the combined hydraulic and heat transfer fluid can be directly coupled to an external heat exchanger. In some embodiments, the combined hydraulic and heat transfer fluid can be effectively pumped through the isothermal compressor/expander by the isothermal compression/expansion pumping process. In some embodiments, isothermal compression/expansion can be driven via direct mechanical contact and the external heat transfer fluid is maintained at relatively constant pressure largely independent of gas compression/expansion pressure. In some embodiments, external heat transfer can be achieved by a condensing, evaporating, radiating, or forced convection heat transfer process. In some embodiments the internal thermodynamic process can include compression, expansion, condensing and evaporation.

In some embodiments, mechanically actuated hermetically sealed compliant volumes are used to compress and expand the hydraulic heat transfer fluid (e.g., bellows, roll socks, and such like—this can avoid the need for piston seals and the friction and leakage there entailed). At high temperatures thin metallic sheets can be used in some embodiments instead of polymer films, these might also be construed into very high surface area bellows geometries that minimize internal dead volume and allow direct mechanical as opposed to hydraulic actuation. Isothermal compression/expansion at cryogenic temperatures, is also contemplated in further embodiments, which can use Teflon films, and other cryogenically compatible polymers and composites, it can also use thin metallic sheets in large double diaphragm forms.

Isothermal compression/expansion systems described herein can be used for gas compression, gas expansion, heat engines, heat pumps, liquefaction of gases, and the like. Gas liquefaction can begin by isothermal compression to high pressure at ambient temperature. The second thermodynamic process can be adiabatic expansion to cryogenic temperatures. The third process can be isothermal expansion at the boiling point of the fluid, condensing it. Gas not condensed can be returned to the ambient temperature isothermal compressor via a counter flow heat exchanger where it cools gas from the ambient temperature isothermal compressor to cryogenic temperatures. Alternatively, a system of heat pump and heat exchangers might be used to liquefy a gas directly. Relevant heat pumps and heat engines can comprise any suitable thermodynamic cycle based on isothermal compression and/or expansion. This can include Carnot cycles, Stirling cycles, Ericsson cycle, and so forth.

Combining this isothermal compression and expansion process with a counter flow heat exchanger or an adiabatic compression and expansion process, it is possible to make a highly efficient Carnot equivalent heat pump or heat engine.

Near Carnot Isothermal Engine and/or Heat Pump

Top conventional engines are limited to around 70% of Carnot, and only achieve these efficiencies at large scale and at ideal temperatures. Most engine types typically operate at far lower efficiency than this. Small scale distributed energy engine solutions are therefore lacking.

However, in accordance with various embodiments, by hydraulically squashing large surface area gas-filled membrane heat exchangers 100, it can be possible to combine a compressor and heat exchanger so as to achieve near isothermal compression or expansion. In some embodiments, the membrane heat exchanger body 105 separating the liquid from the gas may only serve as a fluid-to-gas barrier and may not otherwise be significantly loaded. As discussed herein, a membrane heat exchanger 100 can be thin and compliant; thin enough that in some embodiments, low conductivity polymers can be used without compromising overall heat transfer. At higher temperatures, metallic foils can be used in some embodiments. Suitable hydraulic cooling/heating fluids can include water, liquefied gases, heat transfer oils, molten salts, molten metals, and the like.

Accordingly, in various embodiments, with effective isothermal compression and expansion it is possible to construct Carnot cycle engines and heat pumps of high efficiency including 80% of Carnot or more. In some embodiments, operating a highly pressurized closed cycle system also enables high power densities. In further embodiments, a high surface area bellows can be compressed directly and use alternate heat transfer without hydraulics.

Figure 28:
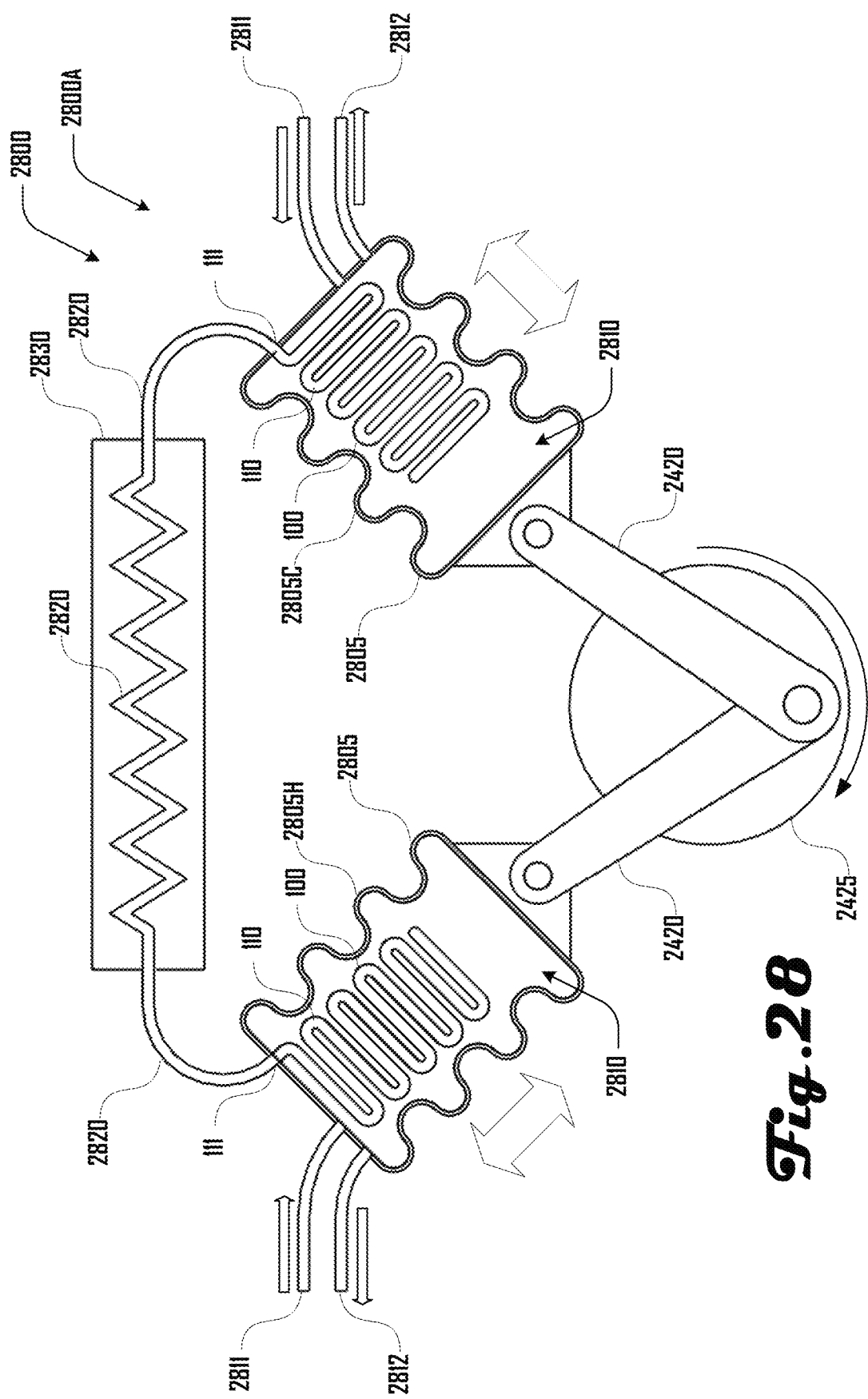
FIG. 28 illustrates an isothermal engine that comprises a first and second bellows that define a respective compression chamber having a membrane heat exchanger disposed therein.

In accordance with one example embodiment, and as shown in FIG. 28, an isothermal engine 2800 can comprise a first and second bellows 2805 that define a respective compression chamber 2810 having a membrane heat exchanger 100 disposed therein. The bellows 2805 can be compressible, and in some embodiments such compression can be driven by a respective con rod 2420 that is coupled to a rotating crank 2425. For example, in some embodiments such as is illustrated in FIG. 28, the crank 2425 and con rods 2420 can be in an alpha configuration with the crank being 90° out of phase.

In the example of FIG. 28, the bellows 2805 can be configured to hold fluids (e.g., water, oil, or the like) within the compression chambers 2810 and the temperatures of the fluids can be different. For example, in one embodiment, the first bellows 2805H can be configured to hold hot fluid within the compression chamber 2810 and the second bellows 2805C can be configured to hold cold fluid within the bellows, with entry and exit of such hot or cold fluid from the compression chambers 2810 being provided by respective inlet and outlet ports 2811, 2812.

As discussed herein, the membrane heat exchanger 100 can define a chamber 110 that extends between one or more end 111. In the example of FIG. 28 an end 111 of the membrane heat exchangers 100 can be coupled with a regenerator or counter-flow heat exchanger 2830 via a line 2820 that extends through the counter-flow heat exchanger 2830. In some embodiments, the counter-flow heat exchanger 2830 can comprise a membrane heat exchanger 100 as discussed herein.

In various embodiments a membrane heat exchanger 100 can be disposed within a fluid-filled bellows 2805. As the bellows 2805, or equivalent, compresses, these membrane heat exchangers 100 can be hydraulically squashed together, compressing a gas disposed within the respective chambers 110 of the membrane heat exchangers 100. Due to the high surface area and small gas gap of various embodiments, heat can be transferred through the membrane from the gas to the liquid, such that the gas remains at near the same temperature as the fluid, thereby achieving near isothermal compression.

In other words, FIG. 28 depicts an isothermal engine or heat pump 2800 (e.g., an Ericsson cycle) that incorporates isothermal compression and isothermal expansion, which can be connected by a regenerator 2820. In various embodiments, where an isothermal engine is backwards (e.g., the electrical generator is powered as a motor to drive it) such an isothermal engine can be used as a heat pump.

Combining this isothermal compression and expansion process with a counter-flow heat exchanger 2830, various embodiments provide a highly efficient Carnot equivalent heat pump or heat engine. The heat transfer can be highly efficient, friction and sealing losses can be very low, and the thermodynamic cycle near ideal. Many cycles and even-valved approaches are contemplated in some embodiments. In some embodiments, fatigue life of the membrane may be of concern, but can be mitigated by use of very small deflections.

Accordingly, in some embodiments, low cost engines and heat pumps with efficiencies in excess of 80% of Carnot can be configured. For example, one embodiment can have 15% efficient engines with water at near boiling point, 40% efficient engines using heat transfer oils at 350° C., and 50% with molten salts at 570° C. Accordingly, efficient and cost effective low temperature engines, bottoming cycles, and recovery of waste heat, at small and large scale, can be enabled.

Figure 29:
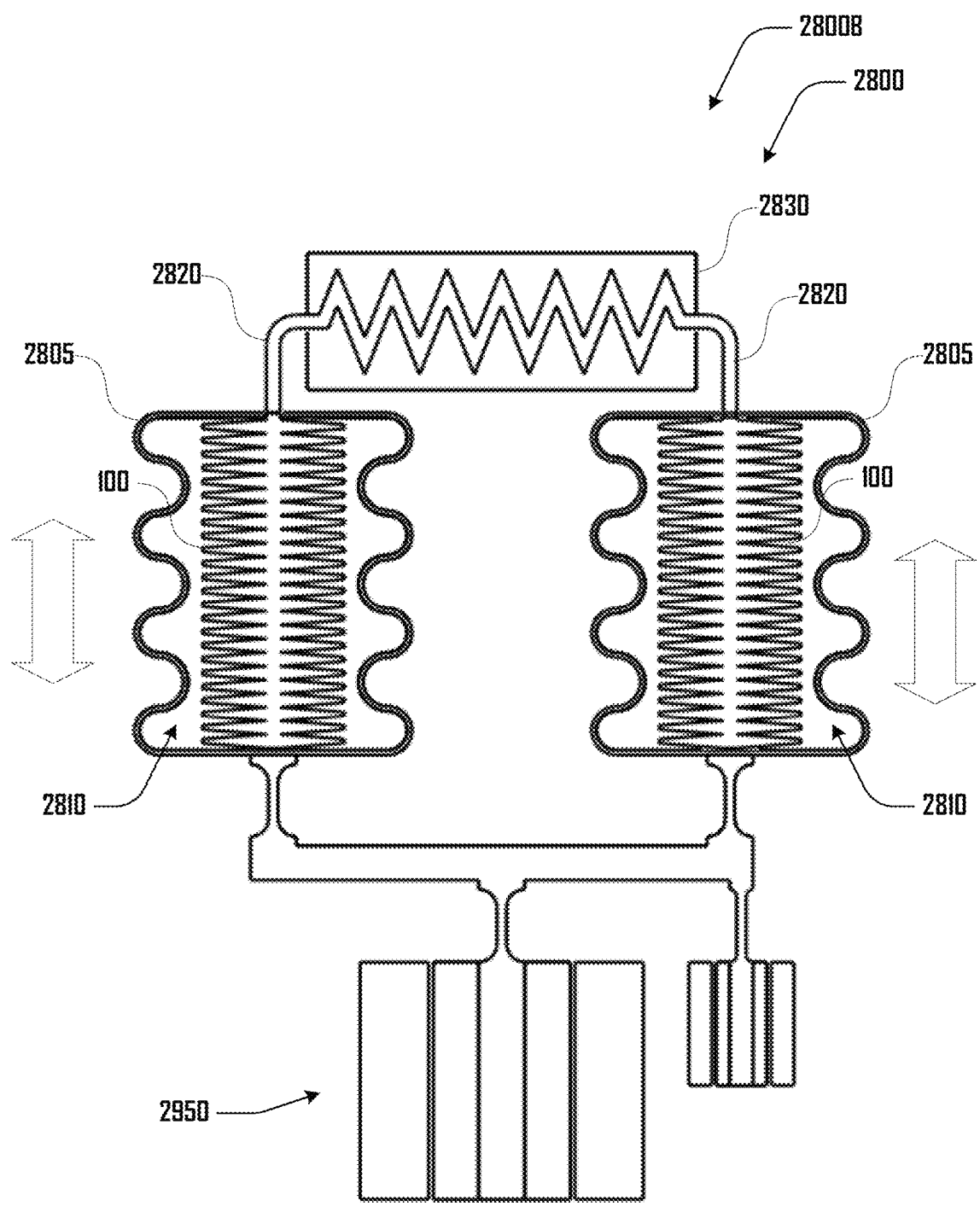
FIG. 29 illustrates an example embodiment of an isothermal engine having the bellows disposed in a parallel arrangement instead of in a 90° arrangement as in FIG. 28.

In further embodiments, various other suitable configurations of an isothermal engine 2800 can be provided. For example, FIG. 29 illustrates an example embodiment 2800B of an isothermal engine 2800 having the bellows 2805 disposed in a parallel arrangement instead of in a 90° arrangement as in FIG. 28. Additionally, the bellows 2805 are shown being actuated by a driving assembly 2950. This example illustrates and isothermal engine or heat pump that uses flexures and linear motors/generators so as to avoid the need for rotary motion (e.g., as illustrated in FIG. 28).

Figure 30:
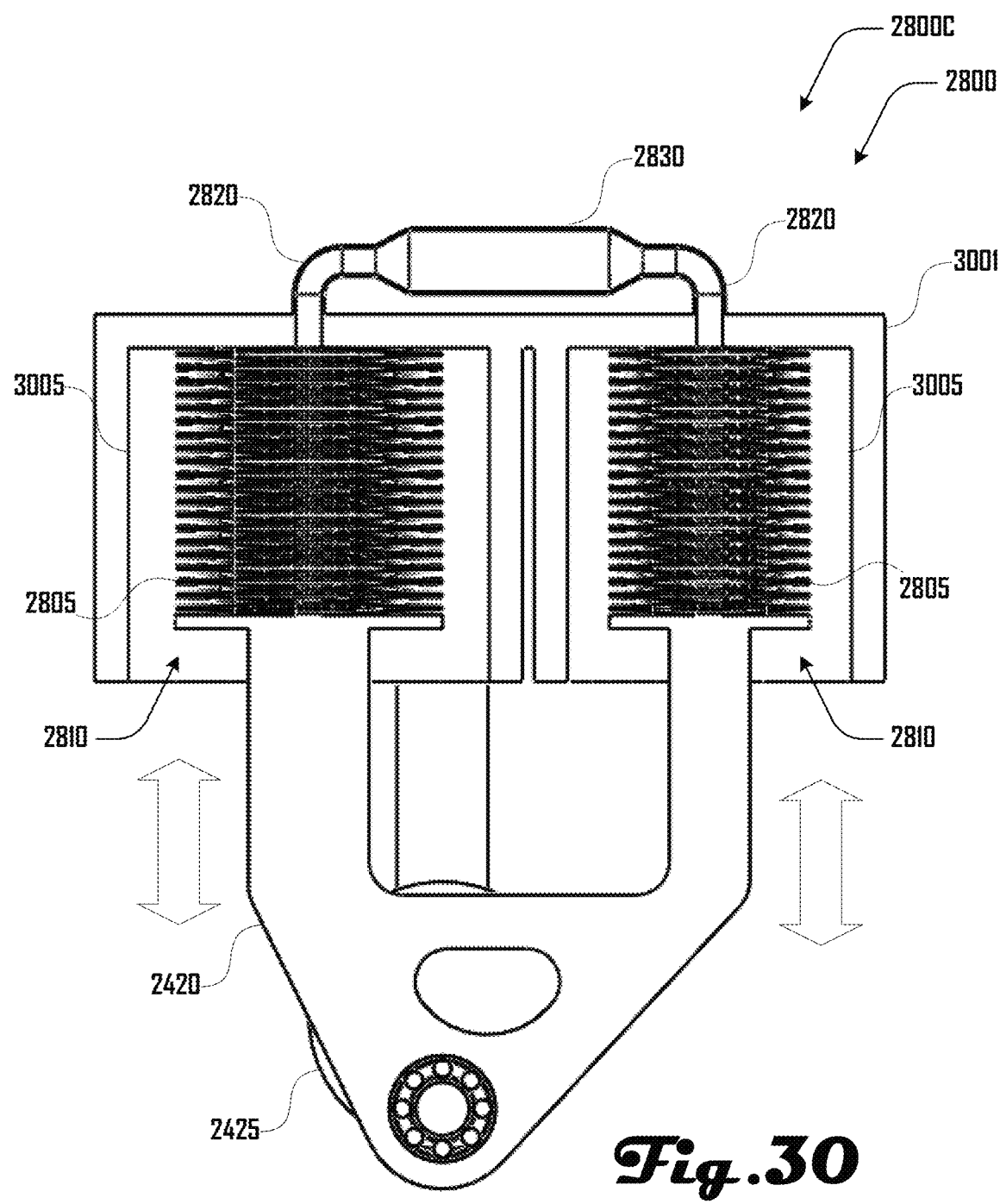
FIG. 30 illustrates an isothermal engine having non-compressible cylinders in which respective membrane heat exchangers are disposed.

Additionally, in another embodiment 2800C, as illustrated in FIG. 30, bellows 2805 can be disposed within a respective cavity 3005 of a housing 3001. In some embodiments, the cavities 3005 can be filled with a fluid (e.g., water) to surround the bellows 2805 to provide for cooling/heating of the respective bellows 2805, which can cool/heat a fluid within the bellows 2805. In some embodiments, the cavities 3005 can comprise open containers and the system 2800C can be disposed inverted compared to how it is shown in FIG. 30. As illustrated in this example, the compressible membrane heat exchangers 100 can be driven via a crank 2425 coupled to a dual-arm con rod 2420. In various embodiments, high surface area bellows 2805 can be used for direct near isothermal compression/expansion.

Additionally, as discussed herein, the term "isothermal" can refer to systems or methods, or portions thereof, that operate in or at near-isothermal or substantially-isothermal conditions. Accordingly, the present disclosure should not be construed to be limited to such systems, methods, or portions thereof that lack any temperature change whatsoever.

Also, the terms "compression chamber" or "compression cavity" should in some embodiments be construed to include a structure that is configured for isothermal compression and/or expansion. For example, in various embodiments, an isothermal engine can comprise an isothermal compression chamber (cold) and an isothermal expansion chamber (hot). The compression and expansion chambers can be reversed in some embodiments when in a heat pump mode. Accordingly, the term "compression chamber" should not be construed to be limiting and can encompass an isothermal compression chamber and/or an isothermal expansion chamber in accordance with various embodiments.

Membrane Heat Exchangers Used in Spacecraft, Satellites and Planetary Habitats

Membrane heat exchangers 100 and related systems can be configured for use with manned and unmanned spacecraft, satellites, and planetary habitats that need to be temperature regulated to sustain life or operation of devices. Moving heat between components (via convection) or dissipating heat to space (via radiation) can involve embodiments of membrane heat exchangers 100 having a large area.

In various embodiments, Micro-Meteor and Orbital Debris (MMOD) can be a danger for membrane heat exchangers 100 and associated radiators operating in and near space. Accordingly, in various embodiments, a membrane heat exchanger 100 can be configured to be resistant to, withstand or otherwise handle an operating environment having MMOD. For example, in some embodiments, a heat radiator can be designed to be sacrificial and redundant or replacement radiators can be coupled to a membrane heat exchanger 100. Additionally, fluid paths within such radiators can be made to be independent so that the effects of damage to the radiator are isolated to the extent possible.

Further embodiments can include MMOD shielding that permits heat transfer. One example is shielding that is transparent to infrared radiation. Another example, as illustrated in FIG. 31 is an array 3105 of elongated shielding channels 3110 are normal to the surface of a radiator or membrane heat exchanger 100 and are reflective, effectively acting as a short distance light-pipe for passing radiation to space.

In some embodiments such an array 3015 can comprise a Mylar or fiber-reinforced Mylar honeycomb-like shield structure in which the honeycomb channels 3110 are normal to the radiator surface and are reflective. Impact energy from MMOD would be dispersed by the honeycomb walls 3115. In this scenario, the likelihood of an MMOD impact normal to the honeycomb structure walls 3115, and the protection as a function of impact angle, can be considered. For example, short light-pipes of this type do not need to contain line-of-sight to the emissive radiator wall, and could be made to be non-parallel so as to better prevent damage from MMOD parallel to the light pipe.

The low cost of membrane heat exchangers 100 can enable new incarnations of thermal management systems for spacecraft. For example, inflatable radiative heat exchanger panels can be applied directly to the outer surfaces of spacecraft, where they can further add to the micrometeoroid protection and thermal insulation of the spacecraft. By using selective emissivity coatings these can operate in direct normal sunlight, if poorly, and heat transfer fluids can be controlled independently to panels that are in sunlight or shade so as to provide continuous overall cooling without use of active positioning of independent radiators. The far lighter weight of the inflatable radiators enables their use in this manner where not all radiators are maximally effective at all times. Membrane heat exchangers 100 can further enable lightweight fluid-to-liquid heat exchangers of large effective area and efficiency such that the cost of operating secondary heat transfer loops, which can add significant safety and redundancy, is far less prohibitive.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An air thermal conditioning system for at least one of heating air and cooling air, the air thermal conditioning system comprising:
    a cross-flow heat exchanger array that includes:
        a housing;
        a plurality of at least 50 stacked planar membrane heat exchangers disposed in parallel and held in tension by the housing via respective opposing top and bottom ends of the respective planar membrane heat exchangers, the planar membrane heat exchangers stacked in parallel with a space separating each of the planar membrane heat exchangers, the space separating each of the planar membrane heat exchangers being an opening located centrally between the respective planar membrane heat exchangers that extends between the opposing top and bottom ends of the respective planar membrane heat exchangers and extends between opposing peripheral edges of the respective planar membrane heat exchangers, with each of the planar membrane heat exchangers comprising:
            a first planar polymer sheet having a thickness between 0.1 mm and 0.05 mm, the first planar polymer sheet consisting essentially of a polymer;
            a second planar polymer sheet having a thickness between 0.1 mm and 0.05 mm, the second planar polymer sheet coupled to the first planar polymer sheet at least by a welded seam, the second planar polymer sheet consisting essentially of the polymer; and
            at least one fluid chamber defined by the first and second planar polymer sheets and the welded seam, with the at least one fluid chamber extending between the first and second ends and opening to a first and second port defined by the first and second planar polymer sheets at the top and bottom ends respectively; and
        a first and second fluid conduit respectively disposed at and communicating with the first and second ports of the planar membrane heat exchangers, the first and second fluid conduits fluidically coupling the plurality of planar membrane heat exchangers and configured generate a fluid flow within the fluid chambers of the plurality of planar membrane heat exchangers, the fluid flow being the same direction for all of the plurality of planar membrane heat exchangers and comprising:
            flowing into the first fluid conduit,
            flowing between the top and bottom ends within the respective chambers, and
            flowing out the second fluid conduit, with fluid flowing in and out of the first and second fluid conduits respectively on the same side of the cross-flow heat exchanger array.

2. The air thermal conditioning system of claim 1, wherein the cross-flow heat exchanger array is configured to heat fluid that is passing through the fluid chambers of the stacked planar membrane heat exchangers by having hot air enter a first end of the spaces separating the planar membrane heat exchangers such that the hot air passes over the fluid chambers, where the hot air transfers thermal energy to the fluid flowing within the fluid chambers of the planar membrane heat exchangers, which cools the hot air as the hot air travels through the spaces separating the planar membrane heat exchangers such that cold air is generated and leaves from a second end of the cross-flow heat exchanger array.

3. The air thermal conditioning system of claim 1, wherein a fan is disposed proximate to the second end of the cross-flow heat exchanger array, and wherein the fan is configured to cause hot air to be pulled into the first end of the spaces separating the planar membrane heat exchangers such that the hot air passes over the fluid chambers of the planar membrane heat exchangers.

4. The air thermal conditioning system of claim 1, wherein the fluid flow within the fluid chambers of the plurality of planar membrane heat exchangers comprises a liquid fluid flow.

5. An air thermal conditioning system for at least one of heating air and cooling air, the air thermal conditioning system comprising:
    a cross-flow heat exchanger array that includes:
        a housing;
        a plurality of planar membrane heat exchangers held by the housing in parallel via respective opposing first and second ends of the planar membrane heat exchangers, the planar membrane heat exchangers disposed in parallel with a space separating each of the planar membrane heat exchangers, the space separating each of the planar membrane heat exchangers being an opening located centrally between the respective planar membrane heat exchangers that extends between the opposing top and bottom ends of the respective planar membrane heat exchangers and extends between opposing peripheral edges of the respective planar membrane heat exchangers, with each of the planar membrane heat exchangers comprising:
            a first sheet;
            a second sheet coupled to the first sheet; and
            at least one fluid chamber defined by the first and second sheets, with the at least one fluid chamber extending between the first and second ends and opening to a first and second port disposed at the first and second ends respectively; and
        a first and second fluid conduit respectively disposed at and communicating with the first and second ports of the planar membrane heat exchangers, the first and second fluid conduits fluidically coupling the plurality of planar membrane heat exchangers and configured generate a fluid flow within the fluid chambers of the plurality of planar membrane heat exchangers flowing in the first fluid conduit, between the first and second ends within the respective chambers, and out the second fluid conduit, with fluid flowing in and out of the first and second fluid conduits respectively on the same side of the cross-flow heat exchanger array.

6. The air thermal conditioning system of claim 5, wherein the plurality of planar membrane heat exchangers comprises at least 50 planar membrane heat exchangers.

7. The air thermal conditioning system of claim 5, wherein the plurality of planar membrane heat exchangers are disposed in parallel and held in tension by the housing.

8. The air thermal conditioning system of claim 5, wherein the first and second sheets are planar polymer sheets having a thickness between 0.1 mm and 0.05 mm.

9. The air thermal conditioning system of claim 5, wherein the second sheet is coupled to the first sheet at least by a welded seam, and wherein the first and second sheets and the welded seam define the fluid chambers of the planar membrane heat exchangers.

10. An air thermal conditioning system for at least one of heating air and cooling air, the air thermal conditioning system comprising:
   a cross-flow heat exchanger array that includes:
      a plurality of planar membrane heat exchangers disposed in parallel with a space separating adjacent planar membrane heat exchangers, the space separating each of the planar membrane heat exchangers being an opening located centrally between the respective planar membrane heat exchangers that extends between opposing top and bottom ends of the respective planar membrane heat exchangers and extends between opposing peripheral edges of the respective planar membrane heat exchangers, with each of the planar membrane heat exchangers comprising:
         a first sheet;
         a second sheet coupled to the first sheet; and
         at least one fluid chamber defined by the first and second sheets, with the at least one fluid chamber extending between first and second ends of the planar membrane heat exchangers and opening to a first and second port at the first and second ends respectively.

11. The air thermal conditioning system of claim 10, further comprising a first and second fluid conduit respectively disposed at and communicating with the first and second ports of the planar membrane heat exchangers.

12. The air thermal conditioning system of claim 11, wherein the first and second fluid conduits couple the plurality of planar membrane heat exchangers and are configured support a fluid flow within the fluid chambers of the plurality of planar membrane heat exchangers flowing in the first fluid conduit, between the first and second ends within the respective chambers, and out the second fluid conduit.

13. The air thermal conditioning system of claim 11, wherein the first and second fluid conduits are disposed on the same side of the cross-flow heat exchanger array.

14. The air thermal conditioning system of claim 10, wherein the plurality of planar membrane heat exchangers are held by a housing via respective opposing first and second ends of the planar membrane heat exchangers.

15. The air thermal conditioning system of claim 14, wherein the plurality of planar membrane heat exchangers are disposed in parallel and held in tension by the housing.

16. The air thermal conditioning system of claim 10, wherein the plurality of planar membrane heat exchangers comprises at least 50 planar membrane heat exchangers.

17. The air thermal conditioning system of claim 10, wherein the first and second sheets are planar polymer sheets.

18. The air thermal conditioning system of claim 10, wherein the second sheet is coupled to the first sheet at least by a welded seam, and wherein the first and second sheets and welded seam define the fluid chambers of the planar membrane heat exchangers.

19. The air thermal conditioning system of claim 10, wherein the cross-flow heat exchanger array is configured to heat fluid that is passing through the fluid chambers of the planar membrane heat exchangers by having hot air enter a first end of spaces separating the planar membrane heat exchangers such that the hot air passes over the fluid chambers, where the hot air transfers thermal energy to the fluid flowing within the fluid chambers of the planar membrane heat exchangers, which cools the hot air as the hot air travels through the spaces separating the planar membrane heat exchangers such that cold air is generated and leaves from a second end of the cross-flow heat exchanger array.

20. The air thermal conditioning system of claim 10, wherein a fan is disposed proximate to a second end of the cross-flow heat exchanger array, and wherein the fan is configured to cause air to enter a first end of spaces separating the planar membrane heat exchangers such that the air passes over the fluid chambers of the planar membrane heat exchangers.

* * * * *